(12) United States Patent
Kroll et al.

(10) Patent No.: US 11,269,295 B2
(45) Date of Patent: Mar. 8, 2022

(54) HOLOGRAPHIC DISPLAY

(71) Applicant: SEEREAL TECHNOLOGIES S.A., Munsbach (LU)

(72) Inventors: Bo Kroll, London (GB); Robert Missbach, Kreischa/OT Barenklause (DE); Alexander Schwerdtner, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 17/007,104

(22) Filed: Aug. 31, 2020

(65) Prior Publication Data
US 2020/0393794 A1   Dec. 17, 2020

Related U.S. Application Data

(63) Continuation of application No. 15/928,891, filed on Mar. 22, 2018, now Pat. No. 10,761,481, which is a
(Continued)

(30) Foreign Application Priority Data

May 16, 2007 (DE) ..................... 10 2007 023 737.7
May 16, 2007 (DE) ..................... 10 2007 023 739.3
(Continued)

(51) Int. Cl.
*G03H 1/04* (2006.01)
*G02B 26/08* (2006.01)
(Continued)

(52) U.S. Cl.
CPC ....... *G03H 1/0443* (2013.01); *G02B 26/0875* (2013.01); *G03H 1/0005* (2013.01);
(Continued)

(58) Field of Classification Search
None
See application file for complete search history.

(56) References Cited

U.S. PATENT DOCUMENTS 4,542,449 A   9/1985 Whitehead
5,643,826 A   7/1997 Ohtani et al.
(Continued)

FOREIGN PATENT DOCUMENTS

EP   1227468 A2   7/2002
WO   2004044659 A2   5/2004
(Continued)

OTHER PUBLICATIONS

"Big Bertha's Brilliance," http://www.pcmag.eom/article2/0, 1895, 2038798,00.asp, printed Nov. 6, 2009.
(Continued)

*Primary Examiner* — James A Thompson
(74) *Attorney, Agent, or Firm* — Saul Ewing Arnstein & Lehr LLP

(57) ABSTRACT

Disclosed is a holographic display including a spatial light modulator (SLM) with pixels, the SLM pixels being on a substrate, the SLM including circuitry which is on the same substrate as the SLM pixels, the circuitry operable to perform calculations which provide an encoding of the SLM.

25 Claims, 34 Drawing Sheets

Related U.S. Application Data continuation of application No. 15/148,142, filed on May 6, 2016, now Pat. No. 9,946,224, which is a continuation of application No. 12/600,276, filed as application No. PCT/EP2008/056026 on May 16, 2008, now Pat. No. 9,368,052.

(30) Foreign Application Priority Data

| May 16, 2007 | (DE) | 10 2007 023 740.7 |
|---|---|---|
| May 16, 2007 | (DE) | 10 2007 023 785.7 |
| May 16, 2007 | (GB) | 0709376 |
| May 16, 2007 | (GB) | 0709379 |
| Sep. 25, 2007 | (GB) | 0718595 |
| Sep. 25, 2007 | (GB) | 0718596 |
| Sep. 25, 2007 | (GB) | 0718598 |
| Sep. 25, 2007 | (GB) | 0718602 |
| Sep. 25, 2007 | (GB) | 0718607 |
| Sep. 25, 2007 | (GB) | 0718614 |
| Sep. 25, 2007 | (GB) | 0718617 |
| Sep. 25, 2007 | (GB) | 0718619 |
| Sep. 25, 2007 | (GB) | 0718622 |
| Sep. 25, 2007 | (GB) | 0718626 |
| Sep. 25, 2007 | (GB) | 0718629 |
| Sep. 25, 2007 | (GB) | 0718632 |
| Sep. 25, 2007 | (GB) | 0718633 |
| Sep. 25, 2007 | (GB) | 0718634 |
| Sep. 25, 2007 | (GB) | 0718636 |
| Sep. 25, 2007 | (GB) | 0718640 |
| Sep. 25, 2007 | (GB) | 0718649 |
| Sep. 25, 2007 | (GB) | 0718654 |
| Sep. 25, 2007 | (GB) | 0718656 |
| Sep. 25, 2007 | (GB) | 0718659 |

(51) Int. Cl.

| G03H 1/02 | (2006.01) |
|---|---|
| G03H 1/22 | (2006.01) |
| G03H 1/00 | (2006.01) |
| G03H 1/08 | (2006.01) |
| G03H 1/26 | (2006.01) |
| G09G 3/20 | (2006.01) |
| G03H 1/32 | (2006.01) |
| G06F 3/01 | (2006.01) |

(52) U.S. Cl.

CPC .............. *G03H 1/02* (2013.01); *G03H 1/0808* (2013.01); *G03H 1/2205* (2013.01); *G03H 1/2294* (2013.01); *G03H 1/268* (2013.01); *G03H 1/32* (2013.01); *G06F 3/013* (2013.01); *G09G 3/20* (2013.01); *G03H 1/08* (2013.01); *G03H 2001/0088* (2013.01); *G03H 2001/0216* (2013.01); *G03H 2001/0224* (2013.01); *G03H 2001/0833* (2013.01); *G03H 2001/2242* (2013.01); *G03H 2001/2271* (2013.01); *G03H 2001/2625* (2013.01); *G03H 2210/30* (2013.01); *G03H 2210/36* (2013.01); *G03H 2210/44* (2013.01); *G03H 2222/20* (2013.01); *G03H 2222/22* (2013.01); *G03H 2222/24* (2013.01); *G03H 2223/18* (2013.01); *G03H 2223/19* (2013.01); *G03H 2225/22* (2013.01); *G03H 2225/55* (2013.01); *G03H 2226/02* (2013.01); *G03H 2226/04* (2013.01); *G03H 2226/05* (2013.01); *G09G 2300/026* (2013.01); *G09G 2300/0408* (2013.01); *G09G 2300/0809* (2013.01)

(56) References Cited

U.S. PATENT DOCUMENTS

| 5,648,277 | A | 7/1997 | Zhang et al. |
|---|---|---|---|
| 6,140,667 | A | 10/2000 | Yamazaki et al. |
| 6,153,893 | A | 11/2000 | Inoue et al. |
| 6,195,184 | B1 * | 2/2001 | Chao ................ G03H 1/08 359/22 |
| 6,445,368 | B1 | 9/2002 | Nakajima |
| 6,582,980 | B2 | 6/2003 | Feldman et al. |
| 6,710,758 | B2 | 3/2004 | Caracci et al. |
| 6,759,677 | B1 | 7/2004 | Yamazaki et al. |
| 6,760,135 | B1 * | 7/2004 | Payne ................ G03H 1/2294 349/24 |
| 7,315,408 | B2 | 1/2008 | Schwerdtner |
| 7,986,603 | B1 | 7/2011 | Trisnadi et al. |
| 8,049,941 | B2 * | 11/2011 | Haussler ............ G03H 1/2294 359/9 |
| 8,294,966 | B2 * | 10/2012 | Kroll ................ G03H 1/2205 359/32 |
| 8,303,072 | B2 | 11/2012 | Shibata et al. |
| 8,400,696 | B2 * | 3/2013 | Ikeda ................ G03H 1/08 359/21 |
| 2001/0050787 | A1 | 12/2001 | Crossland et al. |
| 2002/0075776 | A1 | 6/2002 | Kasazumi et al. |
| 2002/0110280 | A1 | 8/2002 | Prakash et al. |
| 2004/0036702 | A1 | 2/2004 | Kageyama et al. |
| 2004/0223049 | A1 | 11/2004 | Taniguchi et al. |
| 2005/0083559 | A1 | 4/2005 | Horikoshi et al. |
| 2005/0110018 | A1 | 5/2005 | Van et al. |
| 2005/0112848 | A1 * | 5/2005 | Faris ................ B81C 1/0038 438/458 |
| 2005/0122549 | A1 * | 6/2005 | Goulanian ............ G03H 1/30 359/3 |
| 2005/0162719 | A1 | 7/2005 | Ogasawara et al. |
| 2005/0286101 | A1 * | 12/2005 | Garner ................ G03H 1/2205 359/9 |
| 2006/0055994 | A1 | 3/2006 | Schwerdtner |
| 2006/0139710 | A1 | 6/2006 | Schwerdtner |
| 2006/0139711 | A1 | 6/2006 | Leister et al. |
| 2006/0250671 | A1 | 11/2006 | Schwerdtner et al. |
| 2006/0262055 | A1 | 11/2006 | Takahara |
| 2006/0279815 | A1 | 12/2006 | Rathus et al. |
| 2008/0169587 | A1 * | 7/2008 | Kihara ................ B33Y 30/00 264/408 |
| 2008/0198372 | A1 | 8/2008 | Pan |
| 2009/0207466 | A1 | 8/2009 | Bucklay |

FOREIGN PATENT DOCUMENTS

| WO | 2006066906 A1 | 6/2006 |
|---|---|---|
| WO | 2006066919 A1 | 6/2006 |
| WO | 2008025839 A1 | 3/2008 |

OTHER PUBLICATIONS

"Optical Processing Using Optical Memories", by Geoffrey W. Burr, 1999 IEEE LEOS Annual Meeting Conference Proceedings, pp. 564-565, Nov. 1999. (Year: 1999).

"Spatial Light Modulators with Integrated Phase Masks for Holographic Data Storage", by M.J. O'Callaghan, J.R. McNeil, C. Walker, and M. Handschy, 2006 Optical Data Storage Topical Meeting, pp. 23-25, Apr. 2006. (Year: 2006).

Bajard et al., IEEE Transactions on Computers, 43(8): 955-963, Aug. 1994.

J. Birnbaum and R.S. Williams, "Physics and the Information Revolution," Physics Today, Jan. 2000, pp. 38-42.

Shimobaba et al., Optics Express 13, 4196 (2005).

Slinger et al., "Computer-generated holography as a generic display technology," Computer, IEEE Service Center, vol. 38, No. 8 (Aug. 1, 2005) XP007903875.

Smith et al., "Agile wide-angle beam steering with electrowetting microprisms," Optics Express, vol. 14, No. 14, pp. 6557-6563 (2006) [cited as "Heikenfeld" in application].

(56) References Cited

OTHER PUBLICATIONS

Sanford, et al., "A One-Megapixel Reflective Spatial Light Modulator System for Holographic Storage", IBM Journal of Research and Development, vol. 42, No. 3/4, pp. 411-426, May/Jul. 1998. (Year: 1998).

* cited by examiner

| Estimation of transistor count for hologram computation | | | | |
|---|---|---|---|---|
| | 25 MHz TFT solution | 200 MHz FPGA solution | Common Values Ranges | Description |
| Origin Image | | | | |
| X-Resolution | 2000 | 2000 | 640..2560 | |
| Y-Resolution | 1500 | 1500 | 500..1600 | |
| Origin Pixels | 3000000 | 3000000 | | |
| Sub-hologram | | | | |
| X-Size | 33 | 33 | 15..100 | depend on viewing range and coding used |
| Y-Size | 33 | 33 | 20..100 | depend on viewing range and coding used |
| Symmetry factor | 2 | 2 | 1,2,4 | The sub hologram is x and y symmetric, but computation path for factor 4 is very complicated |
| Total Pixel per Sub-hologram | 545 | 545 | | |
| Total Number of CORDICs | 1.6E+09 | 1.6E+09 | | |
| Frames | | | | |
| Frames per second | 25 | 25 | 10..50 | |
| Number of users | 1 | 1 | 1..4 | |
| Views per user | 2 | 2 | 2 | |
| Number of Colours | 3 | 3 | | |
| Total frames per second | 150 | 150 | | |
| Computation frequencies | | | | |
| CORDICs per second | 2.5E+11 | 2.5E+11 | | One CORDIC for every pixel of the sub hologramm |
| Pipeline frequency | 2.5E+07 | 2.0E+08 | 10..3000 MHz | 10 MHz (slow p-Si), 3000 MHz (90nm) |
| Number of parallel CORDIC units | 9810 | 1226 | | More transistors result into higher pipeline frequency, |
| Transistors per CORDIC | 52000 | 52000 | 30000..100000 | estimation based on [1] page 70..90 and own calculations |
| Total Transistors for CORDIC Units | 5.1E+08 | 6.4E+07 | | |
| Hologram | | | | |
| X-Size | 16000 | 16000 | | |
| Y-Size | 12000 | 12000 | | |
| Pixels | 192000000 | 192000000 | | |
| Logic Units used for CORDIC | | | | |
| Lens function | | | | |
| Logic Units used for Lens function | 15000 | 15000 | | estimation based on FPGA logic units |
| Transistors for lens function | | | | |
| CORDIC units per lens functions | 4 | 4 | 1..number of pixels per sub-hologram | |
| Number of lens function units => *number of clusters* | 2.5E+03 | 3.1E+02 | 1..no. of clusters | 1.3 for FPGA solution means we will need 2 FPGAs |
| *Total Transistors for lens function units* | 3.7E+07 | 4.6E+06 | | |
| *Transistors for sub-hologram computation* | 547 | 68 | | |

FIGURE 21

| | | | |
|---|---|---|---|
| Adding the sub holograms | | | |
| Logic Units used for Adding | | | |
| Memory bits needed | 18432000 | 18432000 | |
| Transistors per Memory Bit | 1 | 1 | 1..6 | An SRAM cell normally needs 4..6 transistors, but the information is stored only about 100µs and so an 1 transistor DRAM cell can be used |
| Transistors for adding | 1.84E+07 | 1.84E+07 | |
| Coding of sum hologram | | | |
| Logic Units used for coding | | | |
| CORDIC operations per hologram pixel | 2 | 2 | 2..3 | depend on coding method |
| CORDICs per second | 5.76E+10 | 5.76E+10 | |
| CORDIC units needed | 2.3E+03 | 2.9E+02 | |
| CORDIC units per cluster | 1 | 1 | |
| Transistors for coding | 1.28E+08 | 1.59E+07 | |
| Total Transistors for Hologram-computation | 6.9E+08 | 1.0E+08 | |
| Transistors per origin pixel | 230.96 | 34.25 | |
| Transistors per hologram pixel | 3.61 | 0.54 | |
| Total numbers for display | | | |
| Transistors per pixel for writing data into pixels | 2 | 2 | 1..3 | Pixel cell transistor |
| Pixel transistors | 1 | 1 | |
| Total transistors per hologram pixel | 6.61 | 3.54 | |
| Total transistors (Millions) | 1268.8695 | 678.7366875 | |
| Displaysize in inch | 20 | 20 | |
| x-Size in mm | 406.4 | 406.4 | |
| y-Size in mm | 304.8 | 304.8 | |
| Pixel Pitch x in µm | 25.4 | 25.4 | |
| Pixel Pitch y in µm | 25.4 | 25.4 | |
| | 645.16 | 645.16 | |
| | 73.2171748 | 136.876408 | |

FIGURE 22

PRIOR ART

Cluster data path

HOLOGRAPHIC DISPLAY

CROSS-REFERENCE TO RELATED APPLICATIONS

This application is a continuation of U.S. application Ser. No. 15/928,891, filed on Mar. 22, 2018, which is a continuation of U.S. application Ser. No. 15/148,142, filed on May 6, 2016, which is a continuation of U.S. application Ser. No. 12/600,276, filed Nov. 16, 2009, which claims the priority of PCT/EP2008/056026, filed on May 16, 2008, which claims priority to Great Britain Application No. 0709376.8, filed May 16, 2007; Great Britain Application No. 0709379.2, filed May 16, 2007; German Application No. 10 2007 023 737.7, filed May 16, 2007; German Application No. 10 2007 023 740.7, filed May 16, 2007; German Application No. 10 2007 023 785.7, filed May 16, 2007; German Application No. 10 2007 023 739.3, filed May 16, 2007; Great Britain Application No. 0718595.2, filed Sep. 25, 2007; Great Britain Application No. 0718596.0, filed Sep. 25, 2007; Great Britain Application No. 0718598.6, filed Sep. 25, 2007; Great Britain Application No. 0718602.6, filed Sep. 25, 2007; Great Britain Application No. 0718607.5, filed Sep. 25, 2007; Great Britain Application No. 0718614.1, filed Sep. 25, 2007; Great Britain Application No. 0718617.4, filed Sep. 25, 2007; Great Britain Application No. 0718619.0, filed Sep. 25, 2007; Great Britain Application No. 0718622.4, filed Sep. 25, 2007; Great Britain Application No. 0718626.5, filed Sep. 25, 2007; Great Britain Application No. 0718629.9, filed Sep. 25, 2007; Great Britain Application No. 0718632.3, filed Sep. 25, 2007; Great Britain Application No. 0718633.1, filed Sep. 25, 2007; Great Britain Application No. 0718634.9, filed Sep. 25, 2007; Great Britain Application No. 0718636.4, filed Sep. 25, 2007; Great Britain Application No. 0718640.6, filed Sep. 25, 2007; Great Britain Application No. 0718649.7, filed Sep. 25, 2007; Great Britain Application No. 0718654.7, filed Sep. 25, 2007; Great Britain Application No. 0718656.2, filed Sep. 25, 2007; and Great Britain Application No. 0718659.6, filed Sep. 25, 2007, the entire contents of which are hereby incorporated in total by reference.

BACKGROUND OF THE INVENTION

1. Field of the Invention

The invention relates to a holographic display, especially to a holographic display on which computer-generated video holograms (CGHs) are encoded on a spatial light modulator. The holographic display may generate three dimensional holographic reconstructions.

2. Technical Background

Computer-generated video holograms (CGHs) are encoded in one or more spatial light modulators (SLMs); the SLMs may include electrically or optically controllable cells. The cells modulate the amplitude and/or phase of light by encoding hologram values corresponding to a videohologram. The CGH may be calculated e.g. by coherent ray tracing, by simulating the interference between light reflected by the scene and a reference wave, or by Fourier or Fresnel transforms. An ideal SLM would be capable of representing arbitrary complex-valued numbers, i.e. of separately controlling the amplitude and the phase of an incoming light wave. However, a typical SLM controls only one property, either amplitude or phase, with the undesirable side effect of also affecting the other property. There are different ways to modulate the light in amplitude or phase, e.g. electrically addressed liquid crystal SLM, optically addressed liquid crystal SLM, magneto optical SLM, micro mirror devices or acousto-optic modulators. The modulation of the light may be spatially continuous or composed of individually addressable cells, one-dimensionally or two-dimensionally arranged, binary, multi-level or continuous.

In the present document, the term "encoding" denotes the way in which regions of a spatial light modulator are supplied with control values to encode a hologram so that a 3D-scene can be reconstructed from the SLM.

In contrast to purely auto-stereoscopic displays, with video holograms an observer sees an optical reconstruction of a light wave front of a three-dimensional scene. The 3D-scene is reconstructed in a space that stretches between the eyes of an observer and the spatial light modulator (SLM). The SLM can also be encoded with video holograms such that the observer sees objects of a reconstructed three-dimensional scene in front of the SLM and other objects on or behind the SLM.

The cells of the spatial light modulator are preferably transmissive cells which are passed through by light, the rays of which are capable of generating interference at least at a defined position and over a coherence length of a few millimetres or more. This allows holographic reconstruction with an adequate resolution in at least one dimension. This kind of light will be referred to as 'sufficiently coherent light'.

In order to ensure sufficient temporal coherence, the spectrum of the light emitted by the light source must be limited to an adequately narrow wavelength range, i.e. it must be near-monochromatic. The spectral bandwidth of high-brightness light emitting diodes (LEDs) is sufficiently narrow to ensure temporal coherence for holographic reconstruction. The diffraction angle at the SLM is proportional to the wavelength, which means that only a monochromatic source will lead to a sharp reconstruction of object points. A broadened spectrum will lead to broadened object points and smeared object reconstructions. The spectrum of a laser source can be regarded as monochromatic. The spectral line width of a LED is sufficiently narrow to facilitate good reconstructions.

Spatial coherence relates to the lateral extent of the light source. Conventional light sources, like LEDs or Cold Cathode Fluorescent Lamps (CCFLs), can also meet these requirements if they radiate light through an adequately narrow aperture. Light from a laser source can be regarded as emanating from a point source within diffraction limits and, depending on the modal purity, leads to a sharp reconstruction of the object, i.e. each object point is reconstructed as a point within diffraction limits.

Light from a spatially incoherent source is laterally extended and causes a smearing of the reconstructed object. The amount of smearing is given by the broadened size of an object point reconstructed at a given position. In order to use a spatially incoherent source for hologram reconstruction, a trade-off has to be found between brightness and limiting the lateral extent of the source with an aperture. The smaller the light source, the better is its spatial coherence.

A line light source can be considered to be a point light source if seen from a right angle to its longitudinal extension. Light waves can thus propagate coherently in that direction, but incoherently in all other directions.

In general, a hologram reconstructs a scene holographically by coherent superposition of waves in the horizontal and the vertical directions. Such a video hologram is called a full-parallax hologram. The reconstructed object can be viewed with motion parallax in the horizontal and the vertical directions, like a real object. However, a large viewing angle requires high resolution in both the horizontal and the vertical direction of the SLM.

Often, the requirements on the SLM are lessened by restriction to a horizontal-parallax-only (HPO) hologram. The holographic reconstruction takes place only in the horizontal direction, whereas there is no holographic reconstruction in the vertical direction. This results in a reconstructed object with horizontal motion parallax. The perspective view does not change upon vertical motion. A HPO hologram requires less resolution of the SLM in the vertical direction than a full-parallax hologram. A vertical-parallax-only (VPO) hologram is also possible but uncommon. The holographic reconstruction occurs only in the vertical direction and results in a reconstructed object with vertical motion parallax. There is no motion parallax in the horizontal direction. The different perspective views for the left eye and right eye have to be created separately.

Real-time calculation of holograms requires great computational performance, which can be realised presently for example with the help of expensive, specially made hardware with Field Programmable Gate Arrays (FPGAs), full custom ICs, or Application Specific Integrated Circuits (ASICs), or by using multiple central processing units (CPUs) which are capable of parallel processing.

In thin film transistor (TFT) displays, the pixel pitch in orthogonal directions determines the area per pixel. This area is divided into the transparent electrode for liquid crystal (LC) control, the TFT together with the capacitor and the column and row wires. The required frequency on the column wires and the display dimensions define the required profile and thus the width of the row and column wires.

Ideal holographic displays require a much higher resolution than commercially available TFT-based monitor devices provide today. The higher the resolution, the smaller is the pixel pitch, while the frequency on the row and column wires increases due to the higher number of rows. This in turn causes the proportion of the area covered by row and column wires of the entire pixel area to grow superproportionately compared with the increase in resolution. Consequently, there is much less space available for the transparent electrode, so that the transmittance of the display will drop significantly. This means that ideal high-resolution holographic displays with a high refresh rate can only be produced with severe restrictions. Due to the extreme demands made on the computational performance, the hardware which can be used today for real-time calculation of holograms is very expensive, irrespective of which particular type of hardware is used. Because of the great amount of data involved, the transfer of image data from the computing unit to the display is also very difficult.

A common construction of an active matrix liquid crystal display device will be briefly explained, with reference to prior art FIG. 10 taken from U.S. Pat. Nos. 6,153,893; 6,153,893 is incorporated herein in its entirety by reference. As shown in FIG. 10, this active matrix display device has a flat panel structure comprising a main substrate 101, an opposed substrate 102 and a space 103 affixing the main substrate to the opposed substrate, and liquid crystal material is held between the two substrates. On the surface of the main substrate are formed a display part 106 consisting of pixel electrodes 104 and switching devices 105 for driving the pixel electrodes 104 arranged in a matrix, and peripheral driving parts 107 connected to the display part 106. The switching devices 105 consist of thin film transistors. Thin film transistors are also formed in the peripheral parts 107 as circuit elements.

Document WO 2006/066906 filed by the applicant, which is incorporated by reference, describes a method for computing computer-generated video holograms. According to that method, objects with complex amplitude values of a three-dimensional scene are assigned to matrix dots of parallel virtual section layers such that for each section layer an individual object data set is defined with discrete amplitude values in matrix dots, and a holographic encoding for a spatial light modulator of a hologram display is computed from the image data sets.

According to publication WO 2008/025839 of the applicant, which is incorporated by reference, the following steps are carried out aided by a computer:

A diffraction image is computed in the form of a separate two-dimensional distribution of wave fields for an observer plane, which is situated at a finite distance and parallel to the section layers, from each object data set of each tomographic scene section, where the wave fields of all sections are computed for at least one common virtual observer window which is situated in the observer plane near the eyes of an observer, the area of said observer window being reduced compared with the video hologram;

The computed distributions of all section layers are added to define an aggregated wave field for the observer window in a data set which is referenced in relation to the observer plane;

The reference data set is transformed into a hologram plane, which is situated at a finite distance and parallel to the reference plane, so as to create a hologram data set for an aggregated computer-generated hologram of the scene, where the spatial light modulator is disposed in the hologram plane, and where the scene is reconstructed in the space in front of the observer eyes with the help of said spatial light modulator after encoding.

The methods and displays mentioned above are based on the idea not to reconstruct the object of the scene itself, but to reconstruct in one or multiple virtual observer windows the wave front which would be emitted by the object.

The observer can watch the scene through the virtual observer windows. The virtual observer windows cover the pupils of the observer eyes and can be tracked to the actual observer position with the help of known position detection and tracking systems. A virtual, frustum-shaped reconstruction space stretches between the spatial light modulator of the hologram display and the observer windows, where the SLM represents the base and the observer window the top of the frustum. If the observer windows are very small, the frustum can be approximated as a pyramid. The observer looks though the virtual observer windows towards the display and receives in the observer window the wave front which represents the scene. Due to the large number of necessary transformations, the holographic encoding process causes great computational load. Real-time encoding would require costly high-performance computing units.

Filing WO 2008/025839 of the applicant discloses a method which allows one to generate video holograms from three-dimensional image data with depth information in real time. This makes it possible to generate these holograms using relatively simple and inexpensive computing units.

Filing WO 2008/025839 of the applicant discloses a method for generating computer-generated video holograms in real time. Hologram values for the representation of a three-dimensional scene which is structured through object points on a spatial light modulator SLM are encoded based on image data with depth information. In analogy with the prior art solution mentioned above, the method disclosed in WO 2008/025839 is based on the idea not to reconstruct the object of the scene itself, but to reconstruct in one or multiple virtual observer windows the wave front which would be emitted by the object. A modulated wave field is generated from sufficiently coherent light by a spatial light modulator SLM, which is controlled by hologram values, and the desired real or virtual three-dimensional scene is reconstructed through interference in space. Virtual observer windows are generated in frustum-shaped reconstruction spaces with the SLM as a base. The windows are situated near the observer eyes and can be tracked to the actual observer position with the help of known position detection and tracking systems. The method disclosed in WO 2008/025839 is based on the fact that the region in which an observer sees a scene is defined by a frustum-shaped reconstruction space which stretches from the SLM to the observer window. The frustum can be approximated by a pyramid, because the observer window is much smaller than the SLM. Further, the method is based on the principle that the reconstruction of a single object point only requires a sub-hologram as a subset of the SLM. The information about each scene point is thus not distributed across the entire hologram, but is only contained in certain limited regions, the so-called sub-holograms. Following this concept, an individual object point of the scene is only reconstructed by a limited pixel region on the SLM, the so-called sub-hologram. The disclosure of WO 2008/025839 is based on the idea that for each object point the contributions of the sub-holograms to the entire reconstruction of the scene can be retrieved from look-up tables, and that these sub-holograms are accumulated so as to form a total hologram for the reconstruction of the entire scene.

According to a particularly preferred example of the method disclosed in WO 2008/025839, a view of the scene is defined by the position of each observer and their viewing direction. Each observer is assigned with at least one virtual observer window which lies near the observer eyes in an observer plane. In a preparatory process step the scene is discretised three-dimensionally into visible object points. These data may already be taken from an interface. The steps of the process disclosed in WO 2008/025839 are:

Step 1:

Finding the position of the sub-hologram for each object point: the position and extent of the corresponding sub-hologram are derived from the position of an object point, i.e. its lateral x, y coordinates and its depth distance.

Step 2:

Retrieval of the contributions of the corresponding sub-hologram from look-up tables.

Step 3:

Repetition of these two steps for all object points, where the sub-holograms are accumulated so as to form a total hologram for the reconstruction of the entire scene.

According to a simple example disclosed in WO 2008/025839, the size of a sub-hologram which is assigned to an object point is found based on the theorem of intersecting lines. The observer window or a part thereof which covers the pupils is projected through the object point into the hologram plane, i.e. on to the SLM. The indices of the pixels of the sub-hologram which are required to reconstruct this scene point are thus determined.

According to a further aspect of the disclosure of WO 2008/025839, additional corrective functions are applied to the sub-holograms or the total hologram, e.g. in order to compensate SLM tolerances which are caused by its position or shape, or to improve the reconstruction quality. The corrective values are for example added to the data values of the sub-holograms and/or of the total hologram. In addition, because every sub-hologram is defined by the actual position of the observer window, special look-up tables can be generated for more unusual observer windows, for example if the observer looks on the display at a large angle from a side position.

The principle of using look-up tables can preferably be extended, as described in WO 2008/025839. For example, parameter data for colour and brightness information can be stored in separate look-up tables. In addition, data values of the sub-holograms and/or the total hologram can be modulated with brightness and/or colour values from look-up tables. A colour representation is therein based on the idea that the primary colours can be retrieved from respective look-up tables.

The look-up tables on which the method disclosed in WO 2008/025839 is based are preferably generated in accordance with WO 2006/066906 or WO 2006/066919, which are filed by the applicant and are incorporated by reference. The look-up tables are then stored in suitable data carriers and storage media.

FIG. 26A illustrates the general idea of the disclosure of WO 2008/025839 with the example of a single observer. A view of a scene (S) is defined by the position and viewing direction of an observer (O). The observer is assigned with at least one virtual observer window (VOW) which lies near the observer eyes in a reference plane. A modulated wave field is generated from sufficiently coherent light by a spatial light modulator (SLM), which is controlled through hologram values. The method and the display derived from that method are based on the idea not to reconstruct the object of the scene itself, but to reconstruct in one or multiple virtual observer windows (VOW) the wave front which would be emitted by the object. In FIG. 26A, the object is represented by a single object point (PP). The observer (O) can watch the scene (S) through the virtual observer windows (VOW). The virtual observer windows (VOW) cover the eye pupils of the observer (O) and can be tracked to the actual observer position with the help of known position detection and tracking systems. Controlling the spatial light modulator (SLM) with the hologram values of the video holograms thereby causes the wave field, which is modulated in pixels and emitted from the display screen, to reconstruct the three-dimensional scene as desired by generating interference in the reconstruction space. As can be seen from FIG. 26A, according to the general principle of this implementation, a single object point (PP) of the scene (S) is only reconstructed by a limited pixel region on the spatial light modulator (SLM), the so-called sub-hologram (SH). As can be seen in FIG. 26A, according to a most simple solution, the size of a sub-hologram (SH) are defined based on the theorem of intersecting lines, whereby then the indices of the pixels required for the reconstruction of this object point (OP) are found. The position and extent of the sub-hologram (SH) are derived from the position of an object point (PP), i.e. its lateral x, y coordinates and its depth distance or z distance. Then, the hologram values required to reconstruct this point (PP) are now retrieved from the look-up table LUT.

The sub-hologram (SH) is modulated with a brightness and/or colour value and then accumulated into the hologram plane at the respective position so as to form a so-called total hologram. The data contained in the above-mentioned look-up tables are generated in advance. The data are preferably generated using the method described in WO 2006/066906, as cited in the prior art section above, and stored in suitable data carriers and storage media. With the help of the position and properties of the object points, the corresponding sub-holograms are computed in advance and the look-up tables of the sub-holograms, colour and brightness values and the corrective parameters are thus generated.

FIG. 26B illustrates this principle in more detail and shows the sub-holograms (SH1, SH2), which are assigned to the object points (P1, P2), respectively. It can be seen in FIG. 26B that these sub-holograms are limited and form a small and contiguous subset of the total hologram, i.e. the entire spatial light modulator (SLM). In addition to the position and extent of the sub-holograms which are determined based on the theorem of intersecting lines, as can be seen in FIG. 26, further functional relations are possible.

3. Discussion of Related Art

WO 2004/044659 (US2006/0055994) and U.S. Pat. No. 7,315,408B2, filed by the applicant, and incorporated herein in their entirety by reference, describe a device for reconstructing three-dimensional scenes by way of diffraction of sufficiently coherent light; the device includes a point light source or line light source, a lens for focusing the light and a spatial light modulator. In contrast to conventional holographic displays, the SLM in transmission mode reconstructs a 3D-scene in at least one 'virtual observer window' (see Appendix I and II for a discussion of this term and the related technology). Each virtual observer window is situated near the observer's eyes and is restricted in size so that the virtual observer windows are situated in a single diffraction order, so that each eye sees the complete reconstruction of the three-dimensional scene in a frustum-shaped reconstruction space, which stretches between the SLM surface and the virtual observer window. To allow a holographic reconstruction free of disturbance, the virtual observer window size must not exceed the periodicity interval of one diffraction order of the reconstruction. However, it must be at least large enough to enable a viewer to see the entire reconstruction of the 3D-scene through the window(s). The other eye can see through the same virtual observer window, or is assigned a second virtual observer window, which is accordingly created by a second light source. Here, a visibility region, which would typically be rather large, is limited to the locally positioned virtual observer windows. The known solution reconstructs in a diminutive fashion the large area resulting from a high resolution of a conventional SLM surface, reducing it to the size of the virtual observer windows. This leads to the effect that the diffraction angles, which are small due to geometrical reasons, and the resolution of current generation SLMs are sufficient to achieve a high-quality real-time holographic reconstruction using reasonable, consumer level computing equipment.

A mobile phone which generates a three dimensional image is disclosed in US2004/0223049, which is incorporated herein in its entirety by reference. However, the three dimensional image disclosed therein is generated using autostereoscopy. One problem with autostereoscopically generated three dimensional images is that typically the viewer perceives the image to be inside the display, whereas the viewer's eyes tend to focus on the surface of the display. This disparity between where the viewer's eyes focus and the perceived position of the three dimensional image leads to viewer discomfort after some time in many cases. This problem does not occur, or is significantly reduced, in the case of three dimensional images generated by holography.

SUMMARY OF THE INVENTION

A holographic display is provided including a spatial light modulator (SLM) with pixels, the SLM pixels being on a substrate, the SLM including circuitry which is on the same substrate as the SLM pixels, the circuitry operable to perform calculations which provide an encoding of the SLM.

The holographic display may be such that the calculations performed to provide the encoding of the SLM are performed using circuitry which is between the pixels of the SLM.

The holographic display may be such that hologram encoding data is calculated outside a space occupied by the pixels, the hologram encoding data is then compressed using known data compression techniques, and is then transmitted to the circuitry on the SLM substrate, the circuitry then performing a function of decompressing the data which has been received.

The holographic display may be such that real space image data used in a holographic calculation is a difference between successive real space image frames, and holographic display data is sent to holographic display clusters as sub-hologram difference data and display memory location data.

The holographic display may be such that eye tracking is implemented.

The holographic display may be such that the calculations performed to provide the encoding of the SLM determine a holographic encoding of the SLM.

The holographic display may be such that a lens optical aberration effect can be reduced by correcting dynamically through the encoding of the spatial light modulator.

The holographic display may be such that speckle correction is implemented.

The holographic display may be such that pixel encoding calculations are performed in discrete areas of the SLM, to provide pixel encoding of the corresponding discrete areas, on a discrete area by discrete area basis.

The holographic display may be such that holographic calculations do not involve a calculation of a Fourier transform or of a Fresnel transform.

The holographic display may be such that a 3D rendering pipeline of graphics sub-systems incorporates additional processing units for holographic transformation and encoding.

The holographic display may be such that sequential holographic transformation of points in three-dimensional space is performed by way of extending a 3D pipeline of graphics cards with a holographic calculation pipeline.

The holographic display may be such that it is ensured that object points closer to a virtual observer window mask object points further away from the virtual observer window, along a same line of sight.

The holographic display may be such that graphics card functionalities are implemented using circuitry on the same substrate as the pixels of the SLM.

The holographic display may be such that 2D-3D image conversion is implemented.

The holographic display may be such that compensation is applied to holographic image data at or before encoding on the SLM, to provide an image which is easier to view.

The holographic display may be such that decryption and hologram calculation are executed using circuitry which is on the substrate of the pixels of the SLM.

The holographic display may be such that the circuitry includes thin film transistors.

The holographic display may be such that active regions of at least some of the circuitry consists of polycrystalline Si.

The holographic display may be such that active regions of at least some of the circuitry consists of continuous grain Si.

The holographic display may be such that active regions of at least some of the circuitry consists of polycrystalline SiGe.

The holographic display may be such that active regions of at least some of the circuitry consists of monocrystalline Si.

The holographic display may be such that active regions of at least some of the circuitry consists of single grain Si.

The holographic display may be such that active regions of at least some of the circuitry consists of organic semiconductors.

The holographic display may be such that the substrate is monocrystalline Si.

The holographic display may be such that the display is fabricated using liquid crystal on silicon technology.

The holographic display may be such that the display is fabricated using MEMS technology.

The holographic display may be such that the display is fabricated using field emission display technology.

The holographic display may be such that the substrate is glass.

The holographic display may be such that only real space image data is transmitted to the display.

The holographic display may be such that a video frame rate is at least about 25 Hz.

The holographic display may be such that holographic image data consists of intensity and depth map data.

The holographic display may be such that the calculations are holographic calculations.

The holographic display may be such that the holographic calculations are performed in real time or in quasi real time.

The holographic display may be such that the holographic calculations are performed using a look-up table approach.

The holographic display may be such that sub-holograms are used for computation.

The holographic display may be such that data for adding the sub holograms is exchanged over a distance of a sub-hologram dimension.

The holographic display may be such that the holographic calculations are spread homogeneously over the circuitry on the SLM substrate.

The holographic display may be such that the holographic calculations are split into small identical parts called clusters tiled over the SLM substrate.

The holographic display may be such that data for adding sub holograms is exchanged over a distance of a cluster dimension.

The holographic display may be such that the holographic display can be built up through tiling identical clusters together.

The holographic display may be such that the holographic display is a high resolution display.

The holographic display may be such that the holographic display is a very high resolution display.

The holographic display may be such that a virtual observer window is an eye pupil diameter or more across.

The holographic display may be such that the virtual observer window is one cm or more across.

The holographic display may be such that one depth map and intensity map pair is constructed for each eye i.e. for each virtual observer window.

The holographic display may be such that monochrome images are displayed.

The holographic display may be such that colour images are displayed.

The holographic display may be such that the colour images displayed are in RGB format.

The holographic display may be such that in order to calculate a value of the pixel of a hologram, only values of a sub-section of an original image are considered.

The holographic display may be such that light used for a holographic reconstruction is not fully coherent across the entire display, but rather coherence exists within sub-sections of the display.

The holographic display may be such that fewer wires are sufficient for a transfer of original image data than for a transmission of hologram data.

The holographic display may be such that reducing a data transmission frequency has a benefit of reducing power dissipation in row and column drivers.

The holographic display may be such that a large proportion of the pixel area which was required in prior art solutions for column and row wires can be used for other purposes.

The holographic display may be such that a transparent electrode area can be increased and thus a transmittance of the display can be improved.

The holographic display may be such that a display panel can be controlled using conventional display technologies.

The holographic display may be such that a holographic transformation is a one dimensional transformation.

The holographic display may be such that a holographic transformation is a two dimensional transformation.

The holographic display may be such that an additional logic for local forwarding of calculated data exists, and the additional logic is co-used for forwarding an original image to clusters, so that at least some global row and column wires are eliminated.

The holographic display may be such that redundant circuitry, such as TFTs, is manufactured in a space of the pixels so that some redundant circuitry is used to replace circuitry used at device start up, where circuitry used at device start up is found to have failed.

A method is provided of generating a holographic reconstruction of a three dimensional scene, made up of multiple discrete points, using a holographic display according to the invention, the display including a light source and an optical system to illuminate the spatial light modulator; comprising the step of:

encoding a hologram on the spatial light modulator.

BRIEF DESCRIPTION OF THE DRAWINGS

FIG. 21 is a part of a spreadsheet in which is calculated the number of transistors in a holographic display of an implementation.

FIG. 22 is the remainder of the part of the spreadsheet in FIG. 21.

DETAILED DESCRIPTION

A. Hologram Display with Calculation on the Same Substrate as the Pixels

An implementation includes a display which receives real space image data, such as an intensity map and a depth map corresponding to a three dimensional image. The holographic encoding of the spatial light modulator is then calculated in real time or in quasi real time based on the three dimensional image data. At least some of the hologram calculations may be performed in the physical space in which the pixel matrix exists, by combining two functional units, namely the hologram calculation unit and the hologram display unit, which are separate functionally and spatially in prior art devices, so as to form a common unit which is implemented on one substrate. This means that transistors for at least some of the hologram calculation may be integrated between, or next to, the transistors used for pixel control. Alternatively, all the hologram calculations may be performed in the physical space in which the pixel matrix exists, by combining two functional units, namely the hologram calculation unit and the hologram display unit, which are separate functionally and spatially in prior art devices, so as to form a common unit which is implemented on one substrate. Alternatively, some or all of the transistors for the hologram calculation may be outside the pixel matrix, but on the same substrate as the transistors used for pixel control. It should be clear to those skilled in the art that by the term "on the same substrate" it is not meant that the transistors can only be in atomic level contact with the substrate, but rather that the substrate generally provides the physically supporting medium on which the circuitry is disposed. Further information on the meaning of "substrate" is given in the section entitled "SUBSTRATE".

Figure 24:
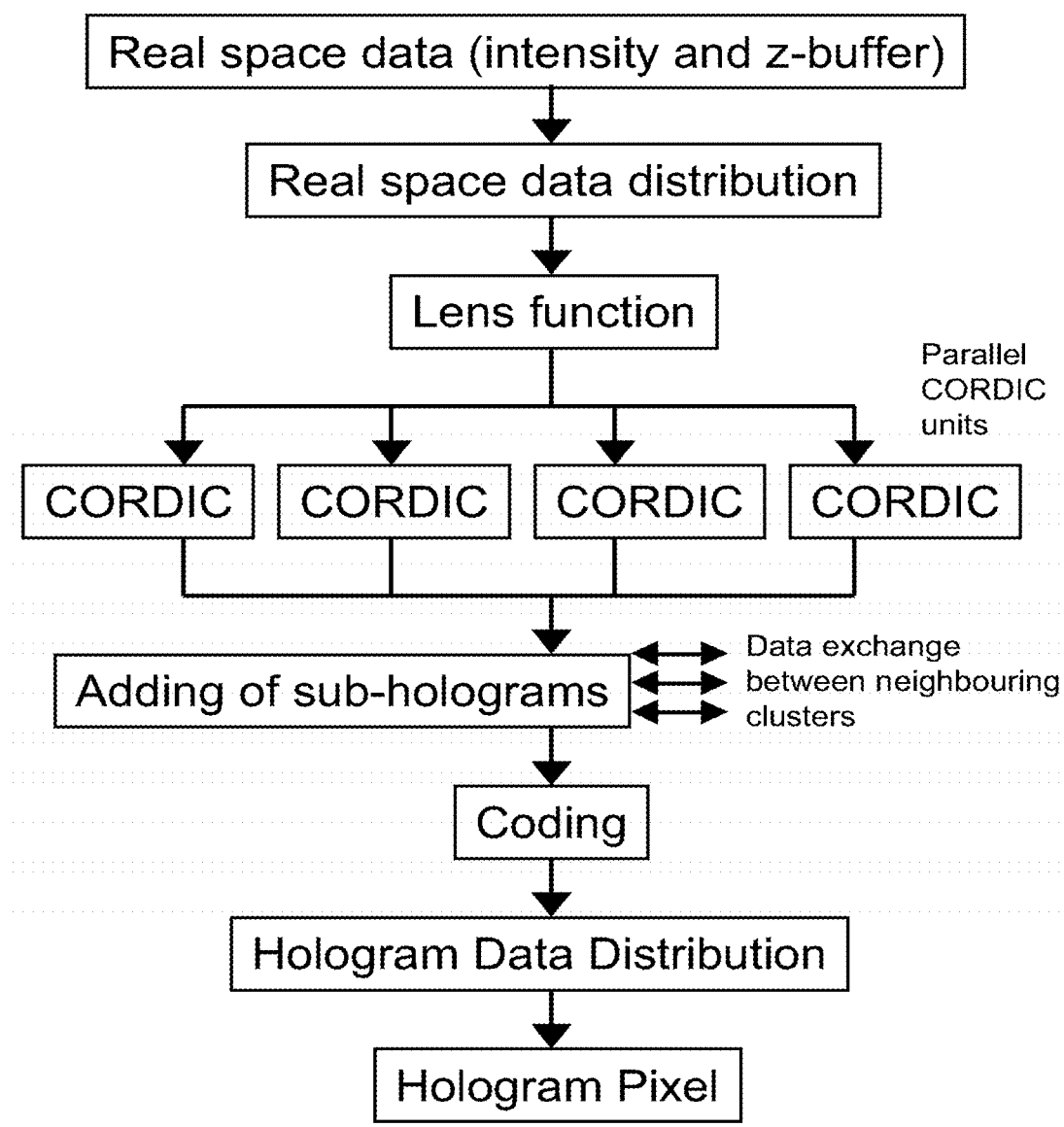
FIG. 24 is a diagram of the paths taken by display data according to a holographic display device of an implementation.

The calculation of holograms in the pixel matrix, or elsewhere on the same substrate, is not limited to the analytical hologram calculation methods described in the prior art. Other types of calculation method such as look-up table (LUT) approaches are also possible. An analytical calculation method may be used as an example to demonstrate the calculation method. For the calculation of holograms in the pixel matrix, the holographic computation method may be identical over the whole display and it is preferred to exchange data for adding the sub holograms over the distance of about a sub-hologram dimension. Sub-holograms are used for computation. It is possible to spread the computation homogeneously over the whole display surface. But to ease hardware design, simulation and verification it is possible to divide the computation into small identical parts called clusters tiled over the display surface. The tiles need not be rectangular and other structures like tiled hexagons ("honeycomb") are also possible. The name "cluster" is used for a computation unit which covers part of, or the whole of, the hologram computation data path. So a cluster can be the smallest unit able to compute the hologram data for a tile of the display from a section of original real space data. These clusters preferably exchange data between neighbouring units, so that where sub-holograms from neighbouring units overlap, the SLM can be correctly encoded. This is shown schematically in FIG. 24. One advantage of the cluster approach is after the cluster is designed, the holographic display can be built up easily through tiling identical clusters together.

Figure 1:
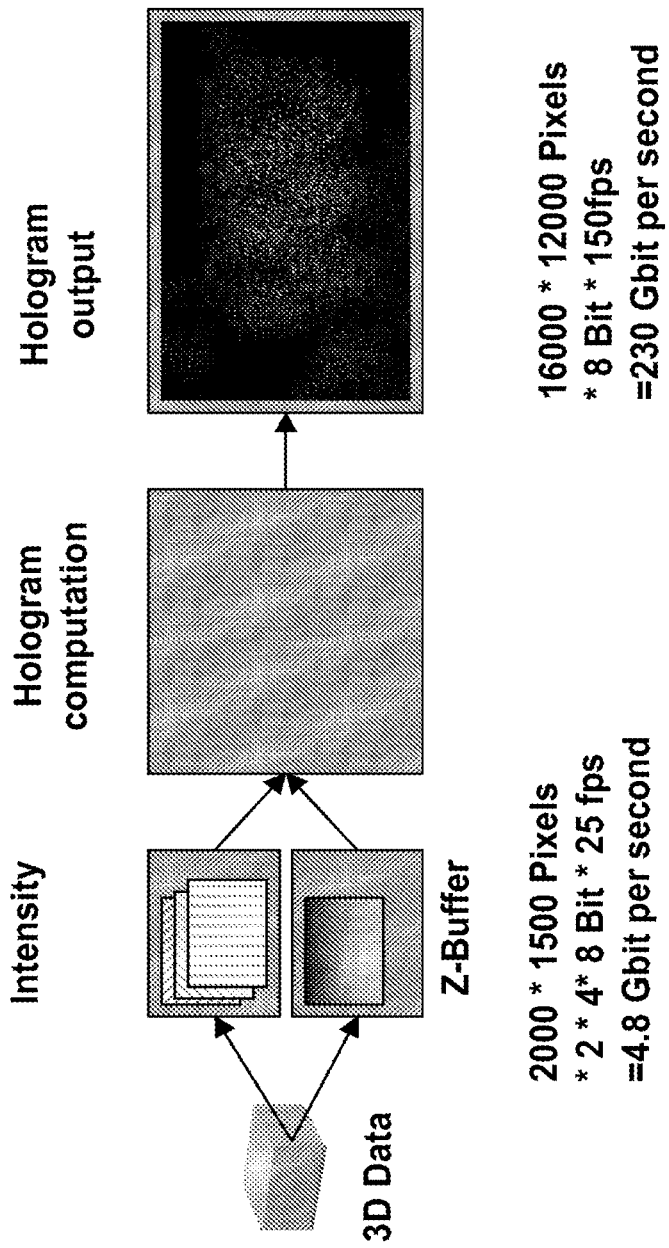
FIG. 1 is a diagram which shows that the data rate of the hologram is much higher than the data rate of the original real space data.

Ideally, very high resolutions, e.g. 16,000×12,000 pixels, are required to display holograms with very high image quality, or with a virtual observer window which is the order of one or more cm across rather than a few mm across, or both. The image content to be displayed, comprising an intensity image and three-dimensional depth information (which can be referred to as a "Z buffer"), typically have a resolution of up to 2,000×1,500 pixels only. As shown in FIG. 1, the data rate required to display the hologram is much higher than the data rate required to display the original data, e.g. by a factor of 48 with the example values given. In FIG. 1, three dimensional image data is supplied in the form of an intensity map and a three dimensional depth map. Preferably one depth map and intensity map pair should be constructed for each eye i.e. for each virtual observer window. Each of these maps consists of a data array of 2,000×1,500 pixels. The data for each pixel in each map is represented by three colours and one z-value, i.e. four values, of eight bits each. A bit is a binary digit. So 32 bits per pixel are needed. Video data is provided at 25 Hz, or 25 frames per second (fps). Using two views (right eye and left eye) the data rate is 4.8 Gbits per second, as shown. This data is used to calculate the hologram, on a frame-by-frame basis in a simple case, although some data processing involving successive frames may be performed in more sophisticated examples, for example, such as to smooth noise or to reduce artefacts, or to reduce the required data transmission rate, for example. The hologram computation produces data output corresponding to a data array of 16,000×12,000 pixels, where each pixel is represented by eight bits, and the frame rate is 150 fps, using a 25 Hz video rate and two views and three colours. Hence the data rate for the hologram is 230 Gbits per second, as shown. The contents of FIG. 1 represent the process in which the three primary colours red, green and blue are displayed. This example relates to a single user configuration, but multi user configurations, with correspondingly higher display frame rates, are also possible. Many other examples of data rates in holographic displays will be obvious to those skilled in the art.

It should be emphasized that a frame rate of about 25 Hz is the minimum acceptable rate for moving images. A frame rate higher than 25 Hz should be used for a smoother playback. The higher the frame rate, the smoother the playback will appear to the viewer.

A hologram can only be calculated for a given display optical wavelength. This is why the calculation is performed three times for each object point, i.e. once for each component colour, eg. red, green and blue. Other colours can be created by utilizing the three colour components, and this colour mixing can be realised either sequentially or simultaneously.

If the hologram is generated in circuitry on the same substrate, e.g. in the pixel matrix, only the original image data need be transmitted to the display substrate. Where the hologram is generated using circuitry in the pixel matrix, the intensity and depth information are transported to those positions in the panel where they will be needed later for hologram calculation. In the preferred display of an implementation, in order to calculate the value of a pixel of the hologram, only values of a sub-section of the original image will be considered. One reason for this is that in the preferred display of an implementation, the light used for the reconstruction is not fully coherent across the entire display, but rather coherence exists within sub-sections of the display, which may be small sub-sections of the display. Coherence does not exist, or exists only to a limited extent, from one sub-section of the display with respect to a different sub-section of the display. Each sub-section of the preferred display may be used to generate a corresponding sub-hologram of the whole hologram. The dimensions of a sub-hologram thus define the maximum extension of the region around a pixel from which intensity and depth values of the original image are required for calculation of the sub-hologram. This in turn defines the lengths of the necessary internal wires, the so-called "local interconnections": see FIG. 3. Because, according to this solution, all or at least some of the large amount of pixel data required to generate the hologram is calculated directly at those areas on the display panel where they will be displayed, there is no need, or the need is reduced, for transfer of holographic display data through long wires or for intermediate storage of data. This will reduce the resolution of the data to be sent to the display panel and thus it will reduce the data rate to be sent to the display panel. If the example is applied to the situation shown in FIG. 1, a reduction by a factor of about 50 in the data transmission rate is achieved. Consequently, the number of row and column wires which run across the entire panel, the so-called "global interconnections", cf. FIG. 3, will be reduced correspondingly. Fewer wires will be sufficient for the transfer of original image data than for the transmission of hologram data, and the transmission frequency can be reduced correspondingly, which has the additional benefit of cutting the electrical power dissipation in the row and column drivers.

Reducing the data transmission frequency has the benefit of reducing the power dissipation in the row and column drivers. This is because switching a binary digit from zero to one, or vice versa, requires electrical power. As the switching rate rises, the electrical power requirement rises. The power is eventually dissipated as heat, which may lead to thermal problems in high data transmission frequency displays. Thermal problems may include components becoming dangerously hot to the touch, cracking and failure in electronic components as a result of thermally induced stress, unwanted chemical reactions such as oxidation of electronic components, degradation of the quality of liquid crystal material as a result of exposure to extreme temperatures, and changes to the behaviour of semiconductor materials, such as thermal carrier generation, as the result of elevated temperatures. If the device runs on batteries, these will discharge more quickly if more power is drawn from them, which will reduce the time the device can be used between battery charging.

Figure 2:
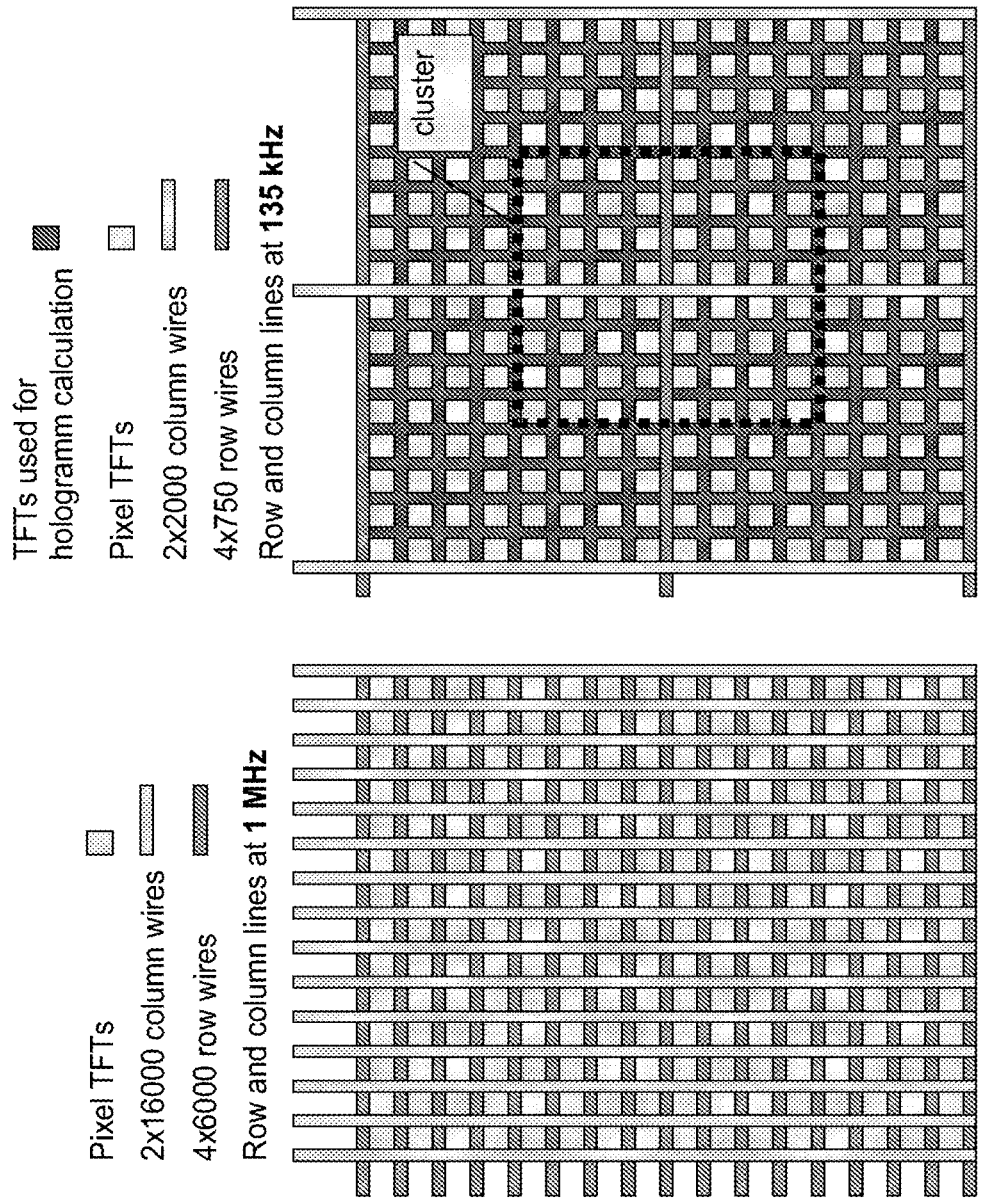
FIG. 2 is a diagram which compares the structure and performance characteristics of a portion of a prior art SLM with a portion of a SLM in which holographic calculation may be performed in the space of the pixel matrix.
Figure 28:
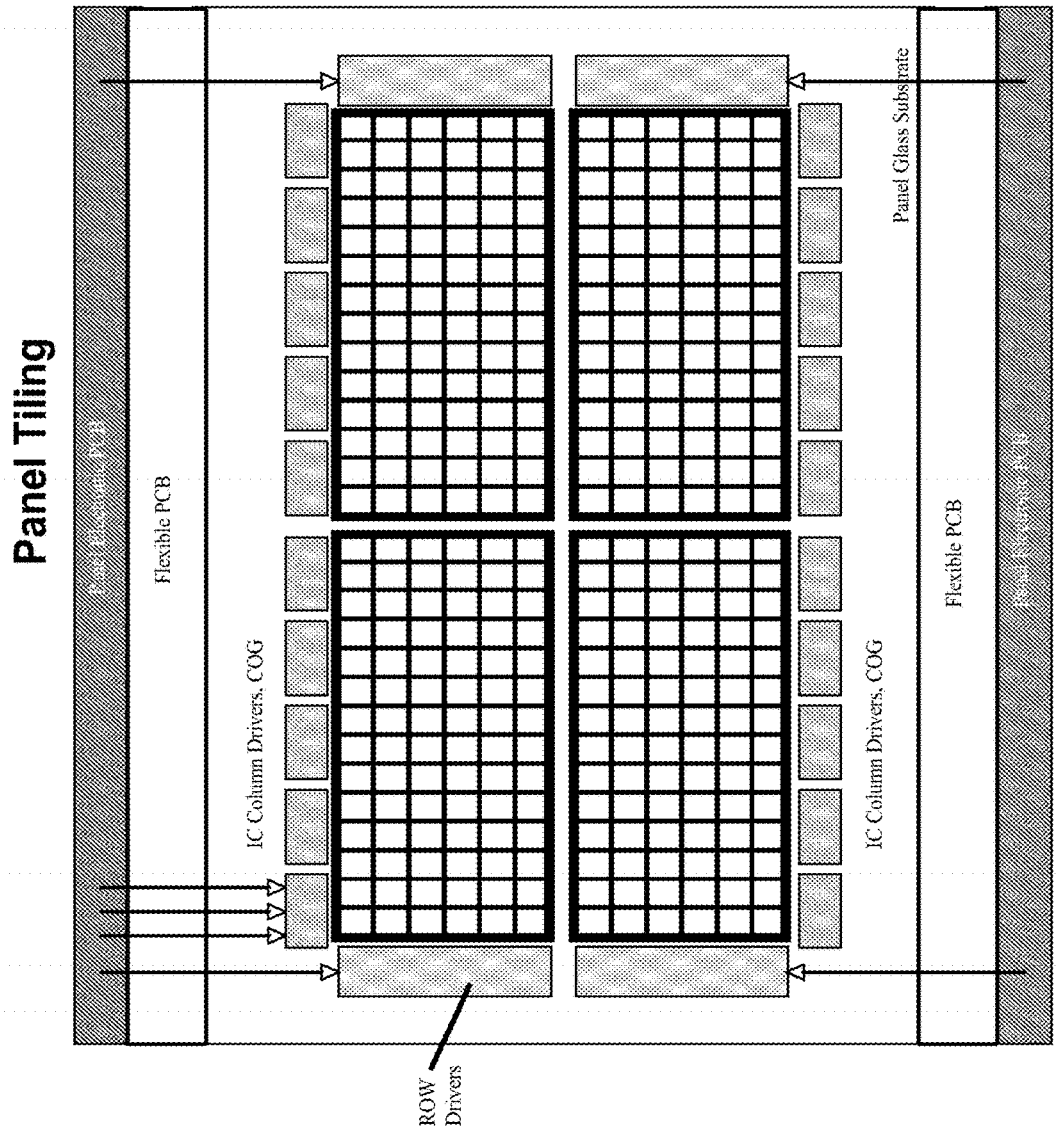
FIG. 28 is a diagram of panel tiling according to an implementation.

The large proportion of the area per pixel which was required in prior art solutions for column and row wires can now be used for other purposes. FIG. 2 compares the working principles of the two solutions. In the solution based on the prior art, a high resolution holographic display with 16,000×12,000 pixels is considered. To shorten the row and column lines the display is tiled into 4 quadrants, as shown for example in FIG. 28. Each quadrant has 8,000 column wires and 6,000 row wires. In total, 32,000 column wires and 24,000 row wires are needed. For one user the two views (right and left) with three component colours (eg. R, G, B) each at 25 fps video rate (the frame rate of the input data—intensity and z-buffer) result in a display frame rate of 150 images per second. Multiplying by the row numbers and adding 10% for blank transmission time between frames, a 1 MHz column driving frequency is required. In an example of a solution according to an implementation, image data is supplied according to a real image pixel array of 2,000×1,500 pixels. If the display is also tiled into 4 quadrants, each quadrant has 750 row wires. Multiplying this by 150 images per second and adding 20% for blank transmission time between frames, only a 135 kHz column driving frequency is needed, as indicated. This example relates to a single user configuration, but multi user configurations, with correspondingly higher display frame rates, are also possible.

Depending on the panel and calculation parameters, the space saving in row and column wires which may be omitted in the solution according to the implementation of FIG. 2, when compared to the solution according to the prior art of FIG. 2, may be greater than the space needed for circuitry for hologram calculation, so that only a part of the saved space will be needed for the transistors used for hologram calculation. In this case, the area of the transparent electrode can be increased and thus the transmittance of the LCD can be improved. Because the calculation is carried out in the saved pixel area, an additional calculation unit which is not on the same substrate as the display, and which would cause considerable difficulties and costs in any known conventional device, becomes redundant. Another advantage is the fact that complexity of the panel control is reduced greatly, because the data rate for panel control is about the same as with conventional LCDs. The data rate of 4.8 Gbit/s for an exemplary resolution of 2,000×1,500 pixels at 25 fps and two views with 32 bits per pixel is about the same as that for a TFT panel with 1,920×1,600 pixels with a 60 Hz frame rate and with three 8 bit colours. This example relates to a single user configuration, but multi user configurations, with correspondingly higher display frame rates, are also possible. This means that such a panel can be controlled easily with conventional display technologies, whereas the transmission of the entire hologram with the exemplary data transfer rate of 230 Gbits/s of FIG. 1, both between the calculation unit and display electronics, and between display electronics and the display panel would only be feasible using special solutions which would be difficult to implement and would also be very expensive, as would be appreciated by one skilled in the art.

If we consider the two-dimensional encoding of a hologram on a spatial light modulator, where the original real space image has 2,000×1,500 pixels and is supplied at a video frame rate of 25 fps, about 100 million transistors would be needed roughly for the holographic calculation i.e. about 34 transistors per real space pixel. This is for monocrystalline Si circuitry, with a switching frequency of 200 MHz. Because a TFT made of polycrystalline Si may have a switching frequency of only about 25 MHz, about 690 million transistors, instead of 100 million transistors, would be necessary to compensate for the lower switching speed. Given a hologram resolution of 16,000×12,000 pixels, this would mean about 4 transistors per hologram pixel. Because the calculated values can only be written to the pixel cell when a new image is to be displayed, an additional 1 or 2 transistors would be required per pixel. The larger the dimensions of a display while keeping the same resolution, the larger will be the pixel pitch and thus the larger will be the number of transistors which can be additionally arranged around a pixel. A more detailed estimation of transistor count is given in the ESTIMATION OF TRANSISTOR COUNT section.

If the panel is controlled via row and column wires, these wires should be wider the larger the display. This is because for fixed wire material electrical resistivity, and for fixed wire cross sectional area, the wire's electrical resistance is proportional to its length; for fixed wire material electrical resistivity, and for fixed wire length and thickness, the wire's electrical resistance is inversely proportional to its width. This means that the method of calculating the hologram in the pixel matrix is advantageous with respect to classic control technologies in particular with large and high-resolution holographic displays.

An integration as TFT transistors has the great advantage that the transistors for calculation are applied on to the substrate together with the pixel transistors.

Additional costs would only be incurred insofar as the increased number of transistors may result in a greater failure probability. This could be compensated by using a fault-tolerant calculation method, where faults in individual elements would only cause small deviations from the calculation result that would be obtained if no components were defective.

Figure 3:
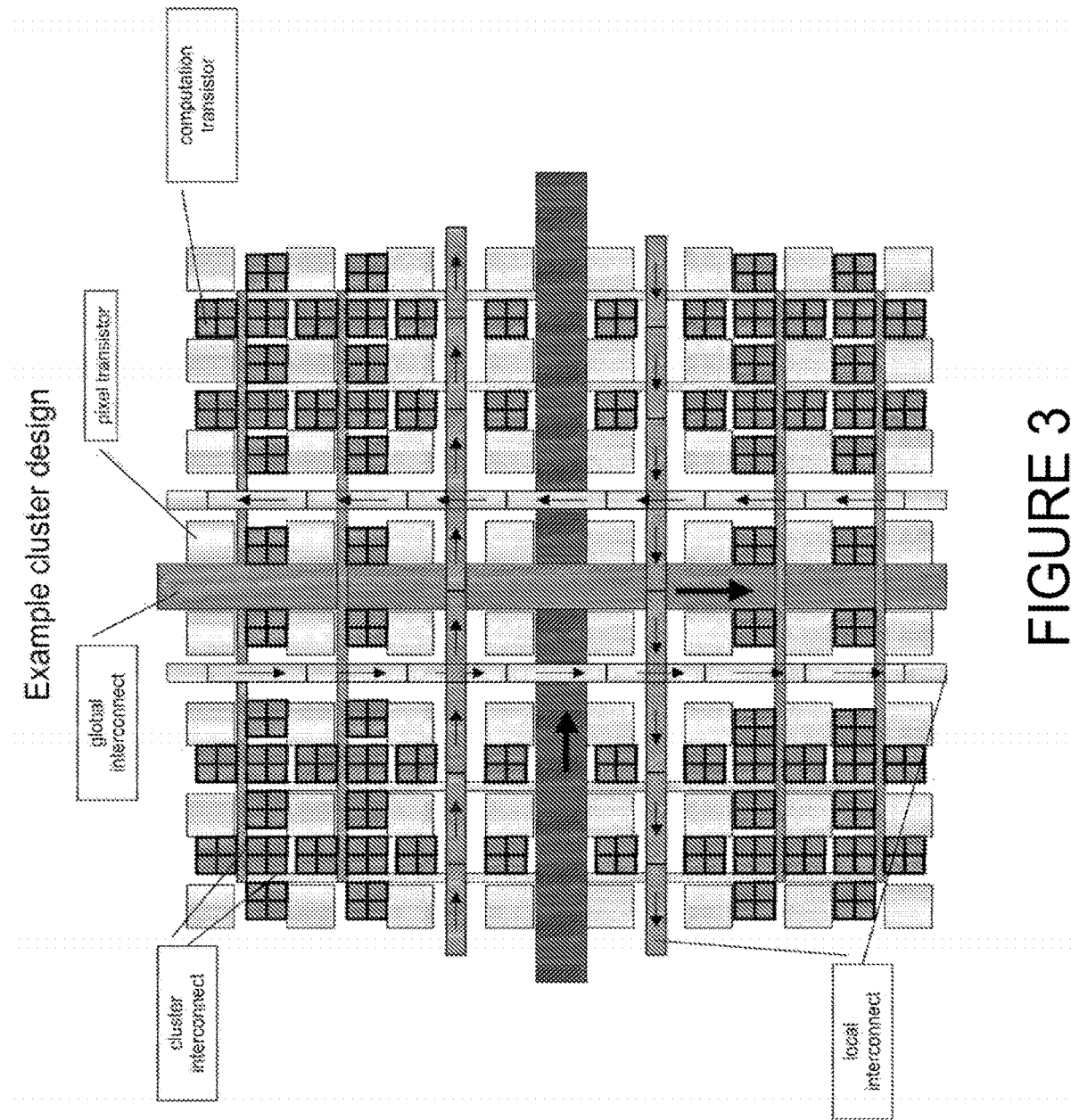
FIG. 3 is a diagram of the structure of a portion of a SLM in which holographic calculation may be performed in the space of the pixel matrix.

The calculation would be conducted in many neighboring computing units called clusters in FIGS. 2 and 3. Generally, the size of the computing units (clusters) is to be optimised, because the greater their size the smaller the saving in the data transfer rate on the one hand, but the easier the realisation of the calculations on the other.

In a further example of an implementation, a display is used to display holographic image data which has been computed based on real space data such as intensity map and depth map data. An inherent problem with displays of the prior art is that they require circuitry which is not implemented on the same substrate as the display circuitry. This additional circuitry must be implemented on a separate substrate to the display substrate. This leads to undesirable properties such as greater device volume and weight. Consumers are constantly demanding display devices which are smaller, slimmer, or lighter. The holographic display of an implementation has computational circuitry which is on the same substrate as the display circuitry. The computational circuitry may be between the pixels of the display, or it may be outside the pixel array of the display, but still on the same substrate.

Notes on the Integration in Liquid Crystal on Si (LCoS) Displays

Things are somewhat different with small LCoS displays, which are applied to a mono-crystalline silicon wafer. Much higher frequencies are possible with this display technology, so that maybe even less than one transistor per pixel will be sufficient for the holographic calculation. Generally, the calculation could largely be the same as the discrete calculation, the computing units would only be interrupted by the pixel cells. Because the Si area needed for calculation remains the same, savings may be achieved here by the fact that smaller amounts of data will be transferred or stored only. This reduces the area required for row and column wires and facilitates the transfer of data to the LCoS. However, the computational circuitry could be on the same substrate as the display circuitry, with the computational circuitry not being located within the display circuitry, as the solution would be more compact and cheaper than if the computational circuitry were on a different substrate to the display circuitry.

Local Forwarding

Because an additional logic for local forwarding of calculated data already exists, it can also be co-used for forwarding the original image to the respective regions, so that global row and column wires become superfluous entirely. The original data would for example be forwarded from cluster to cluster using a shift register. Because the row control is carried out locally, the omission of row wires makes it possible also for the right and left hand side of the display to be used for writing information.

Fault-Tolerant Computing Units

Already with normal TFT displays which have a resolution of for example 1,600×1,200 pixels, there can be manufacturing errors, which become apparent as pixel errors. High-resolution displays in holography have a much higher number of pixels and thus a much higher number of TFTs, which increases the probability of pixel errors greatly. If additional TFTs are integrated for calculation, the error rate will rise again. This makes it necessary to design the calculation process such that errors in single faulty TFTs do not propagate through the entire display, but only cause small local deviations from ideal performance.

It may be possible that some manufacturing errors lead to consequences that are not visible to the viewer, or are only marginally perceivable by the human vision system. In this case one may tolerate such defects. But for example a completely damaged cluster is intolerable, since a lot of SLM cells are affected in such an instance.

Redundant circuitry, such as TFTs, may be manufactured in the space of the pixel matrix so that such circuitry can be used to replace some of the circuitry used at device start up, if some of the circuitry used at device start up is found to have failed. A device may self-test from time-to-time, such by testing if the switching characteristics of a piece of circuitry indicates circuitry malfunction or not. Malfunctioning circuitry may be recorded in memory, such as non-volatile memory, as being unusable, and other circuitry recorded as being used in its place. A similar approach has been reported for fault-tolerant conventional computer circuitry in "Physics and the Information Revolution" J. Birnbaum and R. S. Williams, Physics Today, January 2000, pp. 38-42, which is incorporated herein by reference. Alternatively, the circuitry may be designed such that the probability of failure resulting in a permanently dark pixel is greater than the probability of failure resulting in a permanently bright pixel, as the latter is more irritating for the viewer.

For optimized error tolerance design, at the more important places within the circuitry larger component-size transistors, especially with larger lateral sizes, may be implemented to reduce the probability of failure of the more important parts of the circuitry. A further approach is to mix the calculation pipelines so that results of a defective unit are distributed over a larger surface area. This may be understood if one appreciates that to calculate the value of a hologram pixel about 1000 or more values may be added. If these values all came from the same pipeline, the hologram pixel value will be a completely wrong value if this pipeline fails. If a cluster consists of parallel pipelines, the internal cluster structure can be arranged in a way that the values for adding come from all the parallel pipelines. If the values come from for instance 4 pipelines, then if one pipeline fails only 25% of the input values will be incorrect. In this instance, the calculated hologram pixel value will be more accurate than if 100% of the input values were incorrect.

A "subsequent repair" strategy may be used in some cases. In such cases, one identifies the failed units during the test phase of the display and one then modifies the circuitry by physically cutting the relevant conducting lines. Such an approach may resolve short circuits. The cut connections may ensure that the most undesirable pixel failures (eg. pixels shining constantly with high intensity) can be improved by simply switching them off, leaving them dark.

For devices according to implementations, the devices may be manufactured according to the OUTLINE MANUFACTURING PROCESSES given below, or some combination thereof, or according to other manufacturing processes that are obvious to those skilled in the art. Organic semiconductors may also be used to manufacture the circuitry within devices of implementations.

Figure 14:
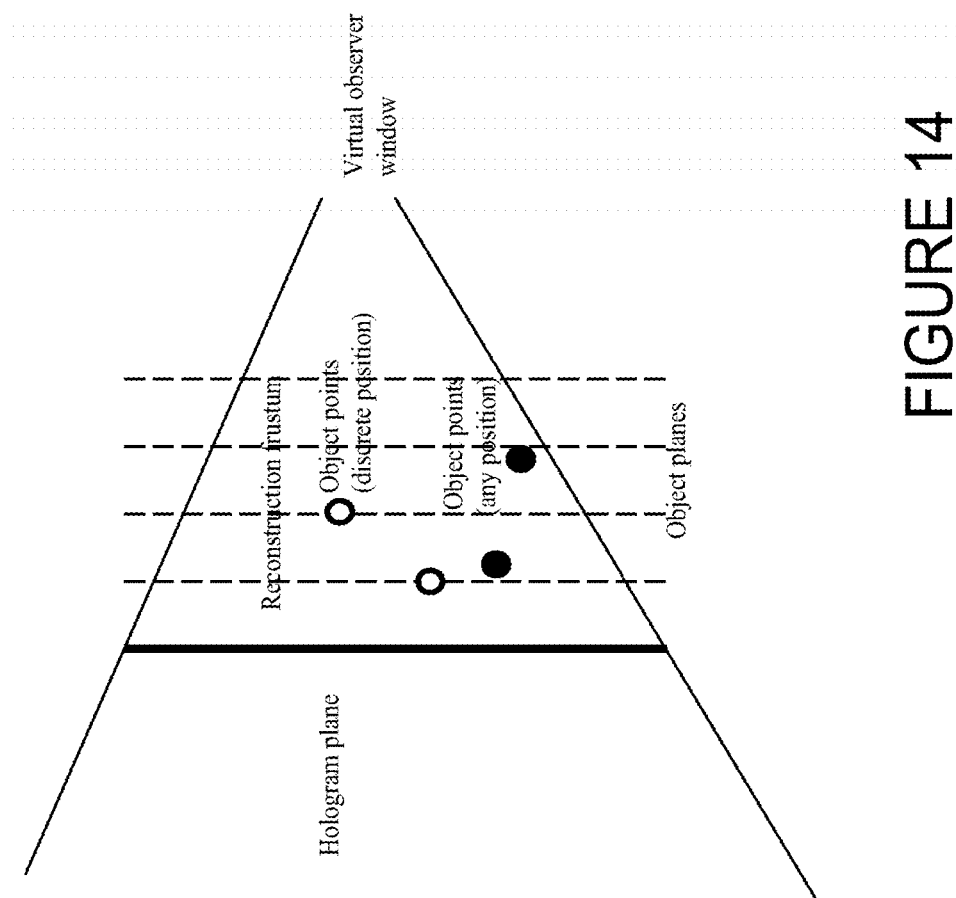
FIG. 14 is a diagram of a holographic display with representation of object points at discrete and at arbitrary positions.

B. Hologram Display with Calculation on the Same Substrate, with Efficient Calculation of the Encoding for the Spatial Light Modulator Known methods for the transformation of three-dimensional content for the representation of large computer-generated holograms (CGH) for reconstructions which vary in real-time or in quasi real-time could only be realised with great efforts as regards computational resources. In an improvement described in the prior art patent application "Method for generating computer-generated video holograms in real time with the help of LUTs", publication no. WO 2008/025839, interactive real-time holograms with 1920×1080 reconstructed object points can be displayed interactively in real-time with commercially available personal computer (PC) systems using pre-calculated sub-holograms and with the help of look-up tables (LUTs). The prior art method is characterised in that the object points can only be reconstructed at certain discrete positions, as shown in FIG. 14 by the open circles. The method of an implementation described here circumvents this restriction in that the object points can be generated at any position within the reconstruction frustum, as shown in FIG. 14 by the closed circles. FIG. 14 shows how object points (open circles), which are generated using the prior art LUT method, are fixedly assigned to certain object planes. The object planes, in turn, are positioned at fixed distances to the hologram plane. In contrast, according to the analytic method of an implementation, the object points (filled circles) can be at any position.

The implementation of part A may be implemented using prior art methods for calculating the encoding of the spatial light modulator. Alternatively, the implementation of part A may be implemented using a method which provides a more efficient calculation of the encoding for the spatial light modulator. One more efficient calculation method is that described in publication no. WO 2008/025839. The following more efficient method, which does not require the calculation of Fourier transforms or Fresnel transforms per se and therefore can be implemented efficiently, is an implementation of the applicant. It may also be said that the following more efficient method does not require the calculation of Fourier transforms or Fresnel transforms.

An example of the method, which provides a more efficient calculation of the encoding for the spatial light modulator, is as follows. It is an analytic method, described with reference to FIGS. 8 and 9A-9C, for the generation of computer-generated video-holograms for a holographic display device (HAE), comprising an SLM light-modulating-means (SLM1) and where the wavefront which would be emitted by the object is reconstructed in one or multiple virtual observer windows (VOW) and where the reconstruction of each single object point (OP) of a three-dimensional scene (3D-S) only requires a sub-hologram (SH) as a subset of the entire hologram (HΣSLM) to be encoded on the SLM, characterised in that after a discretization of the 3D-scene (3D-S) to multiple object-points the method comprises the following steps:

for each visible object-point (OP) of the 3D-scene

Step A: Determination of the Position of the Sub-Hologram (SH) for Each Object Point (OP).

For example, using the theorem of intersections, where a virtual visibility-region is projected through the object-point from the hologram-plane, to the SLM itself. With sufficient accuracy the sub-hologram can be approximated/modelled as a rectangle. A local coordinate-system is assigned to the sub-hologram, with an origin at its centre; the x-coordinate is the abscissa and the y-coordinate is the ordinate. The sub-hologram has dimensions "a" as the half width and "b" as the half height.

Step B: Determination of the Sub-Hologram of the Virtual Lens (L) for Each Sub-Hologram (SH) within the Hologram-Plane (HE):

B1: Determination of the focal length (f) of the virtual lens

The focus length (f) of the lens is the orthogonal distance from the SLM of the object-point (OP) to be reconstructed in the hologram-plane (HE).

Figure 9A:
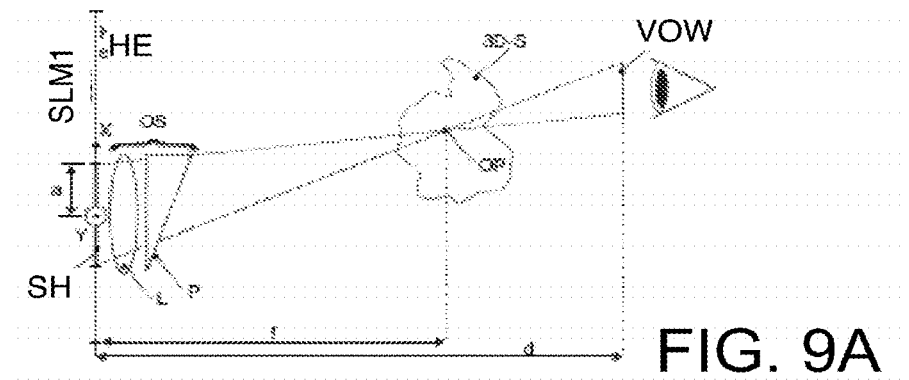
FIGS. 9A-9C are diagrams of a method of reconstructing holograms according to an implementation.
Figure 27:
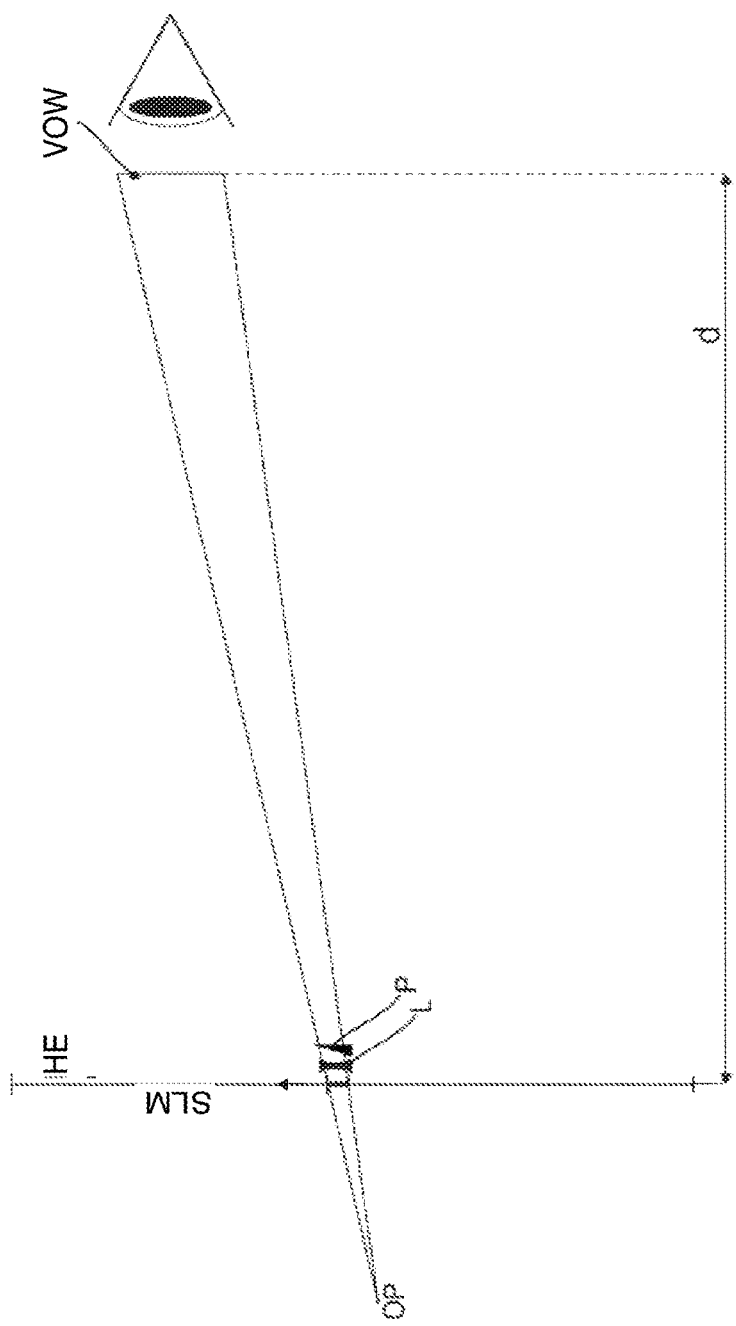
FIG. 27 is a diagram of a method of reconstructing holograms according to an implementation.

B2: complex values of the sub-hologram ($SH_L$) of the lens:

The complex values of the sub-hologram are determined using the formula $$z_L = \exp\{-i*[(\pi/\lambda f)*(x^2+y^2)]\}$$

with $\lambda$ as the optical reference-wave-length, and f as the focal length. A positive sign for f in the equation corresponds to a convex lens, as shown in FIG. 9A. A negative value of f is required if a virtual diverging lens were used to reconstruct an object-point (OP) on the opposite side of the SLM to the viewer, as shown in FIG. 27.

B3: Due to the symmetry of $z_L$ with respect to positive and negative values of x and y, it will be sufficient to determine the values of $z_L$ in one quadrant and to transfer the results to the other three quadrants, using the appropriate sign.

Step C. Determination of the Sub-Hologram ($SH_P$) of the Prism within the Hologram-Plane (HE):

Due to the chosen local coordinate-system, a prism will result in a phase-shift, whereby the phase-shift is a linear function of the x and y coordinates.

Figure 9B:
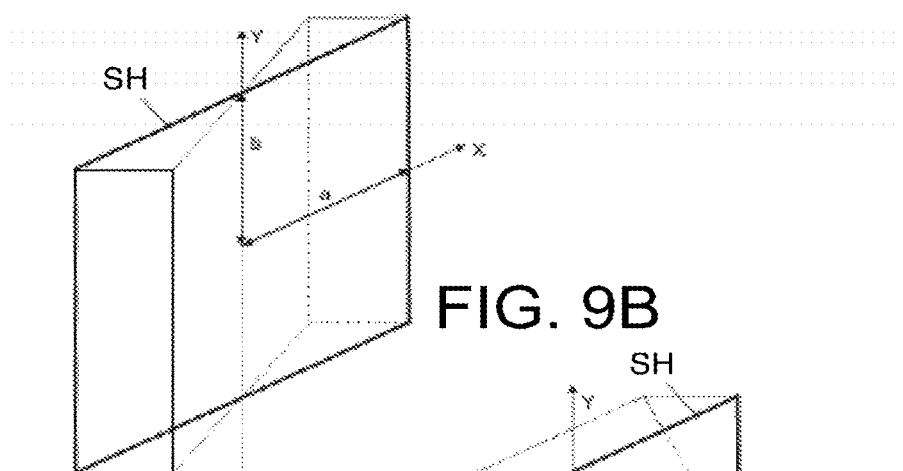

C1: Determination of the linear factor $C_x$ of the prism (P) with horizontal effect, described within the interval $x \in [0, a]$ as $$C_x = M*(2\pi/\lambda);$$

with M as the absolute prism slope (FIG. 9B)

Figure 9C:
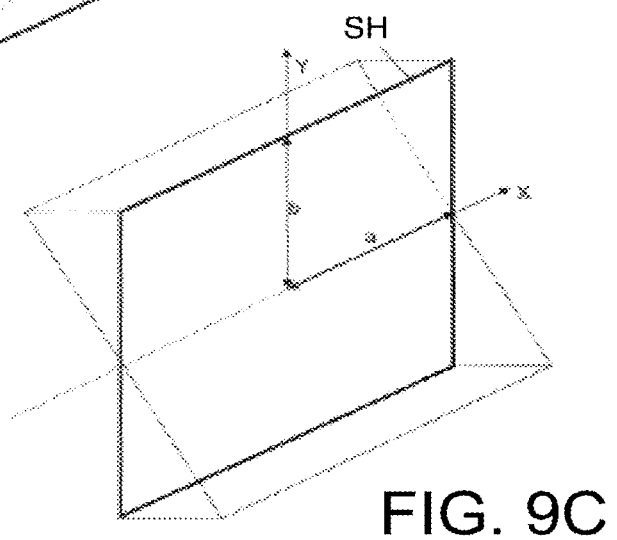
Figure 10:
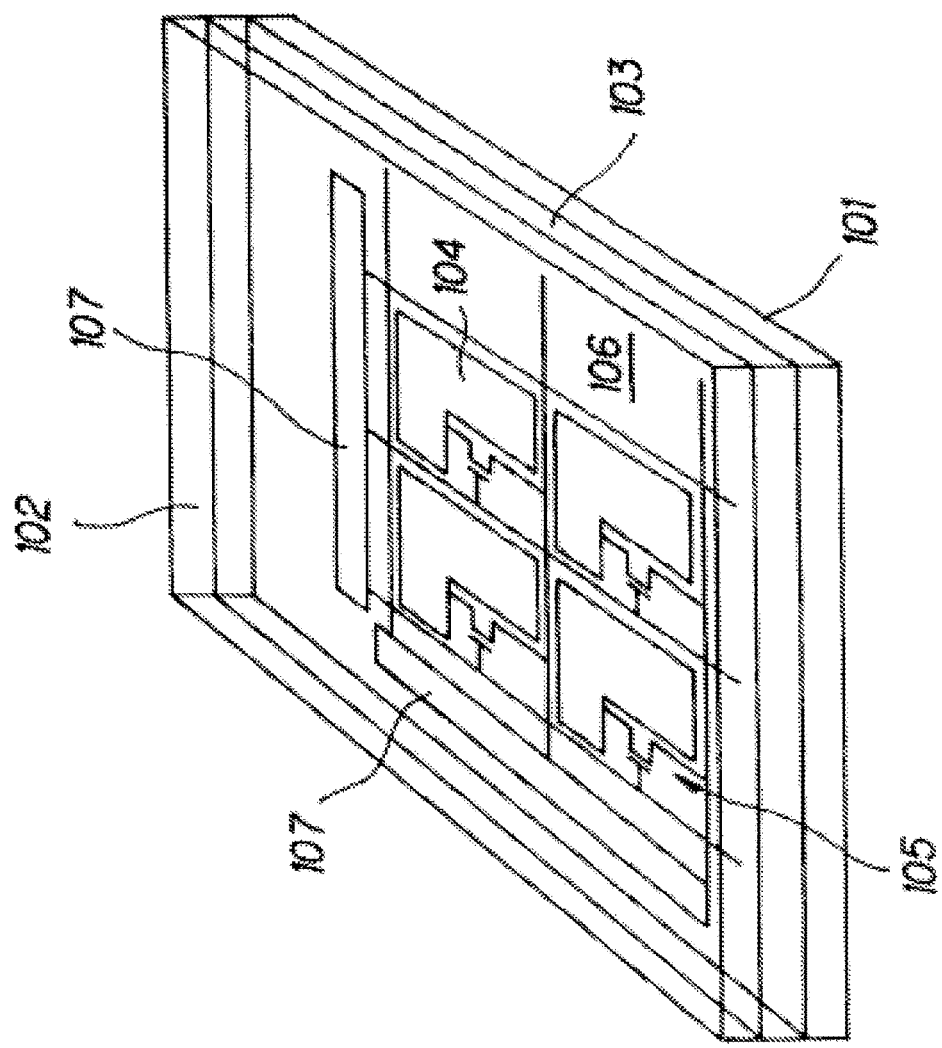
FIG. 10 is a perspective view of a general structure of a conventional active matrix liquid crystal display device according to the prior art.

C2: Determination of the linear factor $C_y$ of the prism (P) with vertical effect, described within the interval $y \in [0, b]$ as $$C_y = N*(2\pi/\lambda);$$

with N as the absolute prism slope (FIG. 9C)

C3: Complex Values of the sub-hologram ($SH_P$) of the prism:

The complex values of this sub-hologram ($SH_P$) are determined by the superposition of the prisms, with $$z_P = \exp\{i*[C_x*(x-a)+C_y*(y-b)]\}$$

C4: The prism correction may be neglected if the light source is imaged to the VOW by the holographic display device.

Step D: Modulation of the Sub-Holograms of the Lens and of the Prisms:

The complex values of the combined sub-hologram are given by a complex multiplication of the effects of the virtual lens (L) and the virtual prism (P), shown in FIG. 9A, as $z_{SH} = z_L * z_P$, which can be represented symbolically as
$SH = SH_L * SH_P$ Step E: Phase Shift Each sub-hologram (SH) is modulated with a (uniformly distributed) phase shift, where the phase shift is different from sub-hologram to sub-hologram, in order to achieve homogenous illumination within the visibility-region. This can reduce speckle patterns from light sources with optical coherence. The magnitude of the phase shift is sufficient to reduce the speckle pattern, and may be less than $\pi$ radians (i.e. not necessarily $-\pi < \Phi_0 < \pi$, but e.g. $-\pi/4 < \Phi_0 < \pi/4$). This process may be represented by:

$z_{SH} := z_{SH} \exp(i\Phi_0)$, which can be represented symbolically as $SH := SH \exp(i\Phi_0)$ Step F: Intensity Modulation The complex values, respectively the sub-holograms, are modulated with an intensity-factor obtained from the frame buffer content (monochrome or colour eg. R, G, B) so that object points represent their own brightness, and colour if appropriate $z_{SH} = C * z_{SH}$, which can be represented symbolically as $SH := C * SH$;

Step G: Adding the Sub-Holograms to Form an Entire Hologram $H\Sigma_{SLM}$.

The sub-holograms can be superposed using complex addition. The entire hologram is the complex sum of the sub-holograms given by $H\Sigma_{SLM} = \Sigma SH_i$, which can be represented symbolically as $Z_{SLM} = \tau z_{SHi}$ according to a coordinate-system for the whole hologram.

Steps C, D, and E in the above may be omitted individually or in combination in some examples of implementations, where computational power or the quality of the hologram may be reduced in return for some benefit such as reduced manufacturing cost of the hardware required to implement the above calculation method.

Further remarks are that if the reconstructed object point is considered to be the focal point of an optical system, this means that there is a lens in the hologram plane, said lens being inclined and having the focal length f. An inclined lens is composed of a non-inclined lens and a prism. According to the method presented here, an object point is reconstructed such that a lens function and, if necessary, a prism function are encoded in a sub-hologram (see FIG. 9A). A scene, which is composed of a multitude of points, can be generated by superimposition of sub-holograms. Through the use of this method, object points for an interactive real-time holographic reconstruction can be generated at any position in the reconstruction frustum using standard hardware components which are commercially available. This solution is also readily resizable as regards the number of object points. The number of object points can be increased as the performance of the processing unit rises.

The calculation process may be summarized as:
1. Calculation of the lens f
   a. Finding the focal length f
   b. Use of lens equation: $e^{\{-i*[(\pi/\pi f)*(x^2+y^2)]\}}$ 2. Calculation of the prism term (optional, depending on the process)
   a. Determining Cx, Cy, a and b
   b. Equation: $e^{i*[Cx*(x-a)+Cy*(y-b)]}$
   $Cx=(2\pi/\lambda)*m$
   $Cy=(2\pi/\lambda)*n$
3. Modulation of the prism and lens terms (optional, depending on the process)
4. Application of the random phase (optional, depending on the process)
5. Intensity modulation
6. SLM-specific encoding of the hologram C. Hologram Display with Decompression Calculation on the Same Substrate An implementation includes a display which receives real space image data, such as an intensity map and a depth map corresponding to a three dimensional image. The holographic encoding of the spatial light modulator is then calculated in real time or in quasi real time based on the three dimensional image data. All or at least some of the hologram display calculations may be performed in the physical space in which the pixel matrix exists, by combining two functional units, namely the hologram display calculation unit and the hologram display unit, which are separate functionally and spatially in prior art devices, so as to form a common unit which is implemented on one substrate. This means that transistors for all or at least some of the hologram display calculation are integrated between or next to the transistors used for pixel control. Alternatively, the hologram display calculation may be implemented using circuitry which is on the same substrate as the pixel circuitry, but where the hologram display calculation circuitry is outside the pixel circuitry.

Figure 4:
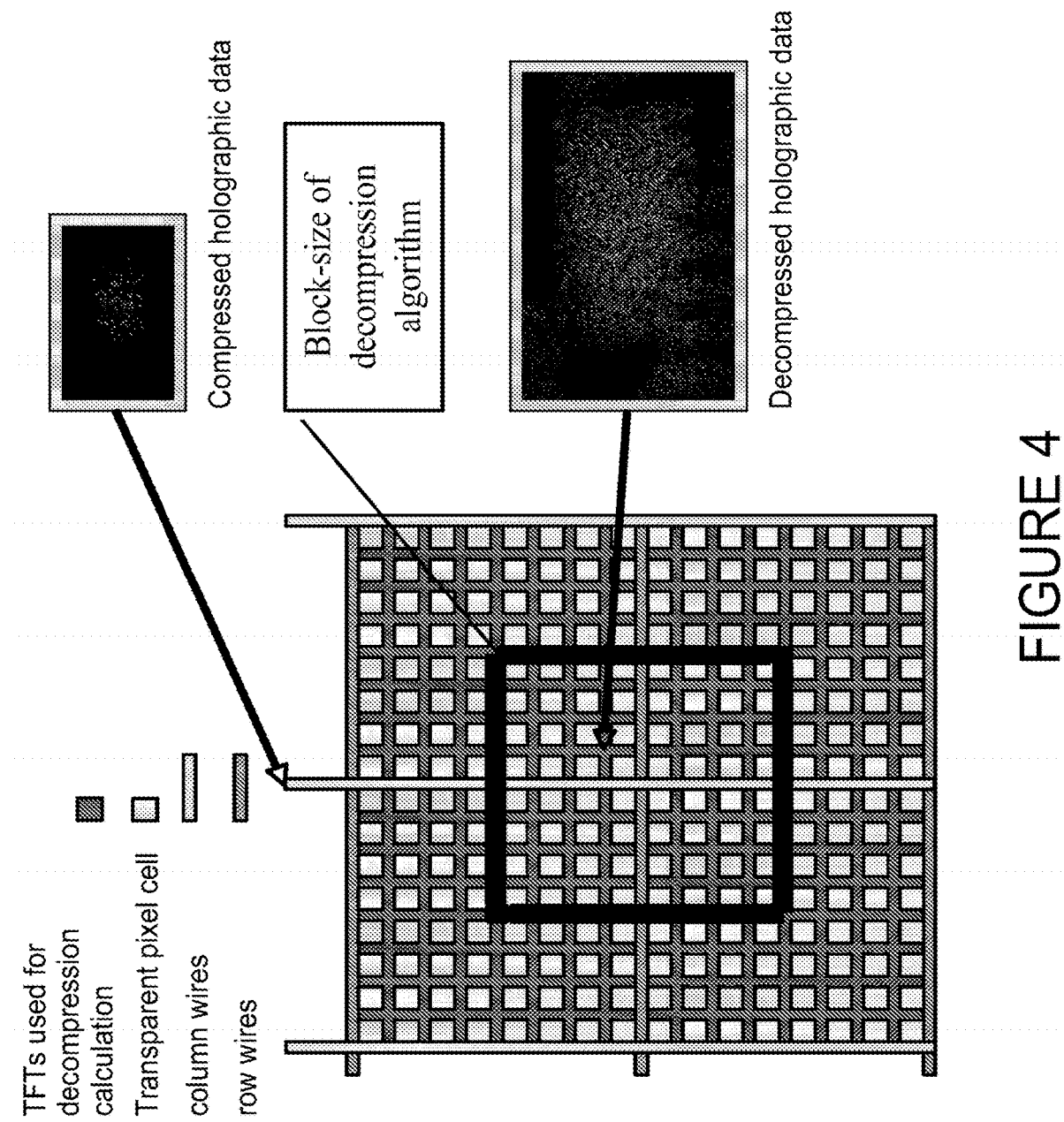
FIG. 4 is a diagram of a portion of a SLM in which a decompression calculation may be performed in the space of the pixel matrix for the display of holographic data.

In this further example of an implementation, the hologram calculation is performed at a location which is not within the space occupied by the pixel matrix. Such a calculation may take advantage of locally-accessible look up tables (LUTs), as described in publication no. WO 2008/025839, which increases the computational efficiency of the calculations. As FIG. 1 makes clear, a problem with an approach where hologram calculation is performed outside the space of the display pixels is that very high total data transmission rates to the pixels of the display are required. This may be avoided if an approach such as the approach of FIG. 4 is adopted.

In the display, the hologram encoding data is calculated outside the space occupied by the pixel matrix. The space in which these calculations are performed may or may not be on the same substrate as the display's substrate. The hologram encoding data is compressed using known data compression techniques, and is then transmitted to the display clusters which are part of the whole display. In FIG. 4, the TFTs for hologram calculation perform the function of decompressing the data which has been received via the row and column wires. However, the data could also be received via other means, such as via a parallel data bus, or a serial data connection. Hologram display on a cluster-by-cluster basis with reduced requirements for interconnection between the hologram display pixels and the source of the image intensity maps and image depth maps is thereby permitted. It is also possible that the hologram calculation and data compression could be performed outside the display substrate, with data decompression performed using circuitry on the same substrate as the pixels of the display, but where decompression is performed outside the space of the pixel matrix. Other examples will be obvious to those skilled in the art.

D. High Resolution Display with Decompression Calculation on the Same Substrate

Figure 5:
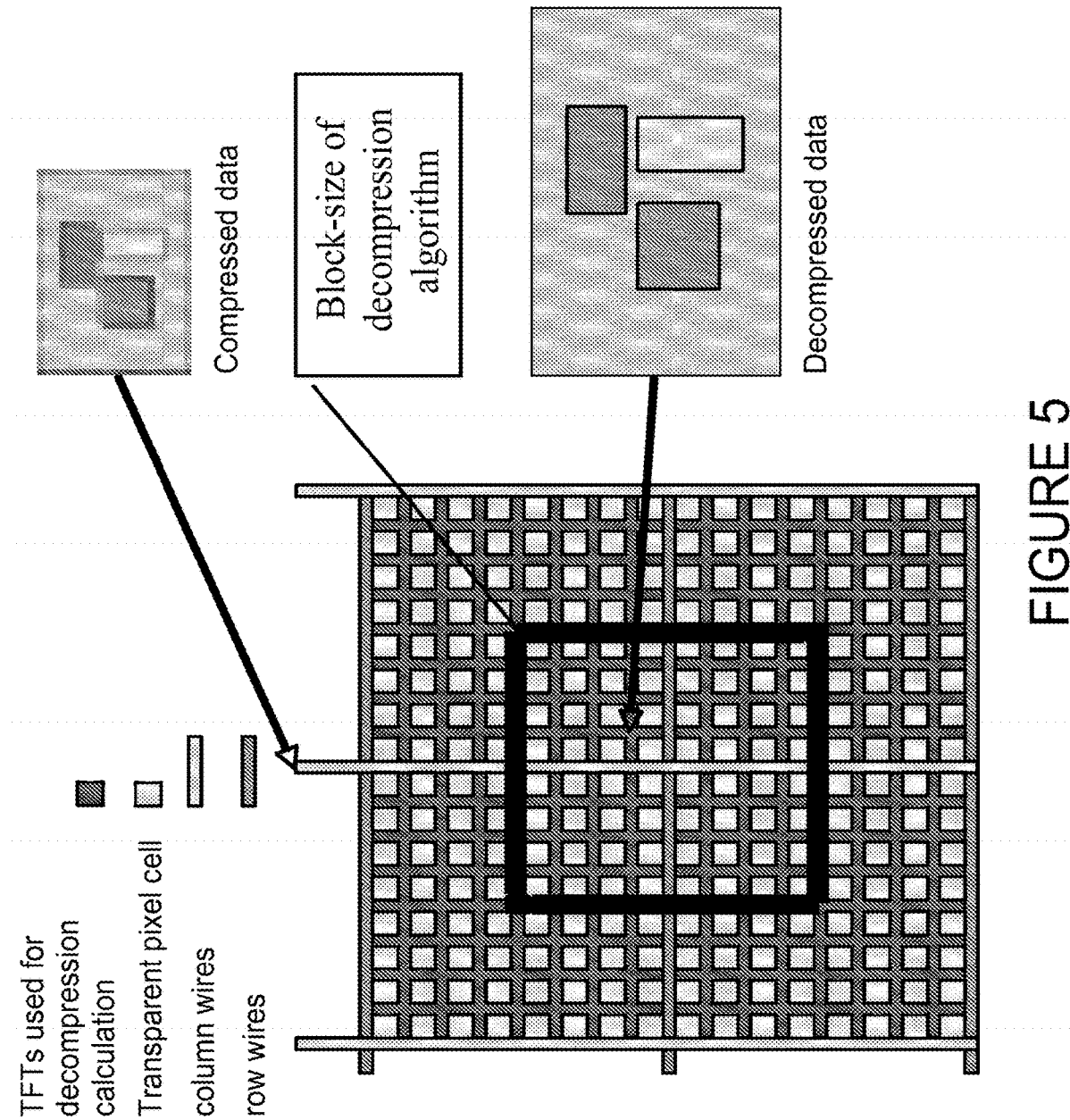
FIG. 5 is a diagram of a portion of a SLM in which a decompression calculation may be performed in the space of the pixel matrix for the display of conventional 2D display data.

In a further example of an implementation, a high resolution display is used to display high resolution image data, which may be normal display data or may be hologram display data which has been computed based on intensity map and depth map data. Inherent problems with high resolution displays of the prior art is that they require high density circuitry which is prone to fabrication errors, and they require high switching frequencies which can lead to problems with excessive heat generation. These problems may be reduced or avoided if an approach such as the approach of FIG. 5 is adopted.

In the high resolution display, image data is compressed inside or outside the display using known data compression techniques, and is then transmitted to the display clusters which are part of the whole display. The space in which the compression calculations are performed may or may not be on the same substrate as the display's substrate. In FIG. 5, the TFTs for the decompression calculation perform the function of decompressing the data which has been received via the row and column wires. However, the data could also be received via other means, such as via a parallel data bus, or a serial data connection. For minimum memory requirements, at a 25 Hz frame rate the TFTs for decompression calculation would be required to decompress this data for display by the pixels of the cluster in about 40 ms or less. Image display on a cluster-by-cluster basis with reduced requirements for interconnection between the image display pixels and the source of the image intensity maps is thereby permitted. Other examples will be obvious to those skilled in the art.

In a preferred example, compressed real space image data is sent to the clusters of the display. In a first step, the clusters perform a decompression of the compressed real space image data. In a second step, holographic display data is computed by the clusters of the display using the data produced by the first step. Other examples will be obvious to those skilled in the art.

E. Hologram Display with Calculation on the Same Substrate, with an Extended 3D Rendering Pipeline for the Graphics Sub-Systems by Incorporating Additional Processing Units for Holographic Transformation and Encoding The implementation of part A may be implemented using prior art methods for encoding the spatial light modulator. Alternatively, the implementation of part A may be implemented using a method which provides a more efficient encoding of the spatial light modulator. An example of the method, which provides a more efficient encoding of the spatial light modulator, is as follows, but many other examples will be obvious to those skilled in the art.

Figure 15:
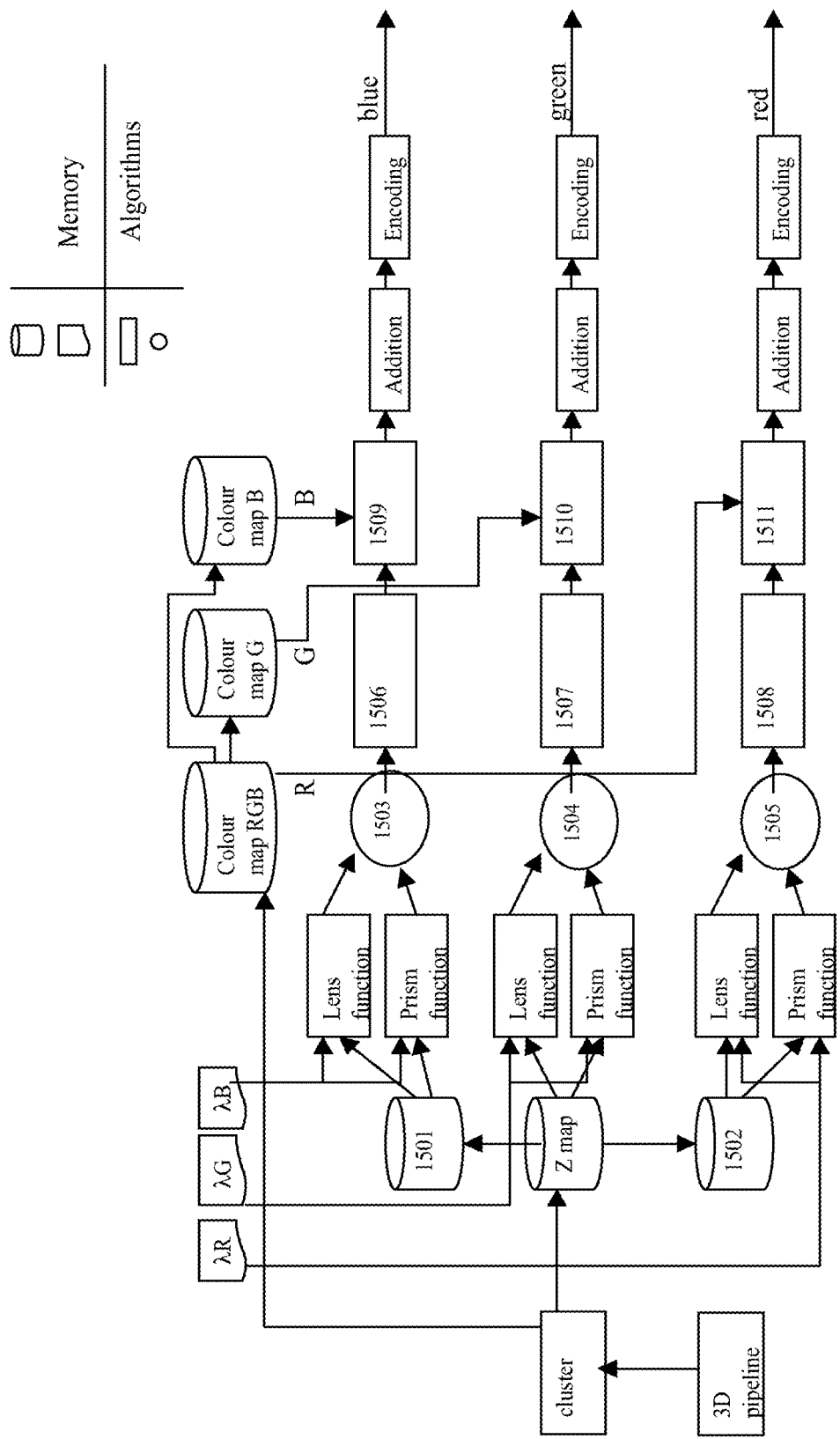
FIG. 15 is a diagram of functional units which may be implemented in the graphics calculations in a holographic display of an implementation.

The method, an example of which is shown in FIG. 15, extends the 3D rendering pipeline of graphics sub-systems by incorporating additional processing units for holographic transformation and encoding. The method is an implementation of the applicant. The expression "additional processing units for holographic transformation and encoding" will be replaced by the term "holo-pipeline" in what follows. The holo-pipeline is arranged directly downstream the 3D graphics pipeline. The 3D pipeline data for each cluster is sent to the corresponding cluster in the display; the description from here focuses on the implementation at the level of a single cluster. A Z map buffer and a colour map buffer (colour map R, colour map G, colour map B) form the interface between the two pipelines. This is shown schematically in FIG. 15. For each individual point in pixel coordinates the Z map contains a z value, which is scaled and which can be represented at various definition levels. Z values are typically scaled in a range of between 0.0 and 1.0, but other ranges are possible. The definition level is determined by the number of bits, i.e. usually 8, 16 or 24 bits.

In modern graphics sub-systems, the colour map has a definition of 24 bits, i.e. 8 bits per colour component, R, G, B (red, green, blue). The colour map forms a part of the frame buffer, whose content is normally displayed on the screen. The two buffers, which contain the Z map and the colour map, are defined to form the interface between the 3D rendering pipeline and the holo-pipeline. The Z map is provided for one display wavelength, but this is no particular wavelength of R, G, B. Copies of the Z map 1501 and 1502 are provided for the other two display wavelengths.

A hologram can only be calculated for a given display optical wavelength. This is why the calculation is performed three times for each object point, i.e. once for each primary colour, red (λR), green (λG) and blue (λB). Other colours can be created by utilizing these three colour components, and this colour mixing can be realised either sequentially or simultaneously. In order to increase the processing speed, at least two additional holo-pipelines are used, so that hologram calculations are performed in parallel. The results for all three colour components will then be available at the same time. For this, it is necessary that the z map data are copied to additional memory sections 1501 and 1502 (see FIG. 15), which can be accessed independently of one another. It is thereby prevented that operations which involve memory sections such as z map data can block each other. The memory sections should therefore ideally be separated physically. The colour map RGB contents for colours G and B are also copied to separate memory sections colour map G, and colour map B, respectively, so as to ensure independent access to the three colour components (see FIG. 15). Again, the memory sections may be separated physically in order to prevent collisions during memory access and to reduce or eliminate difficult implementations problems for access synchronisation with semaphores, mutual exclusion algorithms (or "mutexes"), etc., which would adversely affect system performance. Nevertheless, while the memory sections may be separated physically from each other, they should still preferably be located within the same cluster of the display. Note that a semaphore is a protected variable (or abstract data type) and constitutes the classic method for restricting access to shared resources (e.g. storage) in a multiprogramming environment; mutual exclusion algorithms are used in concurrent programming to avoid the simultaneous use of a common resource, such as a global variable, by pieces of computer code called critical sections.

It will be assumed below that a hologram is composed of a number of sub-holograms. The m-th sub-hologram is therein represented by a lens which is described by a lens function: $e^{\wedge}(-i\ C_t^*(x_m^2+y_m^2))$. The constant $C_t$ includes the focal length f of the lens; the value off is calculated before the lens function is applied, so that the value off can then be used for all three pipelines. The value off is therefore not colour-specific: because it is a virtual lens it need not exhibit chromatic aberration. It is possible to take advantage of the lens function relation, because a lens is symmetrical as regards its x and y axes. In order to describe a lens in full, the function need only be applied to one quadrant. The lens function values calculated in one quadrant can then be applied to the other three quadrants by using a symmetry rule of sign.

$C_t$ also depends on the wavelength λ which naturally differs among the three colours, R, G, B. The value of λ does not have to be calculated, because it is known due to the fact that a defined laser or light source is used for each wavelength; however, the value of λ should be made available within the calculation in order to calculate $C_t$ for each primary display colour (see FIG. 15).

Depending on the process used, it may become necessary that in addition to the lens function a prism function (see FIG. 15) should be applied in order to modify the direction of light propagation. In the prism function, a constant also includes the wavelength λ. The value of that constant thus varies because the three primary colours have different wavelengths, so that the value of that constant has a specific value for each of the three holo-pipelines.

Both the lens function and the prism function now undergo a complex multiplication at 1503, 1504 and 1505, shown in FIG. 15. Then, a random phase is applied at 1506, 1507 and 1508, which is added to the result of the multiplication of lens and prism function. This method aims to avoid brightness peaks, or "speckle," in the observer plane. The intensity of the respective colour map is then used to modulate the respective hologram at 1509, 1510, 1511.

In a next step, this sub-hologram undergoes a complex addition to form the total hologram for the cluster (see FIG. 15). The results are now available for subsequent processing, if applicable, using additional algorithms in the holographic display cluster, e.g. the application of correction maps or greyscale images (gamma correction), which are only determined by the system properties of the SLM, so that they are preferably corrected at this stage. This is followed by the encoding process. The hologram may be reconstructed in colour. The encoding algorithms (see FIG. 15) vary greatly depending on the SLM used, which can be phase-encoded, amplitude-encoded or encoded in another way.

The person skilled in the art will recognize that some aspects of the implementation given in this section are disclosed in greater detail elsewhere within this application.

F. Hologram Display with Calculation on the Same Substrate, with Sequential Holographic Transformation of Points in Three-Dimensional Space by Way of Extending the 3D Pipeline of Graphics Cards with a Holographic Calculation Pipeline The implementation of part A may be implemented using prior art methods for performing the holographic calculations. Alternatively, the implementation of part A may be implemented using a method which provides a reduced time delay for performing the holographic calculations. An example of the method, which provides a reduced time delay for performing the holographic calculations, is as follows, but many other examples will be obvious to those skilled in the art.

An object of the implementation is, for a hologram display with calculation near the pixels, to reduce the time delay compared with other holographic calculations. This will result in an extension of the architecture of eg. currently used graphics cards (3D pipeline) by additional hardware modules for real-time holographic transformation and encoding.

In general, before a holographic transformation calculation is performed, the entire three-dimensional scene is composed by realising several 3D transformations and illumination calculations. The primitives (e.g. points, lines, triangles), which make up the objects of the scene, will be pixelated at the end of the 3D processing pipeline. The entire result is then available in two memory sections. These are a frame buffer, which contains the colour values (colour map) of the scene viewed by the observer, and a Z buffer, which contains the depth map of the scene in a scaled representation, as seen from the observer position. In prior art methods, the holographic transformation and encoding process can only begin when the results (the two memory sections) are available in their entirety, as access to both memory sections is required for this. This leads to a time delay of one video frame. Such a delay time can be crucial in some interactive applications, such as in gaming devices. If the delay time is too long, the reaction time available for the player's activities may be too brief, so that the player will fail to perform some actions which otherwise could have been performed. A delay time of one frame, which is no less than about 17 ms in 60 Hz display devices, may be critical in fast games. Because holographic displays will only find market acceptance if there are applications for them, target groups such as video game players should be included.

Three dimensional holographic imaging may provide advantages in military applications, as being able to view the enemy, or other information such as terrain information, in three dimensions may improve combat effectiveness over two dimensional data display. The above time delay may lead to service personnel death or injury, or damage to or the destruction of expensive military equipment, if the display is applied in military applications during combat operations. Therefore reducing the time delay may improve the effectiveness of three dimensional holographic imaging in military applications.

In order to reduce the delay time, there is no need to wait until the entire colour and Z-buffer maps are available. Instead the holographic calculations will be executed immediately as soon as one point in space is available after having been processed by the 3D pipeline. Consequently, it can be seen that the 3D pipeline may be extended by a holographic pipeline.

Figure 8:
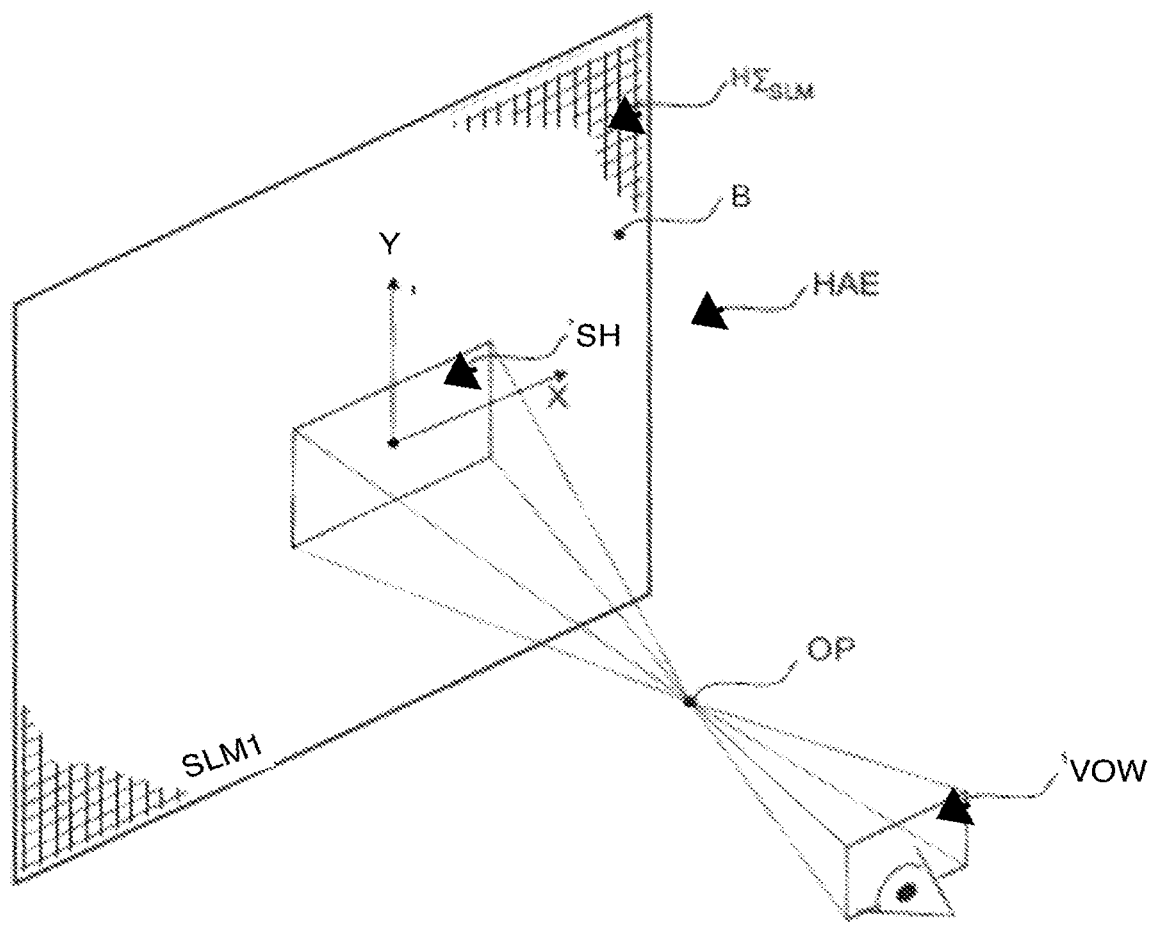
FIG. 8 is a diagram of a method of reconstructing holograms according to an implementation.
Figure 18A:
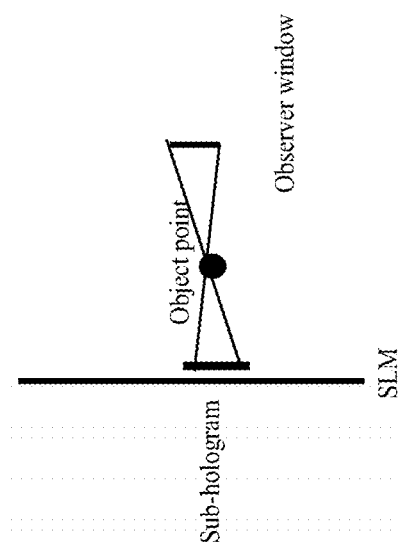
FIGS. 18A-18B are diagrams showing that the computational load is much smaller if using sub-holograms, because of the smaller number of cells, for a holographic display of an implementation.
Figure 18B:
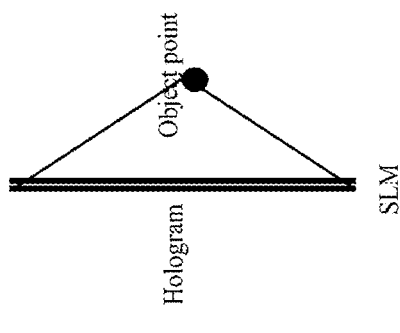

The calculation time for the holographic transformation and encoding preferably should not exceed the time needed for the calculation of a 3D point by the 3D pipeline, because otherwise further time lags will be generated. This concept is readily enabled on the basis of sub-holograms, because in that case only the necessary pieces of information need to be processed. To appreciate this, consider that if the holographic transformations were applied from one single 3D point in space to the entire size of a hologram or SLM, an additional computational load by a factor of 1,000 or more could be the result. Real-time calculations would then probably become impossible using currently available computational hardware. The concept of a sub-hologram is shown in FIG. 8 and its associated description. FIGS. 18A-18B illustrate the preferred use of sub-holograms in the present example of an implementation. Because the sub-holograms are smaller than the SLM, each can be calculated more quickly than a single hologram which spans the entire SLM. Furthermore, the sub-holograms may be calculated in sequence, which strongly reduces the time delay compared to the case of the calculation of a hologram which spans the entire SLM, which can only be performed when an entire frame of image data has been received. When comparing the two FIGS. 18A and 18B, it can be noticed that the computational load for computing each object point is much smaller if using sub-holograms, because of the smaller number of cells in a sub-hologram compared to the whole SLM.

Figure 16:
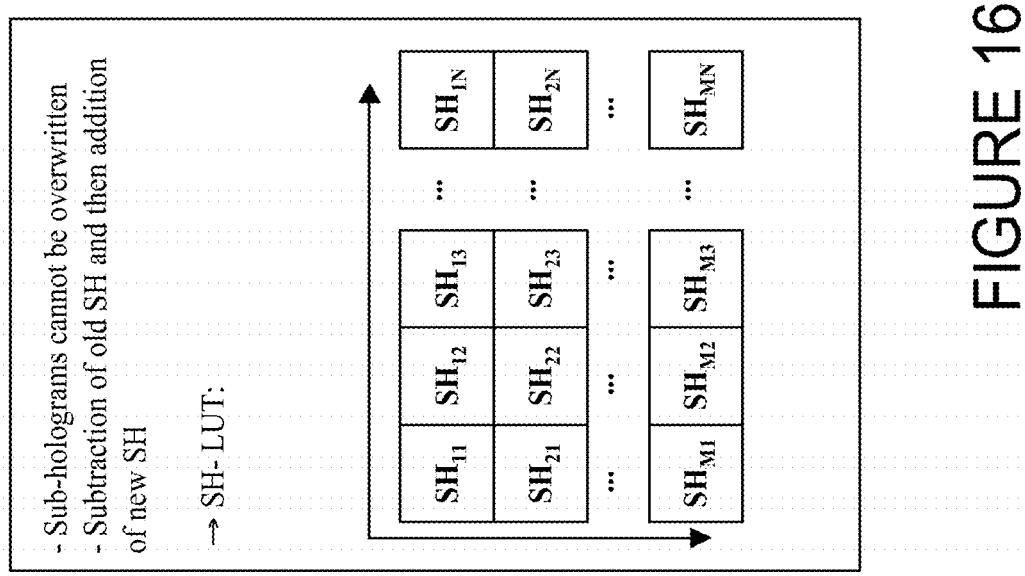
FIG. 16 is a diagram of a look-up table for sub-holograms SH used in a holographic display of an implementation.
Figure 17:
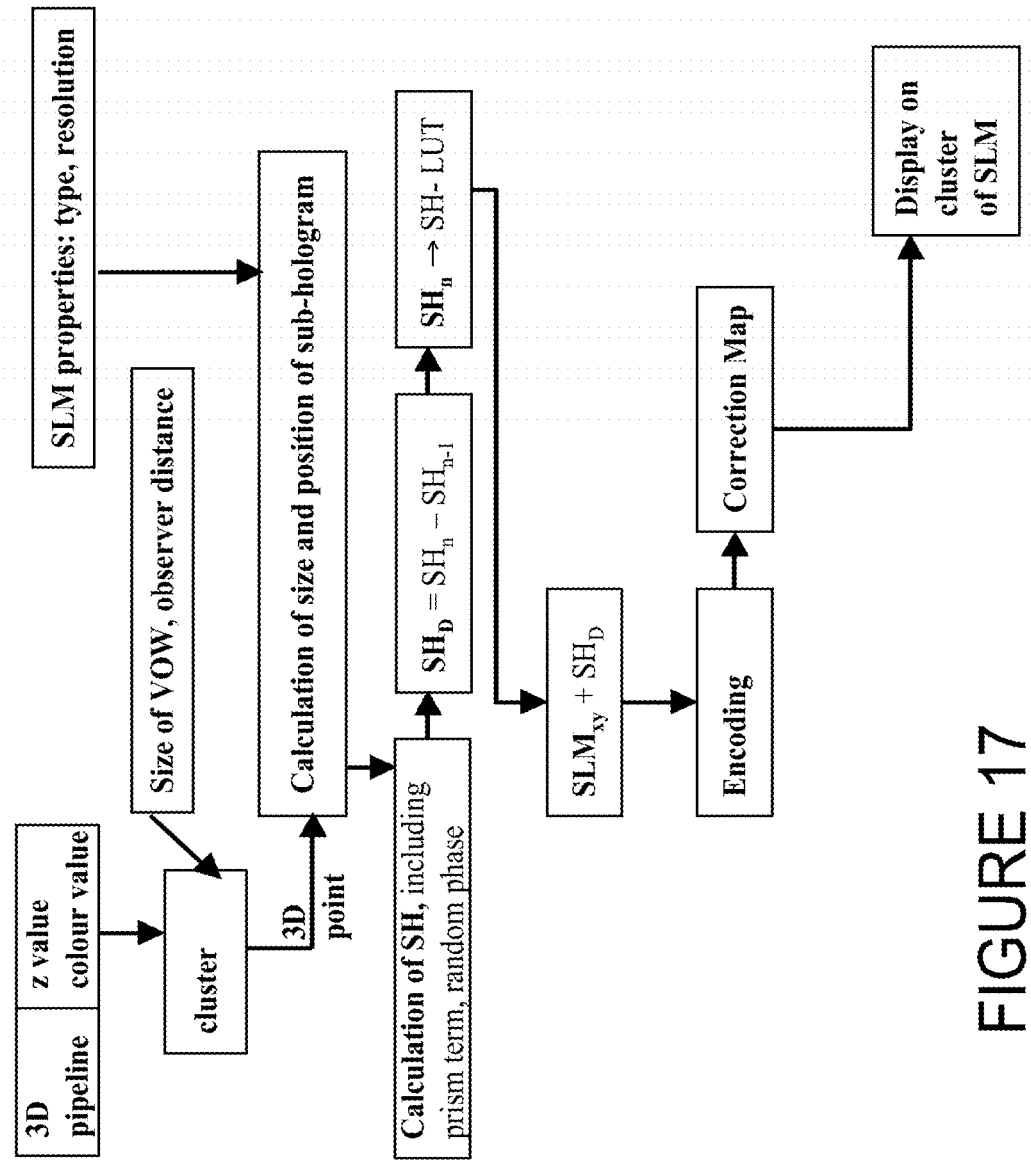
FIG. 17 is a diagram of additional processing units for holographic transformation and encoding for a holographic display of an implementation.

In some examples of an implementation, the sub-holograms of points whose positions are closest to the observer (FIG. 16) are stored in a sub-hologram buffer. The 3D pipeline data for each cluster is sent to the corresponding cluster in the display (FIG. 17); the description from here focuses on the implementation at the level of a single cluster. Data on the VOW size and VOW direction and distance from the SLM are supplied to the cluster as inputs to the calculation (FIG. 17). Each cluster of the display has its own look-up table for storing the encoding of the sub-holograms which it displays, which may be one or more sub-holograms. If a new point is generated which is even closer to the observer, the sub-hologram corresponding to that point ($SH_n$) will be calculated (see FIG. 17), i.e. the holographic transformation is performed after the dimensions of the sub-hologram have been determined. Then, the content of the cluster of the SLM cannot simply be overwritten by the sub-hologram, because an SLM cell may contain information from several sub-holograms. This is why a look-up table is searched for an entry of the sub-hologram ($SH_{n-1}$) at the position xy, which is also displayed on the cluster of the SLM at the time. After having read the content of the SH from the LUT, the difference between the currently displayed ($SH_{n-1}$) and the new SH ($SH_n$) is calculated (see FIG. 17).

In the case where a 3D point in space, which is even closer to the observer than the previous one, will be calculated at the position xy later, this $SH_n$ is written to the LUT instead of the old $SH_{n-1}$ (see FIG. 17). Now, the difference $SH_D$ will be added to the values in the SLM, which are stored in a frame buffer. This process is followed by the encoding and possible corrections (see FIG. 17).

The fact that the display device (SLM) provides its configuration information (eg. type resolution) to the computing unit (see FIG. 17) means that the connection of any holographic display device (SLM) will be possible. Such devices may differ in size, number of cells or even the type of encoding. This solution is thus not restricted to a particular type of SLM.

G. Hologram Display with Calculation on the Same Substrate, with Random Addressing of Holographic Displays The implementation of part A may be implemented using prior art methods for performing the holographic calculations. Alternatively, the implementation of part A may be implemented using a method which provides an improved process for performing the holographic calculations. An example of the method, which provides an improved process for performing the holographic calculations, is as follows, but many other examples will be obvious to those skilled in the art.

An object of the implementation is to reduce the amount of data to be transferred from a content generation module (e.g. a graphics card) to the visualisation module (i.e. the holographic display) by taking advantage of features of sub-holograms in the application.

The transfer of image data from the content generation units (e.g. a graphics card) to the visualisation module (e.g. an LCD or cathode ray tube (CRT) monitor) in the prior art is such that the entire content of an image is output line by line from top to bottom, as with conventional tube monitors. With high definition television (HDTV) resolutions up to 3840×2400 pixels (IBM® Berta Display→now IIIAMA etc. described at eg. http://www.pcmag.com/article2/0,1895, 2038797,00.asp), this does not pose a problem, because the required amount of data can be transferred fast enough through standardised interfaces, such as Digital Visual Interface (DVI) or High-Definition Multimedia Interface (HDMI).

However, ideal holographic display devices require a much higher number of pixels in order to generate in the observer plane a virtual observer window (VOW) which measures one or more centimetres across, in contrast to about 5 mm across in a more primitive device. A large VOW is very beneficial, because the larger it is the more robust is the holographic display device in terms of reliability during commercial use. This is because the demands made on other components in tracked holographic displays, such as the tracking system or the position finder, which track the positions of the viewer's eyes with respect to the display, will be much lower in such cases. Alternatively, where the device does not implement tracking, the tolerance to small movements of the viewer's head is improved if the size of the VOW is increased.

An object of the implementation is to reduce the amount of data to be transferred from a content generation module to the visualisation module in a holographic display in which all or at least some of the holographic calculations take place in the pixel matrix.

Figures 19A, 19B, 19C:
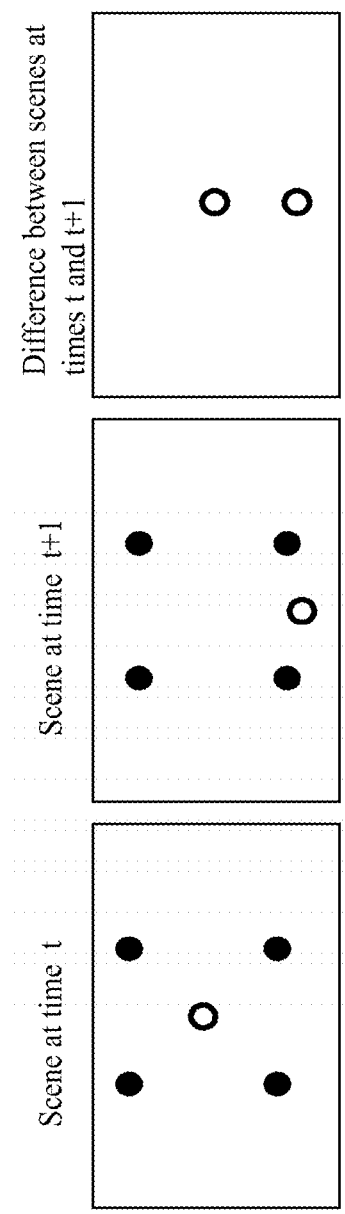
FIGS. 19A-19C are diagrams showing a scene at time t, a further scene at time t+1, and the difference scene.

During the above described prior art data transfer all information is transferred, including those pieces of information which do not change from one frame to the next frame. Because a hologram reconstructs points in a three-dimensional space, it is sufficient to know which points have changed compared to the previous frame. Only those points will be considered in the following process (see FIG. 19).

A single object point is created by a sub-hologram SH, whose size depends on the observer position. Because an SLM cell may contain not just the information of one sub-hologram, but the information of several sub-holograms, the difference between the SH of the old point at the position xyz and the SH of the new point at the same position xyz should be calculated. This differential sub-hologram SHD may then be re-encoded on the SLM in this example of an implementation.

Figure 20:
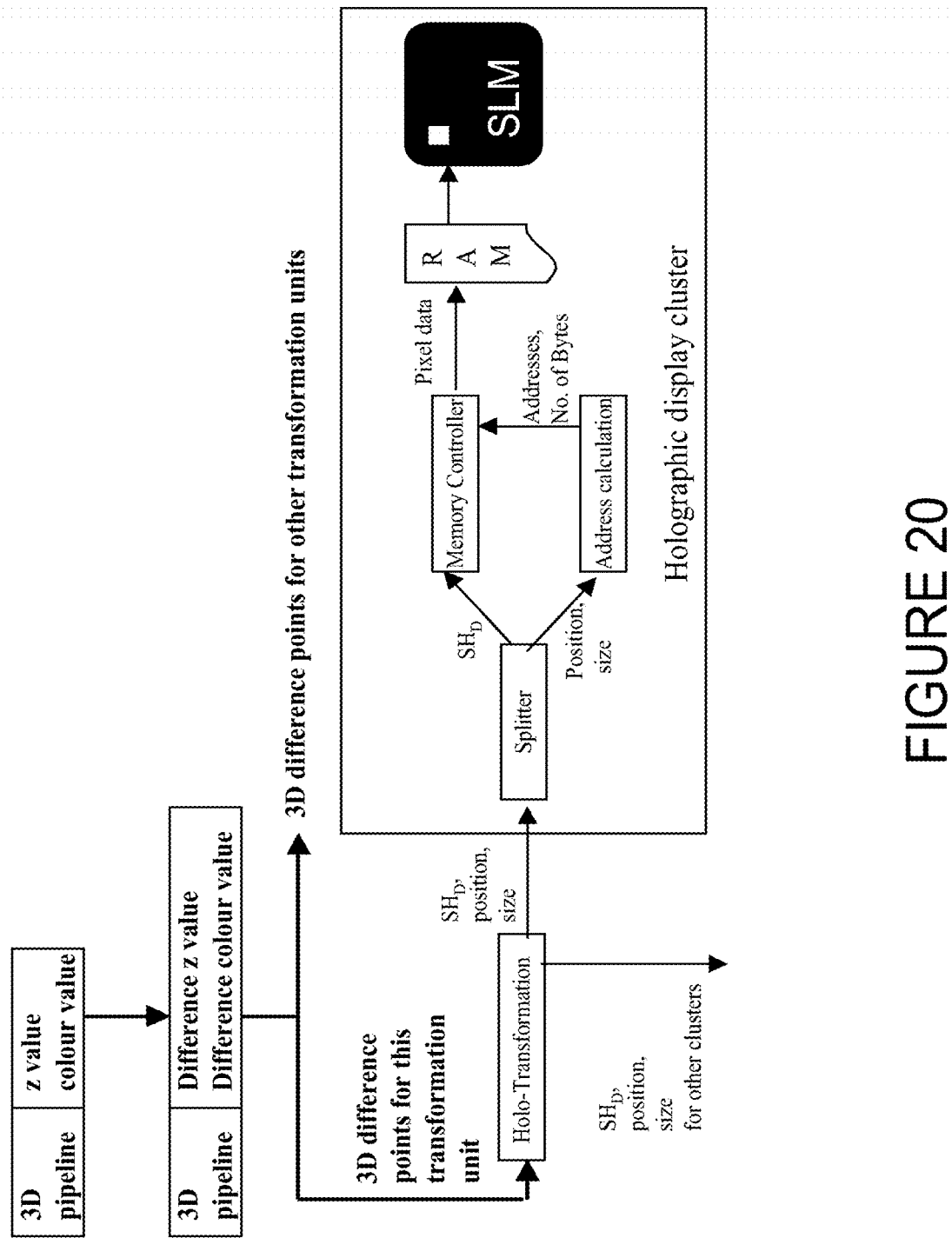
FIG. 20 is a diagram showing a holographic display device of an implementation, with addressable data transfer.

The set of circuitry inside or outside the display receives 3D image data, which consists of a colour or intensity map and a Z buffer, on a frame by frame basis. The difference between successive frames is computed, as shown schematically in FIG. 20. Following this, updated display data is sent to the holographic transformation units of the display, in the form of image difference data. As shown in FIG. 20, each holographic transformation unit is sent 3D difference point image data which is relevant to the reconstruction point or points it serves to encode on the SLM. If there is no difference, or negligible difference, between display data for successive frames at a given cluster, then no data need be sent to the holographic transformation unit: this can speed up the effective SLM updating rate of the display system. The part of the system which creates the SHDs may be termed the "content creation module" and may consist of computing functions and a graphics card. The sub-hologram is then sent to each cluster. The first task that the cluster performs is to process the information received by separating the hologram data and the data regarding the size and position of SHDs. The cluster's task includes writing the SHD into the appropriate RAM cells so that the SH will be displayed correctly at the proper SLM position and with the correct size.

In addition to the sub-hologram SHD (or alternatively the SH of the new frame), the size of the sub-hologram in pixels and its position within the display cluster may be specified. Within the holographic display cluster (shown for example in FIG. 20) there is a splitter, which splits the calculated hologram display data into sub-hologram data and size and position information. The two latter values aim to compute the address range of the sub-hologram in the RAM, so that the data of the sub-hologram SH or SHD are written to the correct SLM cells within the cluster.

Common SLMs are active matrix displays whose cells should be refreshed continuously in order not to lose information. If only new contents were written to the SLM, information in other regions would be lost (eg. see FIG. 19: the four black dots therein would no longer appear). For this reason a special random access memory (RAM) may be used where only the new SH or SHDs are written on the input side while on the output side the entire memory is read line by line and the information is written to the SLM. Dual-port RAMs or other memory systems which permit simultaneous reading and writing operations, as described above, to be performed may be used for this purpose.

Which points are to be transferred, i.e. depending on the changes in the 3D scene, will be determined in the content generation unit. The action to minimise the data stream is thus performed before the data are transferred to the holographic display device. The information can be transferred in any order, because the sub-holograms are supplemented with additional information, as described above. This is substantially different from line-by-line data transfer as practiced in visualisation systems of the prior art.

On the client's side, i.e. where the content is generated, a decision whether or not the data are to be transferred is made before the data transfer is started, as described in the implementation. If the content has changed completely, as is the case after interruptions or a complete change of the scene to be displayed, very many sub-holograms which correspond with the 3D object points should be transferred. Typically, it can be said that the higher the resolution of an SLM, the greater the advantage in transferring sub-holograms instead of transferring the entire hologram.

H. Display with Computational Function in the Pixel Space

Figure 25:
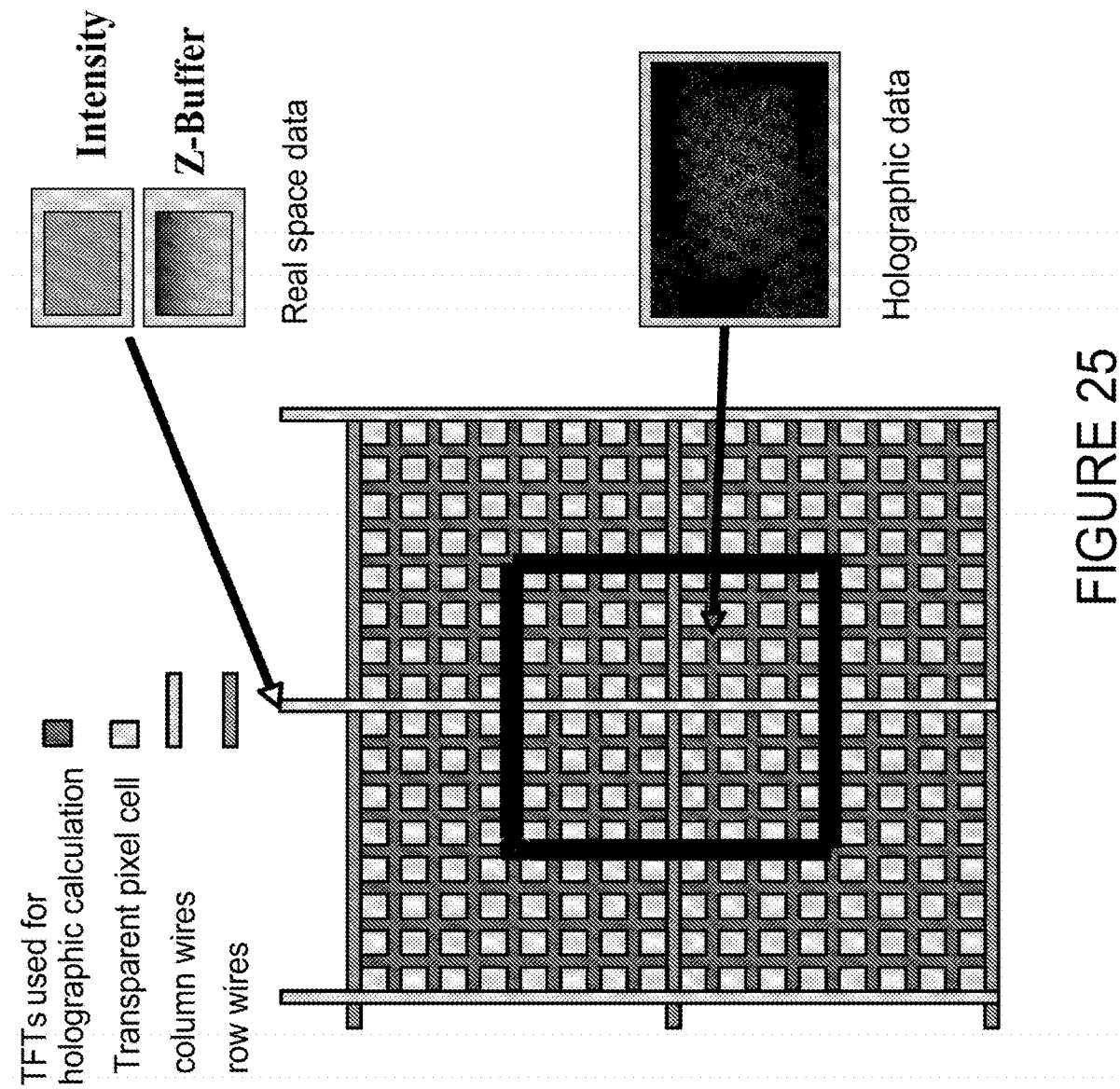
FIG. 25 is a diagram of a portion of a SLM in which computational calculations may be performed in the space of the pixel matrix for a display which displays conventional 2D display data, or holographic display data.
Figure 26:
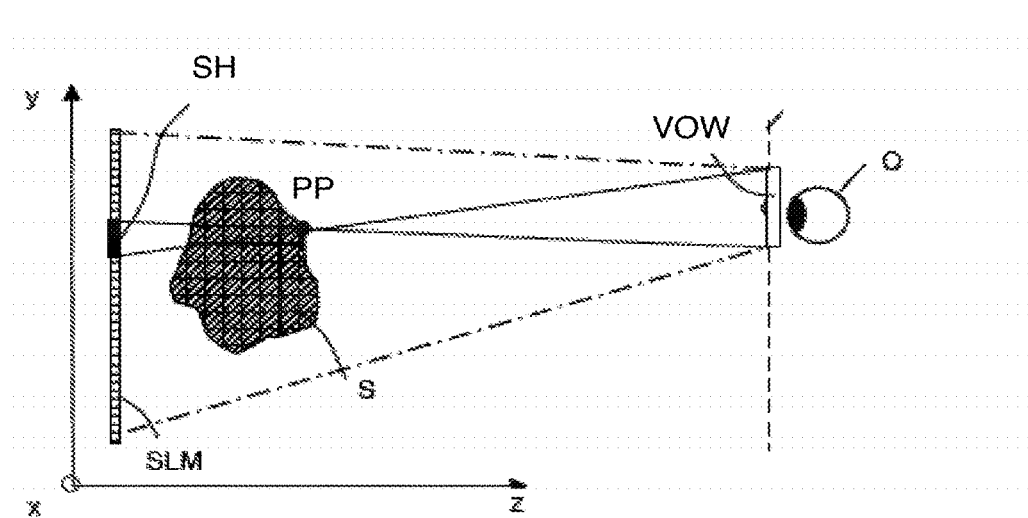
FIGS. 26A-26B are diagrams of a method of generating sub-holograms, according to the prior art.
Figure 26:
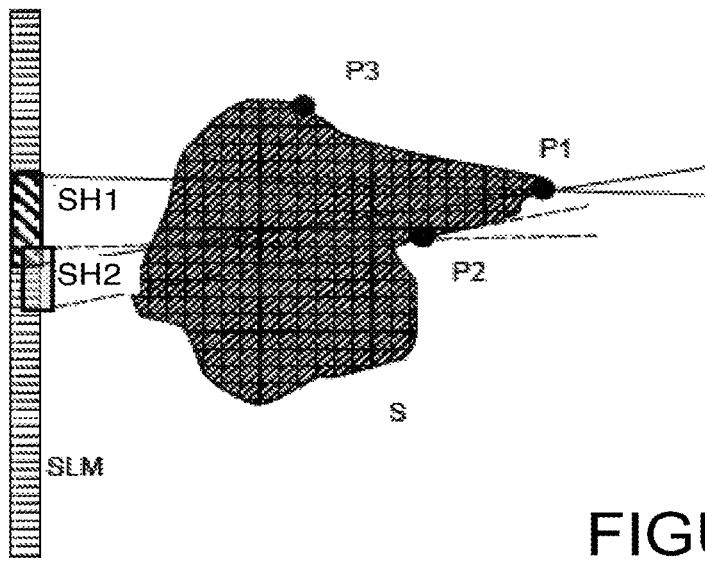

In a further example of an implementation, a display is used to display image data, which may be normal display data or may be hologram display data which has been computed based on intensity map and depth map data. Inherent problems with displays of the prior art is that they require circuitry which is not implemented on the same substrate as the display circuitry. This additional circuitry must be implemented on a separate substrate to the display substrate. This leads to undesirable properties such as greater device volume and weight. Consumers are constantly demanding display devices which are smaller, slimmer, or lighter. These problems such as greater device volume and weight may be reduced if an approach such as the approach of FIG. 25 is adopted. The delay in displaying any data which has been calculated for display by the computational units may be reduced if the computational units are disposed close to the pixels of the display. Such a reduced delay may be beneficial in applications such as high speed game devices, or in devices for military applications where improved device performance speed may lead to a military advantage.

In the display of FIG. 25, computational functions are performed at display clusters which are situated in between the display pixels of the display, or next to the display pixels of the display. The space in which the computational functions are performed is on the same substrate as the display's substrate. In FIG. 25, the TFTs for the computation perform the computational functions. Other examples will be obvious to those skilled in the art.

I. Occlusion

In computer graphics, the term "occlusion" is used to describe the manner in which an object closer to the view masks (or occludes) an object further away from the view. In the graphics pipeline for 2D displays one implements a form of occlusion culling to remove hidden surfaces before shading and rasterizing take place. Here in the context of holograms, the implementation of occlusion involves ensuring that object points closer to the virtual observer window mask object points further away from the virtual observer window, along the same line of sight.

Figure 29:
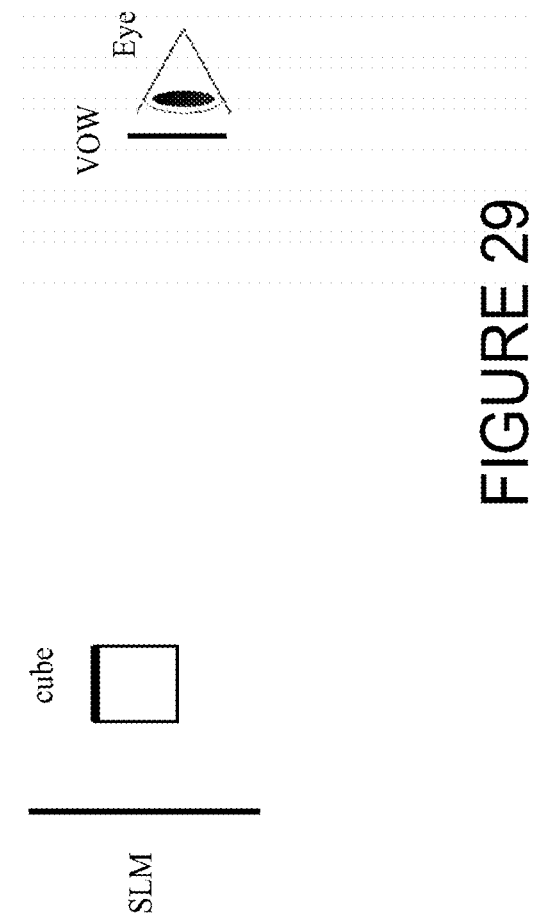
FIG. 29 is a diagram of geometrical considerations relevant to occlusion.

An example of the desired occlusion behaviour for a holographic display is given in FIG. 29. In FIG. 29, from the eye position shown, it should not be possible to see the thick side of the cube, because it is occluded by the side of the cube which is closest to the viewer. If the VOW were several times the size of the eye pupil, the viewer could look at the cube from a different direction so as to be able to see the thick side of the cube. But with a simple implementation of occlusion, the thick side of the cube would not have been encoded on the SLM, so even if the viewer were to change the viewing direction, the viewer would not see the thick side of the cube, because it was not encoded on the SLM.

Figure 30:
FIG. 30 is a diagram of geometrical considerations relevant to occlusion.

In FIG. 30, the viewer looks at the cube from a different direction to that shown in FIG. 29 so as to be able to see the thick side of the cube. But with a simple implementation of occlusion, if occlusion has not been implemented for the case of FIG. 29, the thick side of the cube would not have been encoded on the SLM, so the viewer in FIG. 30 does not see the thick side of the cube, because it was not encoded on the SLM: there are no reconstructed object points for the thick side of the cube in FIG. 29, hence there are no reconstructed object points for the thick side of the cube in FIG. 30.

One solution to the problem shown in FIG. 30 is to separate the VOW into two or more segments. Object points are then reconstructed for each VOW segment. The size of each VOW segment is preferably about the same size as the human eye pupil size.

Figure 31:
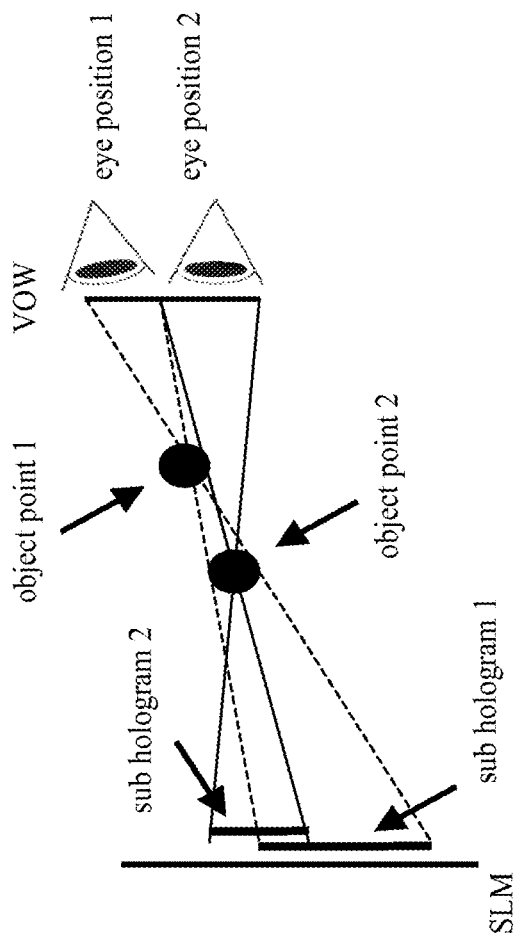
FIG. 31 is a diagram of a method of dealing with occlusion phenomena, according to an implementation.

In FIG. 31, from eye position 1 the viewer will see object point 1 but not the occluded object point 2. From eye position 2, the viewer will see the object point 2, but not object point 1 which cannot be seen from that position and viewing direction. Therefore from eye position 2 the viewer can see object point 2 which is occluded by object point 1 when viewing from eye position 1. Object point 1 and object point 2 are encoded respectively in subhologram 1 and subhologram 2.

Figure 32:
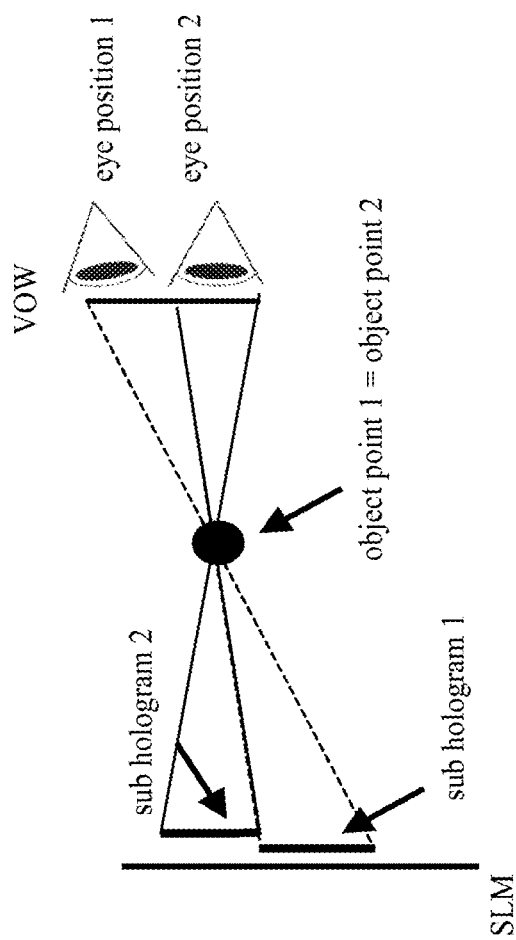
FIG. 32 is a diagram of a method of dealing with occlusion phenomena, according to an implementation.

However, in FIG. 32 object point 1 and object point 2 which are coincident can be seen from both eye position 1 and eye position 2, because they are encoded respectively in subhologram 1 and subhologram 2.

Alternatively occlusion may be performed at the stage that the depth map and intensity map is constructed. In this case, preferably one depth map and intensity map pair should be constructed for each eye i.e. for each virtual observer window.

In the example of an implementation included here, occlusion is implemented using calculations which are performed by circuitry which is present in the space of the pixel matrix. Such circuitry may include TFTs. Occlusion may also be implemented using calculations which are performed by circuitry which is present on the same substrate as the pixel matrix, but the circuitry is outside the pixel matrix.

J. Graphics Card Functionalities

A Graphics Processing Unit or GPU (also occasionally called Visual Processing Unit or VPU) is a dedicated graphics rendering device for a personal computer, workstation, or game console. Modern GPUs are very efficient at manipulating and displaying computer graphics, and their highly parallel structure makes them more effective than typical CPUs for a range of complex algorithms.

Modern graphics processing units (GPU)s use most of their transistors to do calculations related to 3D computer graphics. They were initially used to accelerate the memory-intensive work of texture mapping and rendering polygons, later adding units to accelerate geometric calculations such as translating vertices into different coordinate systems. Recent developments in GPUs include support for programmable shaders which can manipulate vertices and textures with many of the same operations supported by CPUs, oversampling and interpolation techniques to reduce aliasing, and very high-precision color spaces.

In addition to the 3D hardware, today's GPUs include basic 2D acceleration and frame buffer capabilities (usually with a Video Graphics Array (VGA) compatibility mode). In addition, most GPUs made since 1995 support the YUV color space and hardware overlays (important for digital video playback), and many GPUs made since 2000 support Moving Picture Experts Group (MPEG) primitives such as motion compensation and Inverse Discrete Cosine Transform (iDCT). Recent graphics cards even decode high-definition video on the card, taking some load off the central processing unit. The YUV color space model defines a color space in terms of one luma and two chrominance components. The YUV color model is used in the PAL, NTSC, and SECAM composite color video standards.

Here in the context of holograms, the implementation of graphics card functionalities involves ensuring that the above described functionalities are implemented when the holograms are calculated for display, where the display may perform all the holographic calculations in the space of the pixel matrix, or at least some of the holographic calculations in the space of the pixel matrix. For example, this includes implementing shaders which can manipulate vertices and textures with many of the same operations supported by CPUs, oversampling and interpolation techniques to reduce aliasing, the use of very high-precision color spaces, to accelerate the memory-intensive work of texture mapping and rendering polygons, to accelerate geometric calculations such as translating vertices into different coordinate systems, and performing computations involving matrix and vector operations. For calculating holograms, the highly parallel structure of GPUs makes them more effective than typical CPUs for a range of complex algorithms. Alternatively, the holographic display may be one in which no holographic calculations are performed in the space of the pixel matrix.

Here in the context of holograms, the implementation of graphics card functionalities may involve using a 3D-rendering pipeline which is implemented by TFTs in the space of the pixel matrix, or outside the pixel matrix but on the same substrate as the pixel matrix. In other words the functionality of a 3D-rendering pipeline, such as implementing shader functionalities, is shifted from the graphics cards used in the prior art to the TFTs situated within a LC-panel.

Alternatively, the holographic display may be one in which no holographic calculations are performed in the space of the pixel matrix. Alternatively still, the holographic display may be one in which no holographic calculations are performed in the space of the pixel matrix, but the holographic calculations may be performed using circuitry which is present on the same substrate as the pixel matrix.

K. 2D-3D Conversion

In one example of 2D-3D conversion, a first image and a second image which form a pair of stereoscopic images, are sent to the display device with all or at least some holographic calculation performed in the space of the pixels or elsewhere on the substrate of the pixels. The 2D-3D conversion calculation may take place in circuitry in the space of the pixel matrix or elsewhere on the substrate of the pixels, or it may take place in circuitry which generates the depth map and colour intensity map to be sent to the display, or it may take place in circuitry elsewhere, as would be clear to one skilled in the art. The second transmitted image may be the difference image between the two stereoscopic images, as a difference image will typically require less data than a complete image. If a three dimensional video display is in progress, the first image may itself be expressed as the difference between the present image and the image from one timestep earlier. Similarly the second image may be expressed as the difference between the present image and the image from one timestep earlier. The display device may then calculate a two dimensional (2D) image, with its corresponding depth map, from the data received, using calculation procedures for converting between 2D and three dimensional (3D) images known in the art. In the case of a colour image, three component 2D images in the three primary colours are required, together with their corresponding depth maps. The data corresponding to the 2D images and depth maps may then be processed by the device to display a holographic image. The device encodes the holograms in its SLM. To make efficient use of transmission bandwidth, the data transmitted within this system may be subjected to known compression procedures, with corresponding decompression being performed at the display device.

The circuitry which performs the 2D-3D conversion may have access to a library containing a set of known 3D shapes, to which it may try to match its calculated 3D data, or it may have access to a library containing a set of known 2D profiles to which it may try to match incoming 2D image data. If a good match can be found with respect to a known shape, this may speed up calculation processes, as 2D or 3D images may then be expressed relative to a known shape. Libraries of 3D shapes may be provided such as the face or body shapes of a set of sports stars such as leading tennis players or soccer players, and the shapes of all or parts of leading sports venues such as famous tennis courts or famous soccer grounds. For example, a 3D image of a person's face may be expressed as being one to which the display device has access, plus a change to the facial expression which may be a smile or a frown for example, plus some change in the hair length as the hair may have grown or been cut since the stored data was obtained, for example. The data to which the display device has access may be updated by the display device if a persistent set of differences emerges such that it is clear that the data to which the display device has access has become out of date, eg. the person's hair length has been changed significantly and on a long term basis. If the calculation circuitry encounters a 2D or 3D image to which no good match can be found in the records to which it has access, it may add the new shape to the set of records.

2D-3D image conversion may also be performed based on a single, non-autostereoscopic 2D image using procedures known in the art for performing such conversions. The 3D image data (depth map and colour map) may then be sent to the display for holographic image calculation and display.

The above 2D-3D conversions may be used for data which is used for display on a holographic display in which all the holographic calculations take place in circuitry in the space of the pixel matrix, or at least some of the holographic calculations take place in circuitry in the space of the pixel matrix, or elsewhere on the substrate of the pixels.

L. Conferencing (3D Skype™)

From EU Community Trade Mark application E3660065, Skype™ is known for providing voice over Internet (VOIP) peer-to-peer communications, and file sharing, and instant messaging services over a global network; providing communication services, file sharing and instant messaging services over a computer network.

From EU Community Trade Mark application E4521084, Skype™ is known for providing computer services and software development for others, namely, design of computer software and hardware for use in telecommunications and voice over internet protocol (VOW) applications, data transmission and instant messaging services; creating and maintaining web sites for others; hosting web sites of others on a computer server for a global computer network; installation and maintenance of computer software; providing temporary use of online, non-downloadable computer software that allows subscribers to utilize VOIP communication services; providing online software for downloading by others that allows subscribers to utilize VOIP communication services.

From UK Trade Mark 2358090, Skype™ is known for providing internet access, portal and caching services; telecommunications and telecommunications services; Internet Protocol ("IP") services; Voice over Internet Protocol ("VoIP") services; email and Internet communications services; telecommunications services via a third party; Internet Protocol ("IP") to numeric telephone number and numeric telephone number to "IP" mapping systems and databases; domains and domain database systems; leasing of access time to computer databases provided by Internet Services Providers.

Any of the above may be provided in conjunction with a holographic display which may perform all holographic calculations using circuitry in the space of the pixel matrix, or at least some holographic calculations using circuitry in the space of the pixel matrix, except that where Skype™ provides VOIP, here there is provided a voice and holographic image over internet protocol (VHIOIP). In one case, the above described procedures are performed by TFTs within the LC-panel. Alternatively, any of the above may be provided in conjunction with a holographic display which does not perform holographic calculations in the space of the pixel matrix, except that where Skype™ provides VOIP, here there is provided a voice and holographic image over internet protocol (VHIOIP). Alternatively still, any of the above may be provided in conjunction with a holographic display which does not perform holographic calculations in the space of the pixel matrix, but which performs holographic calculations using circuitry on the same substrate as the pixel matrix, except that where Skype™ provides VOIP, here there is provided a voice and holographic image over internet protocol (VHIOIP). Alternatively still, any of the above may be provided in conjunction with any holographic display, except that where Skype™ provides VOIP, here there is provided a voice and holographic image over internet protocol (VHIOIP).

Alternatively, any of the above may be provided in conjunction with a holographic display which does not perform holographic calculations in the space of the pixel matrix, except that where Skype™ provides VOW, here there is provided a voice and holographic image over internet protocol (VHIOIP).

In the above, VHIOIP may be provided in the form of voice and video holographic image over internet protocol (VVHIOIP). The VHIOIP or VVHIOIP may be provided in real time or in quasi-real-time, and these internet protocols may enable real-time or quasi-real-time video holographic communication between two human beings who each use a holographic display.

M. Encoding compensations.

In conventional photography, exposure compensation is a technique to compensate a calculated or planned exposure level against other factors which may render a sub-optimal image. These factors may include variations within a camera system, filters, non-standard processing, or intended under or overexposure. Cinematographers may also apply exposure compensation for changes in shutter angle or film speed, among other factors. In photography, some cameras include this as a feature to allow the user to adjust the automatically calculated exposure. Compensation can be applied both positively (additional exposure) and negatively (reduced exposure) in steps, normally in third or half f-stop increments up to a maximum of normally two or three stops in either direction.

In optics, the f-number of an optical system expresses the diameter of the entrance pupil in terms of the effective focal length of the lens. On a camera, the f-number is usually adjusted in discrete steps, known as f-stops. Each "stop" is marked with its corresponding f-number, and represents a halving of the light intensity from the previous stop. This corresponds to a decrease of the pupil and aperture diameters by a factor of the square root of 2, and hence a halving of the area of the pupil.

Exposure compensation is employed when the user knows that the camera's automatic exposure calculations will result in an undesirable exposure. A scene that is predominantly light tones will often be underexposed, while a dark-toned scene will be overexposed. An experienced photographer will have gained a sense of when this will happen and how much compensation to apply to get a perfectly exposed photograph.

Any of the above may be provided in conjunction with a holographic display which performs all holographic calculations on the same substrate as the pixel matrix, or at least some holographic calculations on the same substrate as the pixel matrix. Any of the above may be provided in conjunction with a holographic display which performs all holographic calculations on the same substrate as the pixel matrix, or at least some holographic calculations in the space of the pixel matrix. Alternatively, any of the above may be provided in conjunction with any holographic display. Compensation may be applied to the holographic image data at or before the encoding step, to provide an image which will be easier to view i.e. which the typical observer will find to have been exposed correctly, and not to have been either under-exposed or over-exposed.

N. Eye Tracking

Holographic devices may use eye tracking, for one or more viewers. This is particularly advantageous when the viewing window size for each eye is small, such as being only a few millimetres in lateral extent. Preferably a position finder is used to track the eyes of users in several steps:
  1) limiting the search range by detecting the user's face
  2) limiting the tracking range by detecting the eyes
  3) tracking the eyes The calculation module for performing the eye position identification function is provided with a stereo image pair as supplied by a stereo camera. After having used the algorithms of the module, the module returns the x-, y-, and z-coordinates of each eye relative to a fixed point, such as the centre of the SLM. Such coordinates can, for example, be transmitted by a serial interface. The computation required in order to perform this procedure may be performed by circuitry, such as TFTs, situated on the same substrate as the pixels of the display, including circuitry situated within the pixel matrix.

In order to track the eye of a viewer, the holographic encoding on the SLM panel may be displaced in the x- and/or y-directions i.e. in the plane of the panel. Dependent on the type of holographic encoding method used (e.g., 1D-encoding), it may be preferable that tracking of eyes in one lateral direction should be carried out by displacing the entire holographic encoding content on the SLM in the x- or y-direction. Prior to holographic encoding of the SLM, the calculation module calculates the offset of the hologram data in relation to the SLM in the x- or y-direction. As input, the x, y and z-coordinates of a viewer's eye are provided.

In order to track the eye of a viewer, the holographic encoding on the SLM panel may be displaced in the x- and/or y-directions i.e. in the plane of the panel. Tracking can also be carried out such that the light sources that coherently illuminate the SLM are moved in synchronism with position changes of the viewer. Either the light sources that emit light are moved, or coherent light is generated in that point light sources or line light sources with very narrow openings are illuminated by non-coherent light. The light passing through such openings is considered to be coherent. If the light sources are created by the pixels of an LC-display, they are addressable and can be adapted to the positions of the viewer(s) in real time.

O. Aberration Correction

Within some types of holographic display, aberration correction is the correction of aberrations caused by the lenses in a lenticular array, or in a 2D-lens array, that performs the Fourier transformation. Aberration effects depend on the angle between the light propagation direction to the viewer and the optic axis, and may be corrected dynamically through the encoding of the spatial light modulator. The correction algorithm may be performed in parallel, and independently, of the holographic calculation up to the step where the sum-hologram is generated. After that step the sum-hologram and the aberration correction map may be modulated together.

Figure 33:
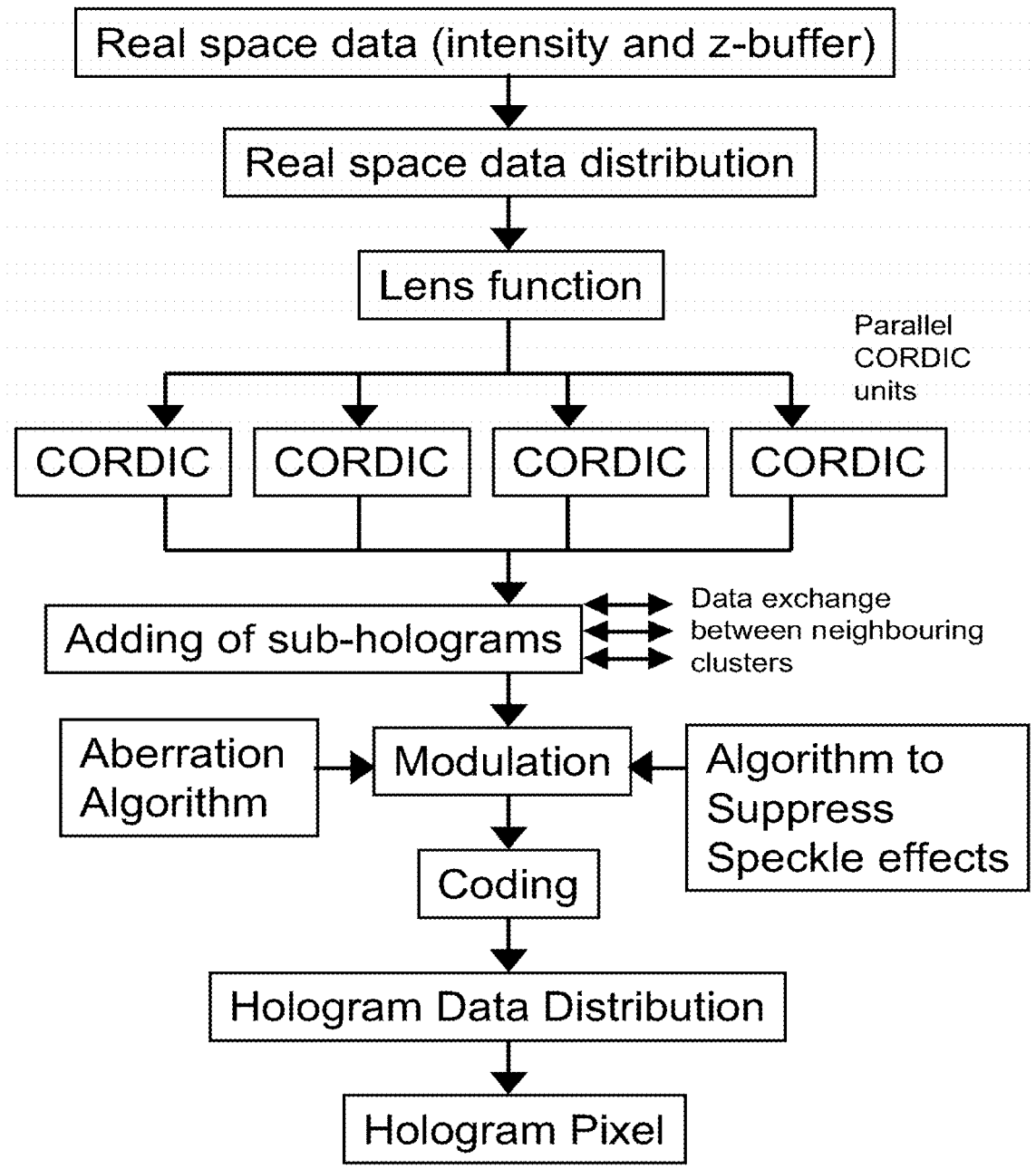
FIG. 33 is a diagram of the paths taken by display data according to a holographic display device of an implementation.

The aberration correction algorithms can implemented analytically or using look-up tables (LUT) as well. Preferably the resulting hologram calculation values are modulated by complex multiplication only after the sum hologram is available. An example of the implementation of aberration correction is given in FIG. 33. In FIG. 33 the aberration correction is implemented using circuitry in the space of the pixel matrix. However in other cases the aberration correction may be implemented using circuitry outside the space of the pixel matrix, but on the same substrate as the pixel matrix.

P. Speckle Correction

Within some types of holographic display, speckle correction is the reduction or elimination of speckle caused by too large a degree of optical coherence between different areas on the display. Speckle effects may be corrected dynamically through the encoding of the spatial light modulator. The correction algorithm may be performed in parallel, and independently, of the holographic calculation up to the step where the sum-hologram is generated. After that step the sum-hologram and the speckle correction map may be modulated together.

The speckle correction algorithms can implemented analytically or using look-up tables (LUT) as well. Preferably the resulting hologram calculation values are modulated by complex multiplication only after the sum hologram is available. An example of the implementation of speckle correction is given in FIG. 33. In FIG. 33 the speckle correction is implemented using circuitry in the space of the pixel matrix. However, the speckle correction may be implemented using circuitry outside the space of the pixel matrix, but on the same substrate as the pixel matrix.

Q. Decryption in Digital Rights Management (DRM) for a Holographic Display

Content data supplied to a holographic display may be protected by DRM i.e. encrypted content data is received by the display. High-bandwidth Digital Content Protection (HDCP) is a common standard to implement DRM for 2D displays. The High-Definition Multimedia Interface (HDMI) receiver with the HDCP decryption is normally located on the printed circuit board (PCB) of the 2D display's electronics. One of the fundamental weaknesses of conventional systems is that the transfer of image data from the display electronics to the panel is normally after decryption. So it is possible to capture the decrypted data by making electrical connections to the data transmission circuitry for the panel.

In an example of an implementation, decryption and hologram calculation are executed using circuitry within the pixel matrix. In a further example of an implementation, decryption and hologram calculation are executed in a distributed sense using circuitry which is distributed within the pixel matrix. Therefore there is no single place on the panel from which all decrypted data can be captured. If different decryption keys are used for different areas of the panel, the extraction of the decryption keys will become more difficult. Because there are no connectors on the panel from which to extract the decrypted data from the panel, those wishing to circumvent DRM must know the circuit diagram and several TFT transistors must be connected to which are widely separated across the working display in order to access decrypted data. This contributes to improved DRM protection.

A further example of an implementation is that decryption and hologram calculation is executed using circuitry which is on the substrate of the pixel matrix, including the case where the circuitry is outside the pixel matrix. A further example of an implementation is that decryption and hologram calculation is executed in a distributed sense using circuitry which is distributed across the substrate of the pixel matrix, including the case where the circuitry is outside the pixel matrix.

R. Decryption in Digital Rights Management (DRM) for a 2D Display

Content data supplied to a 2D display may be protected by DRM i.e. encrypted content data is received by the display. High-bandwidth Digital Content Protection (HDCP) is a common standard to implement DRM for 2D displays. The High-Definition Multimedia Interface (HDMI) receiver with the HDCP decryption is normally located on the printed circuit board (PCB) of the 2D display's electronics. One of the fundamental weaknesses of conventional systems is that the transfer of image data from the display electronics to the panel is normally after decryption. So it is possible to capture the decrypted data by making electrical connections to the data transmission circuitry for the panel.

In an example of an implementation, decryption is executed in a distributed sense using circuitry which is distributed across the SLM panel. Therefore there is no single place on the panel from which all decrypted data can be captured. If different decryption keys are used for different areas of the panel, the extraction of the decryption keys will become more difficult. Because there are no connectors on the panel from which to extract the decrypted data from the panel, those wishing to circumvent DRM must know the circuit diagram and several TFT transistors must be connected to which are widely separated across the working display in order to access decrypted data. This contributes to improved DRM protection.

In a further example of an implementation, there is a 2D display device in which decryption calculations are executed using circuitry which is in a single area of the display substrate, which may be inside the pixel matrix or outside the pixel matrix. Such circuitry is harder to access than circuitry which is on the PCB of the display. This contributes to improved DRM protection.

S. Software Application Implemented in Hardware, Hard-Wired into a Display

In principle many pieces of computer software may also be implemented independently using computer hardware. In an example of an implementation, an application which may be implemented using software is instead implemented in hardware using circuitry which is distributed across the substrate of an SLM panel. The circuitry may be within the pixel matrix, or it may be on the same substrate as the pixel matrix but outside the pixel matrix. The SLM panel may be that for a holographic display, or for a 2D display.

T. Variable Beam Deflection with Microprisms

Figure 34:
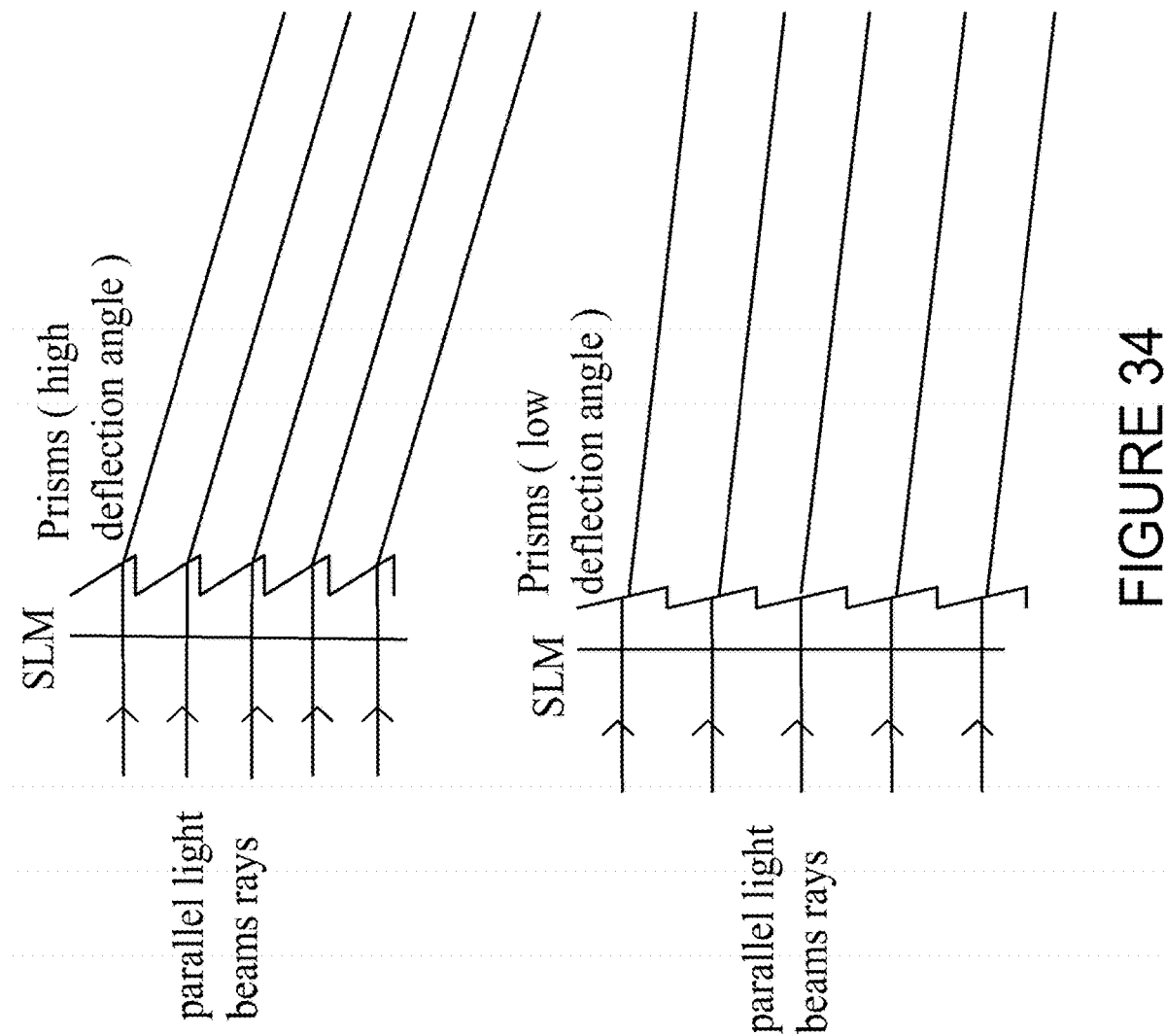
FIG. 34 is a diagram of a method of tracking one or more users by moving the virtual observer window using controllable prisms, according to an implementation.

For a holographic display, the viewer's or viewers' eye positions may be tracked, variable beam deflection to the viewer's or viewers' eye positions being performed using a microprism array which enables controllable deflection of optical beams. The controllable deflection may be continuously variable. The tracking is performed by a position detection and tracking system. The properties of the prisms can be controlled in such a way that they deflect light in either one or two dimensions. Two dimensional deflection could be obtained by using two microprism arrays in series, for example, with the longitudinal axes of the prisms in one array being disposed at a significant angle, such as about 90°, to the longitudinal axes of the prisms in the other array. Such a geometry, for a different application, is described in eg. U.S. Pat. No. 4,542,449 which is incorporated here by reference. FIG. 34 shows light being deflected by a smaller or by a larger angle depending on the properties of the prisms. The prisms may be Micro Liquid Prisms [eg. as described in "Agile wide-angle beam steering with electrowetting microprisms" Heikenfeld et al., Optics Express 14, pp. 6557-6563 (2006), which is incorporated herein by reference], for which the deflection angles can be varied according to the applied charge, or other known prism arrays which enable controllable deflection of optical beams.

As can be seen in FIG. 34, parallel light rays passing through the SLM and the prism mask are deflected according to the properties of the prisms. An advantage of this procedure is that optical effects like aberrations of lenses can be reduced prior to light passing through the prism. This method is suitable for placing the VOWs at the viewer's or viewers' eyes. In an alternative example, a focussing means such as a Fourier lens array placed before or after the prism array will assist to converge the light rays into the VOW.

When an observer changes his position, the deflection angle of the prisms may be adjusted accordingly, such as by adjusting the applied voltage on the micro liquid prism array. The deflection angle may be continuously variable. The prisms need not all have the same deflection angle. It is also additionally possible to control each prism individually, so that each may have a different deflection angle, eg. for Z Tracking i.e. enabling the light rays exiting the prism array to converge somewhat at the VOW, as the distance of the VOW from the display may vary as the viewer moves closer to the display or further away from the display.

The prism angle calculation can be performed taking into account the user position. The prism angle calculation can be performed in computational circuitry on either the SLM's substrate, such as that that reconstructs the object points, or using computational circuitry placed on the substrate of the prism array. An independent substrate for the prism array is not needed if the substrate of the SLM can also be used as the substrate for the prism array.

A communications interface between the position finder and the SLM is necessary: for instance this could be a serial interface.

If the computational circuitry for calculating the prism array deflection angles is not on the substrate of the prism array but is on the substrate of the SLM, then a data connection is necessary between both substrates so the electrodes of the prism array can be controlled using the results of the calculation.

In addition to the calculation for controlling the prisms, one has to apply a phase correction to compensate for phase "jumps" (or phase discontinuities) introduced by the prism array. Otherwise the prism array would behave like a blazed grating i.e. the portions of the wavefront passing through different prisms have different optical path lengths to the VOW, hence they will behave like a grating, while the change of the prism angle affects the amount of energy distributed to the different diffraction orders. This phase correction may be performed by the SLM in addition to its function of hologram encoding. The light passing through both components, i.e. the prism array and the SLM, undergoes a complex multiplication by the functions of each component. The corrected phase map includes the phase correction required for the micro prism array: the hologram is encoded with the values representing the SLM cell states which reconstruct object points, including the phase correction terms.

The above may also be applied to the case where the holographic image is generated in a projection-type apparatus, where the projection involves imaging a SLM onto the prism array while the reconstruction of the desired 3D scene occurs in front of the VOW, thereby creating projection apparatus equivalent to those known in the art. The calculations and apparatus required are similar to those described above, as would be appreciated by one skilled in the art. The deflection angles for the prisms in the prism array, and the according phase compensation to correct for phase discontinuities, have to be calculated. The phase compensation for the prism array can be either provided when imaging the SLM onto the prism array or separately by an additional SLM placed near to the prism array. The SLM can be transmissive with the prism array reflective, or the SLM can be reflective with the prism array transmissive, in order to enable projection, as would be appreciated by one skilled in the art.

Micro Liquid Prisms are described e.g. in "Agile wide-angle beam steering with electrowetting microprisms" Heikenfeld et al., Optics Express 14, pp. 6557-6563 (2006), which is incorporated herein by reference. The technology is known as "electrowetting" or "e-wetting". In this technology, the contact angle formed by an interface between a transparent conducting liquid and another fluid (eg. air) with an electrode coated with a hydrophobic insulator is a function of the voltage difference applied to the electrode with respect to the transparent conducting liquid. Independent control of the voltages applied to two electrodes each covered with a hydrophobic insulator, each electrode forming a side-wall of an e-wetting cell opposite the other side wall formed by the other electrode, permits control of the angle by which an optical beam is steered as it traverses the cell. Other configurations for achieving optical beam steering by electrowetting prisms will be obvious to those skilled in the art. The optical beam deflection angle is controlled by using variable voltage differences applied to different electrodes located on different sides of each of an array of electrowetting cells.

First Outline Manufacturing Process

In the basic structure of the thin film semiconductor display device of an implementation, there is provided a display part with circuitry disposed in between the pixels of the display part, or elsewhere on the substrate, for performing calculations associated with the display of data on the display part of the device. The display part, and the calculation-performing circuitry within the display part or elsewhere on the substrate, are formed integrally on the substrate. Further circuitry for driving the display part may be formed peripherally to the display part, but integrated on the same substrate.

The TFT circuitry for operating the spatial modulator, and further circuitry such as for performing logic operations, may be created on a substrate by a method such as is described in the following, which is similar to a method described in U.S. Pat. No. 6,153,893 for fabricating a different device structure; U.S. Pat. No. 6,153,893 is incorporated herein in its entirety by reference. Other methods will be obvious to those skilled in the art. The substrate may be a large area substrate, and the substrate may be a suitable type of glass. With glass substrates the processes which are often used tend to be low temperature processes, at least by the standards of Si device fabrication technology. Processes such as thermal oxidation of silicon at approximately 1000° C. for producing device gate insulating layers tend to be incompatible with low temperature processes, which would typically be in the temperature range from 350° C. to 700° C.

Pixel electrodes and thin film transistors for switching are arranged in a matrix in the display part. Thin film transistors to constitute circuit elements are in between the pixels of the display part or elsewhere on the substrate, and optionally in the display driving part which may be integrated on the same substrate. The thin film transistor may be a bottom gate type comprising a gate electrode, a polycrystalline semiconductor layer formed on an insulating layer on the gate electrode, and a high concentration impurity film constituting a source and a drain formed on the polycrystalline semiconductor layer. TFTs for switching may have a lightly doped drain (LDD) structure wherein a low concentration impurity film is interposed between the polycrystalline semiconductor layer and the high concentration impurity film.

In a typical implementation, the display part has an upper side part that includes pixel electrodes, a lower side part that includes TFTs for switching, and possibly a colour filter layer, a black mask layer and a planarization layer interposed between the upper and lower sides. In this case, the black mask layer contains a metal wiring pattern electrically connected to the high concentration impurity layer for the source and drain. Also, the pixel electrodes are electrically connected via the metal wiring pattern to the high concentration impurity film for the drain. Alternatively, a colour filter layer can be omitted if a backlight is used with three primary colours which illuminate in a time-multiplexed mode.

A display device with the above described structure can be manufactured by the following low temperature process. First, gate electrodes are formed on the glass substrate. Next, a semiconductor thin film is formed on an insulating film on the gate electrodes and then the semiconductor thin film is transformed into a polycrystalline layer by laser annealing. A low concentration impurity layer is then selectively formed only on the polycrystalline layer included in pixel switching, such as through the use of a mask layer. Further, a high concentration impurity layer for sources and drains is formed on the low concentration impurity film, and TFTs for switching having a stacked LDD structure are thereby formed. At the same time, TFTs for circuit elements are made by directly forming a high concentration impurity layer for sources and drains on the polycrystalline layer included in the circuitry parts, such as for image display calculation, or for the peripheral driving part. Preferably, laser annealing is performed selectively on the high concentration impurity layers included in the circuitry parts in order to reduce the resistance of the polycrystalline semiconductor layer.

After gate electrodes are formed on a glass substrate a semiconductor film is formed at low temperature on a gate insulating film on the gate electrodes. The semiconductor film is then transformed into a polycrystalline layer by laser annealing. Hence it is possible to form a polycrystalline TFT by low temperature processes. The laser used will typically have a short wavelength so that the laser radiation is strongly absorbed in Si: an example is an excimer laser, but others are known. Because the TFT is a bottom gate type, this structure does not readily suffer adverse influences from impurities such as sodium in the glass substrate. The polycrystalline semiconductor layer used in the device region permits one to make the TFT small. In the TFTs for pixel switching, the LDD structure keeps leakage currents low. If the leakage currents were too high, these would be fatal defects in a display device. In the TFTs constituting circuit elements, by contrast, N-channel TFTs and P-channel TFTs can be formed at the same time by superposing a high concentration impurity layer on the polycrystalline semiconductor layer by low temperature processes. Additional laser annealing of the TFTs constituting circuit elements may be performed to increase the speed of these TFTs. A further structure may be adopted, including a colour filter layer, a black mask layer and a planarization layer, to contribute to the attainment of higher pixel density and higher aperture rates.

The structures which can be made by this manufacturing method are not limited to TFT structures but can be applied to any known structures.

Second Outline Manufacturing Process

In the basic structure of the thin film semiconductor display device of an implementation, there is provided a display part with circuitry disposed in between the pixels of the display part, or elsewhere on the same substrate, for performing calculations associated with the display of data on the display part of the device. The display part, and the calculation-performing circuitry, are formed integrally on the substrate. Further circuitry for driving the display part may be formed peripherally to the display part, but integrated on the same substrate.

The TFT circuitry for operating the spatial light modulator, and further circuitry such as for performing logic operations, may be created on a substrate by a method such as is described in the following, which is similar to the method described in U.S. Pat. No. 6,140,667 for fabricating a different device structure; U.S. Pat. No. 6,140,667 is incorporated herein in its entirety by reference. Other methods will be obvious to those skilled in the art. The type of silicon which can be made using this manufacturing process is called "continuous grain silicon" and its electrical characteristics may be similar to those of monocrystalline silicon in some respects, or in many respects.

FIGS. 11A-11E, 12A-12D and 13A-13C show an outline of the process which may be used to form continuous grain (CG) silicon suitable for use in displays, including use in pixel switching, display driving and logic circuitry. The substrate 1101 may be a large area substrate, and the substrate may be a suitable type of glass, or quartz. A non-transparent substrate such as intrinsic polycrystalline silicon or a ceramic could be used in the case of a display to be used in a reflective geometry only, as in a reflective geometry light transmission by the substrate is not a necessary requirement. The substrate has an insulating surface. Film 1102 is an amorphous silicon film in which the silicon thickness is between 10 nm to 75 nm, which excludes any oxide formed. The film may be grown by low pressure chemical vapour deposition (CVD), or by a plasma CVD process.

In the following, a process of crystallizing silicon is described, but many others are known in the art. A mask insulating film 1103 is formed, where openings correspond to the desired positions of CG silicon on the substrate. A solution including Ni as a catalyst element for crystallizing amorphous Si is coated by a spin coating process in which layer 1104 is formed. Other catalyst elements such as Co, Fe, Sn, Pb, Pd, Pt, Cu or Au or the like may be used. At the openings in film 1103, the catalyst film 1104 is brought into contact with the amorphous Si film 1102. The amorphous Si film 1102 may then be crystallized by annealing at temperatures between 500° C. and 700° C. for between 4 hr and 12 hr, in an inert atmosphere, or in an atmosphere which includes hydrogen or oxygen.

Figure 11A:
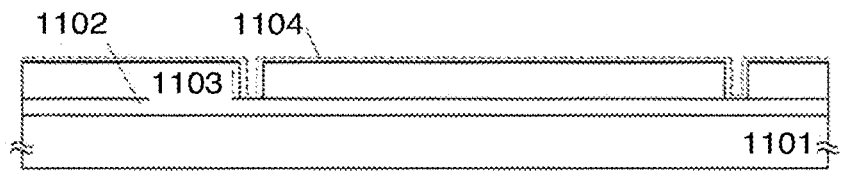
FIGS. 11A-11E contain views showing the fabrication steps of an active matrix substrate of a holographic display of an implementation.
Figure 11B:
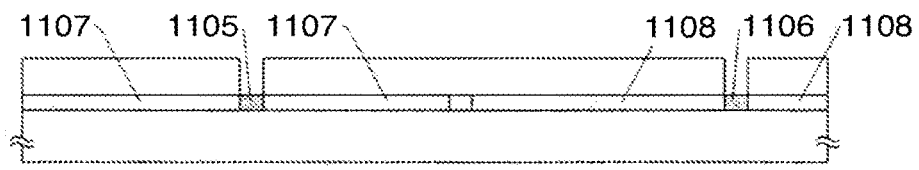
Figure 11C:
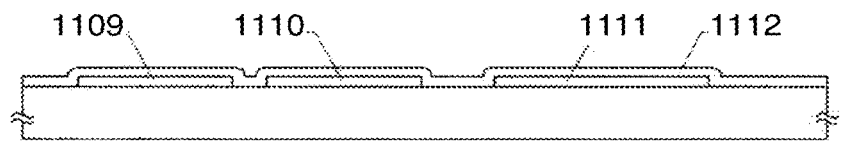

As shown in FIG. 11B, crystallization of the amorphous Si 1102 is promoted in regions 1105 and 1106 by the Ni catalyst. Horizontal growth regions 1107 and 1108, which grow substantially across the substrate, are formed. Only these horizontal growth regions, such as 1107 and 1108, are used as active layers in TFT devices formed on the substrate. Following completion of annealing, mask layer 1103 is removed from the substrate. Patterning is then carried out, as shown in FIG. 11C. Island-like semiconductor layers 1109, 1110 and 1111, which are active layers, are formed across the substrate. 1109 is an active layer of an N-channel type TFT constituting a complementary metal-oxide semiconductor (CMOS) circuit, 1110 is an active layer of a P-channel type TFT constituting a CMOS circuit, and 1111 is an active layer of an N-channel type TFT constituting a pixel matrix circuit.

When the active layers 1109, 1110 and 1111 have been formed, a gate insulating film 1112 comprising an insulating film including silicon is formed. The thickness of the gate insulating film 1112 may be in the range of 20 nm to 250 nm, and one should allow for some oxidation of this film in a later thermal oxidizing step. The film 1112 may be grown using known gas-phase growth methods.

FIG. 11C shows a heat treatment method for removing the Ni catalyst element. Heating is carried out in the presence of a halogen-containing species. Heating is carried out at temperatures between 700° C. and 1000° C. for between 0.1 hr and 6 hr. An example is a heat treatment of 950° C. for 0.5 hr, in an atmosphere containing HCl with 3 volume percent (vol %), or more generally between 0.5 vol % and 10 vol %. Oxidation of the silicon in the film can be lowered by mixing in a high concentration of nitrogen $N_2$ gas in the atmosphere used. Apart from HCl, other halogen-containing species such as HF, HBr, $Cl_2$, $F_2$, $Br_2$, $NF_3$ $ClF_3$, $BCl_3$ and the like may be used. This gettering process serves to remove the Ni catalyst from the film. It seems that this occurs through volatile nickel chloride species being formed which desorb into the atmosphere. The thickness of gate insulating film 1112 will tend to increase during the oxidation process. Regions 1109, 1110 and 1111 are correspondingly thinned, which reduces the OFF current in the TFT, and promotes the field effect mobility amongst other obvious benefits.

Following the above treatment, a heat treatment at 950° C. for 1 hr, in a nitrogen atmosphere improves the quality of the gate insulating film 1112 and the quality of the interface between the gate insulating film 1112 and regions 1109, 1110 and 1111.

Figure 11D:
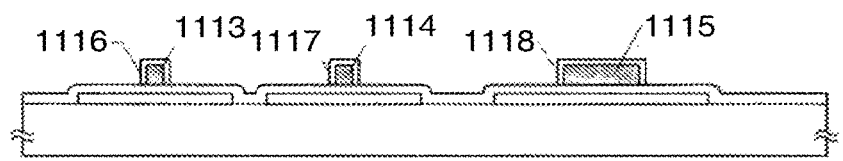
Figure 11E:
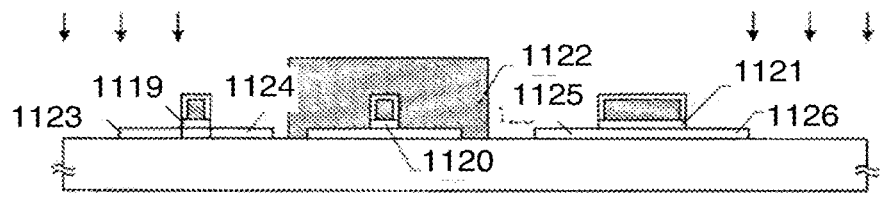
Figure 12A:
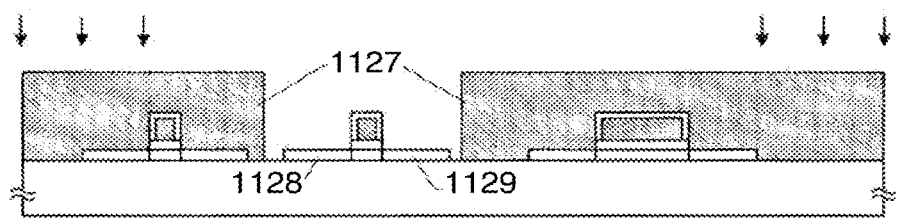
FIGS. 12A-12D contain views showing the further fabrication steps of the active matrix substrate of FIGS. 11A-11E.
Figure 12B:
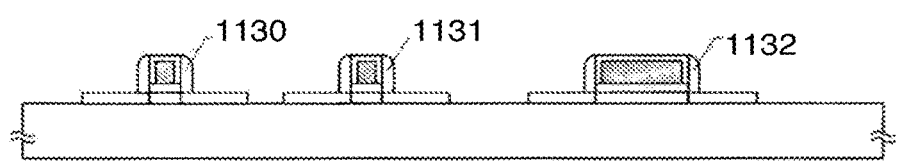

An Al film with 0.2 weight percentage (wt %) of Sc is formed and an electrode pattern for constituting the prototype of a gate electrode, mentioned below, is formed. This is not illustrated in FIG. 11. Other materials suitable for this purpose, such as Ta, W, Mo, or Si can be used. By anodically oxidizing the surface of the pattern, gate electrodes 1113, 1114 and 1115, and anodized films 1116, 1117 and 1118 are formed, as shown in FIG. 11D. In the next step, shown in FIG. 11E, the film 1112 is etched away, such as by using $CHF_3$ gas, so that film 1112 remains only right beneath the electrodes, such as in positions 1119, 1120 and 1121. A resist mask 1122 is used to cover a region intended for a P-channel type TFT. Impurity ions for n-type material are added, indicated by the arrows in FIG. 11E, such as by implantation or plasma deposition. The n-type regions 1123, 1124, 1125 and 1126 are formed. Following this process, the resist mask 1122 may be removed, and a resist mask 1127 may be placed over the n-type regions (FIG. 12A). The p-type regions 1128 and 1129 may then be doped, such as by implantation or plasma deposition. The p-doped regions are the LDD regions. The resist mask 1127 over the n-type regions may then be removed.

Figure 12C:
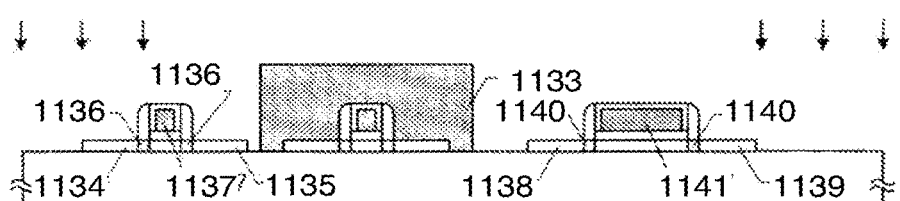
Figure 12D:
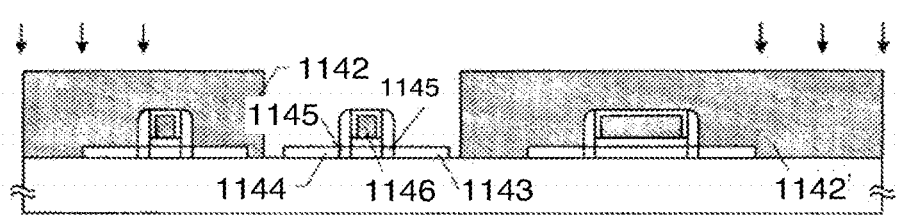

Silicon oxide films are formed on the side walls 1130, 1131 and 1132 via an etch-back process. The p-type regions are covered by a mask 1133, and n-type dopants are added, to boost the concentration of n-type dopants in regions not covered by the oxide side walls. The sheet resistance of the source/drain region is adjusted to less than 500Ω, preferably to less than 300Ω. A channel forming region 1137 which is intrinsic or substantially intrinsic is formed below the gate electrodes. A source region 1138, a drain region 1139, low concentration impurity regions 1140 and a channel forming region 1141 of the N-channel TFT constituting the pixel matrix circuit are formed (FIG. 12C). In FIG. 12D, the resist mask 1133 is removed and the resist mask 1142 is formed over the N-channel type TFTs. Further p-type impurities are added to boost the p-type dopants' concentration. The resist mask 1142 is then removed and the impurity ions are activated by heat treatment, such as furnace annealing, laser annealing or the like. Implantation damage is reduced or eliminated by the heat treatment.

Figure 13A:
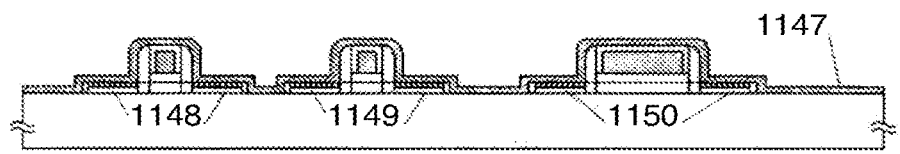
FIGS. 13A-13C contains views showing the further fabrication steps of the active matrix substrate of FIGS. 12A-12D.
Figure 13B:
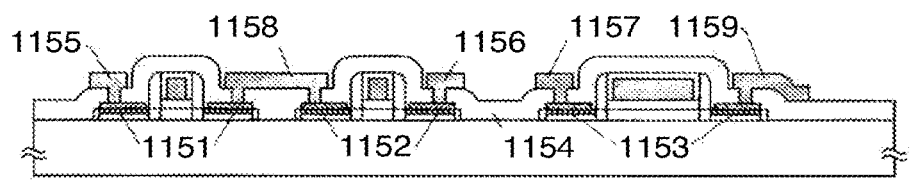

A Ti film 1147 is formed with a thickness between 20 nm and 50 nm and a heat treatment using lamp annealing is carried out. Si in contact with the Ti film reacts to form titanium silicide, and silicide regions 1148, 1149 and 1150 are formed, as shown in FIG. 13A. FIG. 13B shows island-like patterns 1151, 1152 and 1153 which are formed to prevent the silicide film regions 1148, 1149 and 1150 from being eliminated from forming contact holes for connecting source/drain regions and wiring in later steps.

Figure 13C:
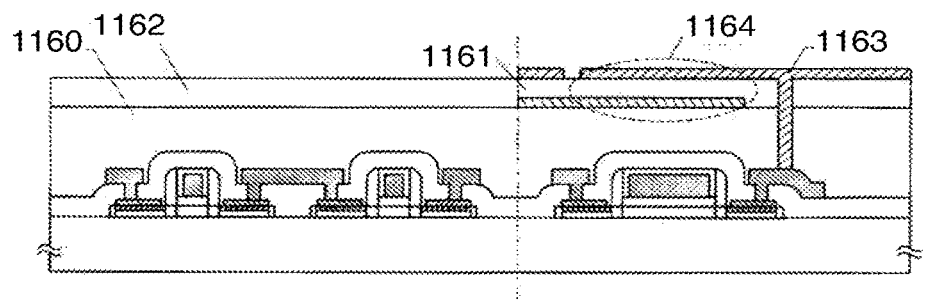

A Si oxide film is formed with a thickness between 0.3 µm and 1 µm as a first interlayer insulating film 1154. Contact holes are formed and source wirings 1155, 1156 and 1157 and drain wirings 1158 and 1159 are formed, as shown in FIG. 13B. An organic resin can be used as a first layer insulating film 1154. In FIG. 13C, a second insulating layer 1160 is formed on the substrate with a thickness in the range from 0.5 µm to 3 µm. Polyimide, acrylic resin, polyamide, polyimide amide or the like is used as the organic resin film. A black mask 1161 is formed on film 1160. A third insulating interlayer film 1162, such as Si oxide, Si nitride, Si oxynitride or an organic resin film, or a laminated film of these, is formed with a thickness in the range 0.1 µm to 0.3 µm. Contact holes are formed at film 1160 and film 1162, and a pixel electrode 1163 is formed with a thickness of 120 nm. An auxiliary capacitance 1164 is formed at a region where the black mask 1161 overlaps the pixel electrode 1163, as shown in FIG. 13C.

The whole substrate is heated at 350° C. for 1 hr to 2 hrs in a hydrogen atmosphere, which compensates dangling bonds, especially in the active layers of the films. After these steps, the CMOS circuit on the left side of FIG. 13C and the pixel matrix circuit on the right side of FIG. 13C can be formed on the same substrate, in adjacent positions for example.

The structures which can be made by this manufacturing method are not limited to TFT structures but can be applied to any known structures, including bottom-gate TFTs.

Third Outline Manufacturing Process

In the basic structure of the thin film semiconductor display device of an implementation, there is provided a display part with circuitry disposed in between the pixels of the display part, or elsewhere on the same substrate, for performing calculations associated with the display of data on the display part of the device. The display part, and the calculation-performing circuitry, are formed integrally on the substrate. Further circuitry for driving the display part may be formed peripherally to the display part, but integrated on the same substrate.

The TFT circuitry for operating the spatial light modulator, and further circuitry such as for performing logic operations, may be created on a substrate by a method such as is described in the following, which is similar to the method described in U.S. Pat. No. 6,759,677 for fabricating a different device structure; U.S. Pat. No. 6,759,677 is incorporated herein in its entirety by reference. Other methods will be obvious to those skilled in the art. The type of semiconductor which can be made using this manufacturing process is polycrystalline silicon-germanium and its electrical characteristics may be similar to, or exceed, those of monocrystalline silicon in some respects, or in many respects.

This manufacturing process results in circuitry on a single substrate. A group of TFTs is produced with polysilicon as the active layer, and which control the pixels of the display. Other TFTs are produced which have functions such as gate driver circuits, source driver circuits and signal processing circuits, in which the active layer is silicon-germanium, in order to bring about high speed operation. Ge is added to the parts of the circuitry requiring high speed operation, whereas poly-Si is used in the circuit section requiring low OFF current characteristics.

An active matrix display device is manufactured having a pixel matrix circuit, and a driver circuit, which is a CMOS circuit in this example, all formed on an insulating surface of a single substrate. The process is shown in FIGS. 6A-6E.

Figure 6A:
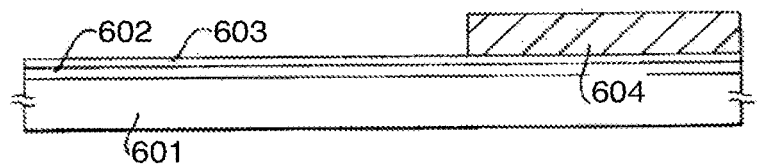
FIGS. 6A-6E are diagrams showing views of a manufacturing process for TFTs.
Figure 6B:
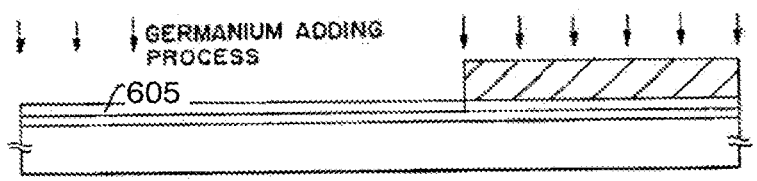

As shown in FIG. 6A, a glass substrate 601 is prepared to form thereon a layer of silicon oxide 602. An amorphous silicon film 603 is formed by a plasma CVD method with a thickness of 30 nm. A resist mask 604 is provided by patterning on the amorphous Si film 603. The resist mask is formed so as to cover the regions to be formed with a TFT group for a pixel matrix circuit. The regions to be formed into high speed circuits are not masked. As shown in FIG. 6B, Ge is added by a technique such as ion implantation, plasma doping or laser doping. Ge is added so as to change the composition of the amorphous Si film to create an average composition of the film of $Si_{1-x}Ge_x$, with $0<x<1$. If ion implantation is used, the region 605 to which the Ge is added suffers implantation damage. The $Si_{1-x}Ge_x$ film 605 is in an amorphous state.

Because the activation energy for bulk diffusion in Ge is lower than in Si, and Ge and Si form a solid solution in each other in the binary alloy phase diagram for temperatures below the melting point, the presence of Ge serves to accelerate crystallization of the $Si_{1-x}Ge_x$ film with respect to the crystallization of a pure Si film. In this respect, Ge may be considered to be a catalytic semiconductor with respect to Si crystallization, such as in laser-induced crystallization.

Figure 6C:
Figure 6D:
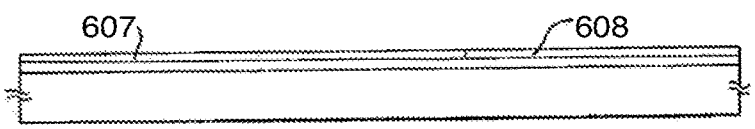

In FIG. 6C the resist layer 603 is removed and a Ni-containing layer 606 is added over the entire surface, as described in U.S. Pat. Nos. 5,643,826; 5,643,826 is incorporated herein in its entirety by reference. Ni is used as catalytic material to hasten crystallization of the Si or the $Si_{1-x}Ge_x$ film. Elements other than Ni, such as Co, Fe, Cu, Pd, Pt, Au or In may be used for this purpose. Crystallization of the Si and $Si_{1-x}Ge_x$ films is achieved by furnace anneal, shown in FIG. 6D, for 8 hours at 600° C. This results in a poly-$Si_{1-x}Ge_x$ region 607 and a poly-Si region 608. Thermal treatment could be carried out using other methods such as laser annealing or lamp annealing.

Figure 6E:
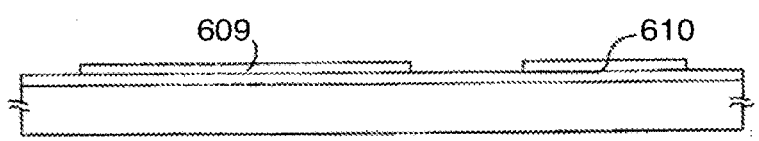

In FIG. 6E, poly-$Si_{1-x}Ge_x$ region 607 is formed into active layer 609. Poly-Si region 608 is formed into active layer 610. Active layer 609 is for an active layer of TFTs for constituting a later driver circuit and signal processing circuit. Active layer 610 is for an active layer of TFTs for constituting a later pixel matrix circuit.

Figure 7A:
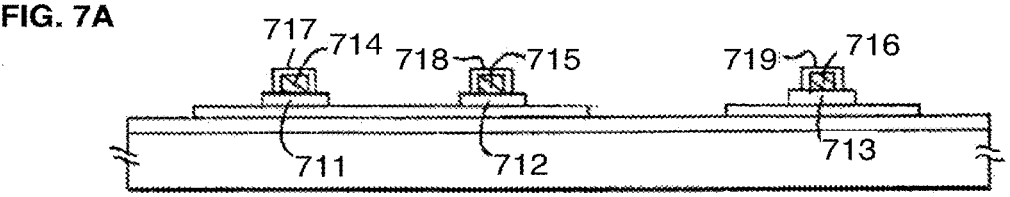
FIGS. 7A-7D are diagrams showing views of a manufacturing process for TFTs.

A source region, a drain region, and a lightly doped drain (LDD) region are formed by a process described in U.S. Pat. Nos. 5,648,277; 5,648,277 is incorporated in its entirety by reference. This process will now be summarized. First, an island pattern, later to be formed into a gate electrode, is formed by using an Al film containing Sc 2 wt %. Next, anodic oxidation is performed for the island pattern to form a porous anodic oxide film on the side walls of the island pattern. Then the solution is changed to further carry out anodic oxidation to form a compact anodic oxide film around the island pattern. After forming the porous anodic oxide film and the compact anodic oxide film in this manner, a gate dielectric film is etched using a dry etch method. After completing the etching of the gate dielectric film, the porous anodic oxide film is removed away, thus obtaining the state shown in FIG. 7A.

Figure 7B:
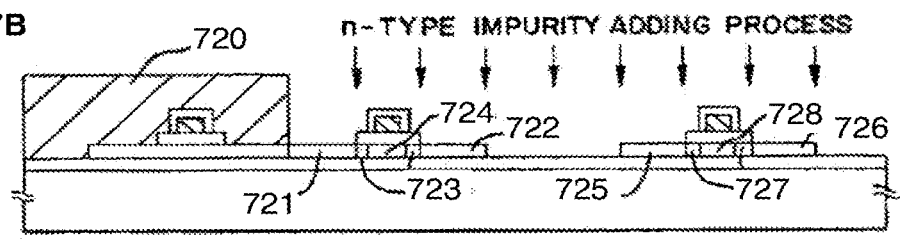

In FIGS. 7A, 711, 712, and 713 are gate insulating films formed by silicon oxide films, 714, 715 and 716 are gate electrodes formed by Al films including Sc, and 717, 718 and 719 are compact anodic oxide films for protecting the gate electrodes. In FIG. 7B, the area to be formed into a P-channel TFT is covered by a mask 720. The rest of the area has n-type ions implanted to as to provide n-type conductivity. Two different acceleration voltages are used, as described in U.S. Pat. No. 5,648,277, to provide a more uniform distribution of implanted ion concentration with depth.

In FIG. 7B, the process results in a drain region 721, a source region 722, a LDD region 723, and a channel region 724 of an n-channel TFT for constituting a driver circuit. Also formed are a drain region 726, a source region 725, a LDD region 727, and a channel region 728 of an N-channel TFT for constituting a pixel matrix circuit.

Figure 7C:
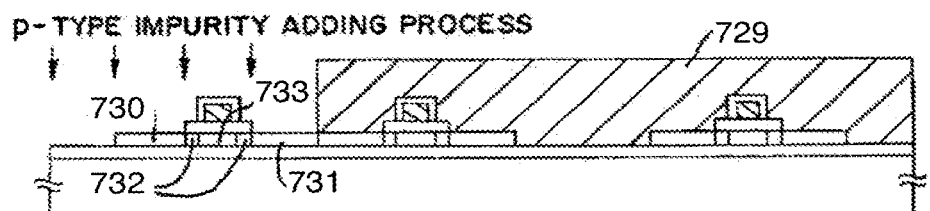

In FIG. 7C, the resist mask 720 is removed and a resist mask 729 is added to cover the n-type regions. Then impurity ions are implanted to provide p-type conductivity using two acceleration voltages as described in U.S. Pat. No. 5,648,277, to provide a more uniform distribution of implanted ion concentration with depth. This forms a source region 730, a drain region 731, a LDD region 732 and a channel region 733 of a P-channel TFT for constituting a driver circuit. The impurity ions are activated through an annealing procedure.

A first interlayer insulating film 734 is formed and contact holes are opened therein to form source electrodes 735, 736, 737 and drain electrodes 738, 739. The insulating layer 734 may be made of a material selected from silicon oxide, silicon nitride, silicon oxy-nitride and resin film. The TFTs for the driver circuit are now complete. The TFTs for the pixel matrix must now be completed. After forming the source electrode and the drain electrode, a second interlayer insulating film 740 is formed, then a black mask 741 comprising a Ti film is formed thereon. If one partly removes the second interlayer insulating film at a position over drain electrode 739 prior to forming black mask 741, it is possible to form an auxiliary capacitance from the black mask, the second interlayer insulating film, and the drain electrode. Next a third insulating layer film 742 is formed over the black mask 741 and a contact hole is formed therein, and a pixel electrode 743 comprising a transparent conductive film, such as indium tin oxide, is formed thereon.

Figure 7D:
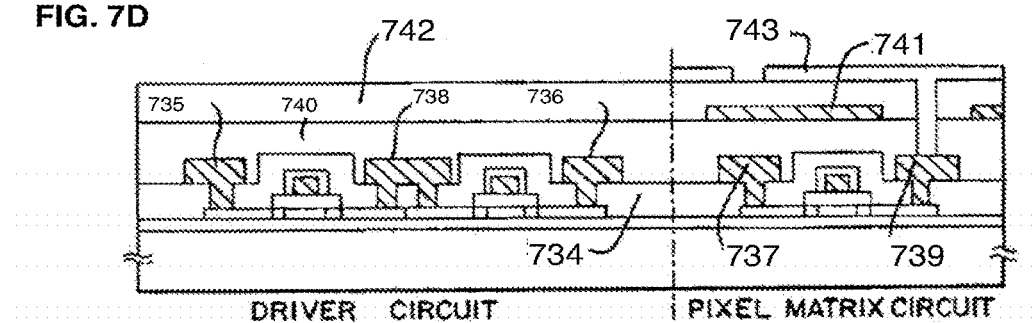

The active matrix substrate with TFTs, as shown in FIG. 7D, including integrally formed pixel and driver circuits which may be adjacent one another is thereby disclosed. It will be understood by those skilled in the art that the CMOS circuit of FIG. 7D could be replaced by other circuits, such as signal processing circuits, which may be formed on the poly silicon-germanium region. The poly silicon-germanium region possesses high field effect mobility, and hence is suited to high speed operation. Although the poly Si regions have inferior operating speed characteristics compared to the poly silicon-germanium regions, the poly Si regions have the better low OFF current characteristics when applied in the pixel matrix TFTs.

The structures which can be made by this manufacturing method are not limited to TFT structures but can be applied to any known structures, including bottom-gate TFTs.

Laser Light Sources

RGB solid state laser light sources, e.g. based on GaInAs or GaInAsN materials, may be suitable light sources for a holographic display because of their compactness and their high degree of light directionality. Such sources include light emitting diodes as well as the RGB vertical cavity surface emitting lasers (VCSEL) manufactured by Novalux® Inc., CA, USA. Such laser sources may be supplied as single lasers or as arrays of lasers, although each source can be used to generate multiple beams through the use of diffractive optical elements. The beams may be passed down multimode optical fibres as this may reduce the coherence level if the coherence is too high for use in compact holographic displays without leading to unwanted artefacts such as laser speckle patterns. Arrays of laser sources may be one dimensional or two dimensional.

Substrate

It should be emphasized that the term "substrate" refers to a slab of material on which the display is manufactured. This would typically be an insulating substrate such as a glass sheet substrate, or a sapphire substrate, or a semiconductor substrate such as Si or GaAs, but other substrates such as polymer sheets or metal sheets may be possible. Substrates such as glass sheets or semiconductor substrates such as Si or GaAs, are commonly used in device manufacture because they simplify the processing steps and the transfer between different pieces of apparatus which perform different process steps, such as material deposition, annealing, and material etching. The term "substrate" does not refer to a single circuit board, such as is disclosed by Shimobaba et al. Optics Express 13, 4196 (2005): a single circuit board does not permit the range of manufacturing processes which can be performed on a single substrate such as a glass sheet substrate.

Estimation of Transistor Count

This section contains an estimation of the number of transistors required in a display, for holographic calculation to be implemented by circuitry disposed between the pixels of the display.

For implementation using a FPGA, the hologram calculation consists of the following steps, where the percentage indicated is the percentage of logic resources on the FPGA which are used for the given step.

Lens function: adding random phase and generation of the sub hologram depending on the z-value (4.5%)

CORDIC calculation: transforming the complex values from phase and magnitude to real and imaginary values, and performing modulation of the intensity (62.5%)

Adding the sub holograms to form the hologram (15.5%)

Coding the hologram: the CORDIC algorithm is also used to convert the values to phase and magnitude and back to real and imaginary values, and for clipping and normalisation of the data (17.5%)

Because the transistor counts for memory bits do not depend on the pipeline frequency the percentage numbers given above could be different when computation in the pixel matrix is performed. The computational effort for adding and coding will rise with the number of hologram pixels.

Figure 23:
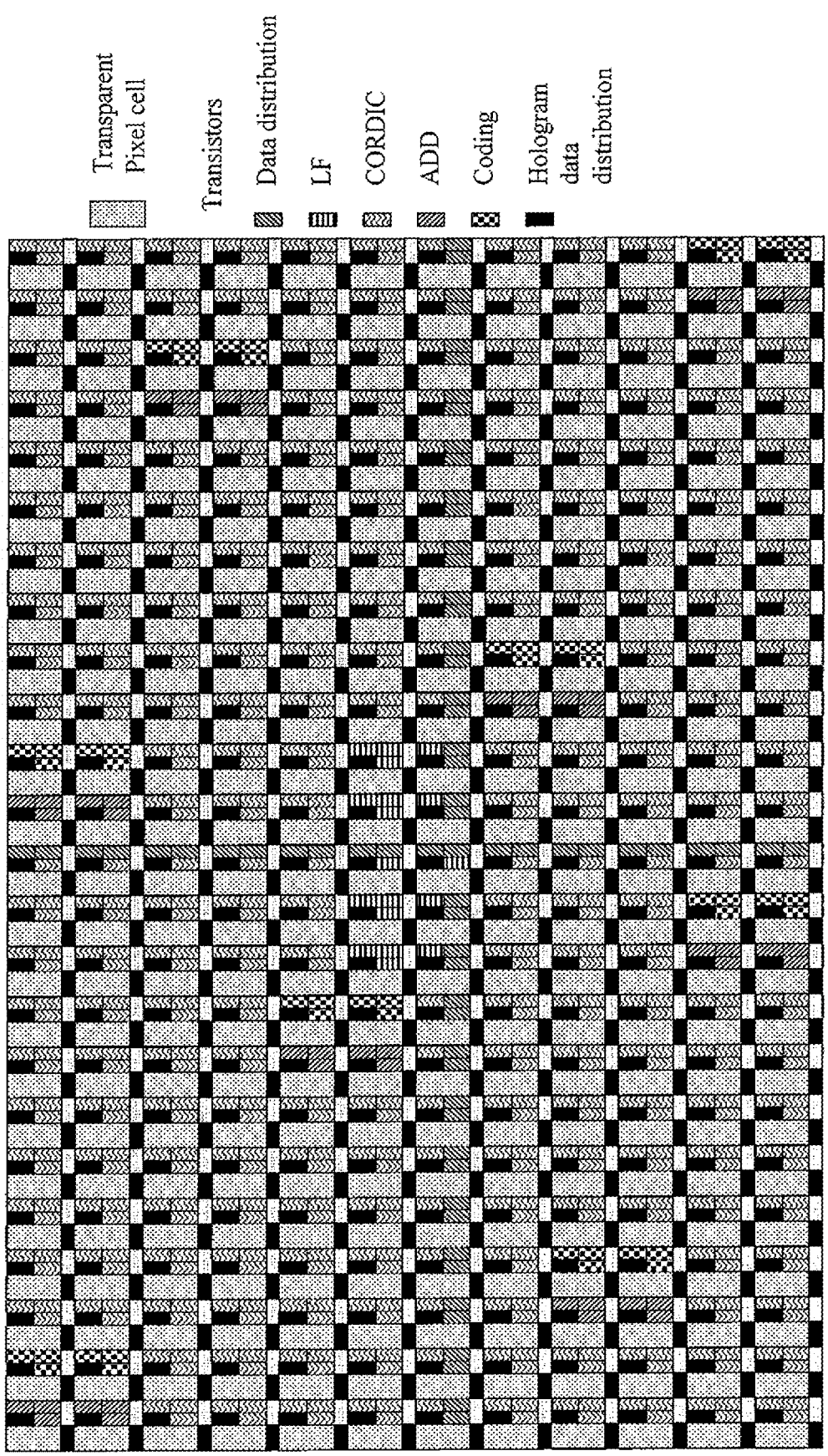
FIG. 23 is a simplified diagram of a cluster design according to a holographic display device of an implementation.

The lens function (LF) may have some small LUTs to define the sub-hologram size and the starting constants for the lens function depending on the z-value. So the lens function has a relatively high fixed transistor count for the LUTs and a variable transistor count depending on the number of CORDIC units driven in parallel from the lens function every clock cycle. Generally, the size of the computing units (clusters) should be optimised, because the greater their size the smaller the saving in the data transfer rate will be. On the other hand larger clusters make easier the realisation of the calculations. The example of FIG. 23 shows only a simplified cluster design, because one cluster can consist of one million transistors or even more.

Now we estimate the number of transistors required in a display, for holographic calculation to be implemented by circuitry disposed between the pixels of the display. Because the CORDIC algorithm needs more than 75% of the resources in the FPGA implementation, the estimation is concentrated on the transistors to perform the CORDIC calculations. The reference [CORDIC-Algorithmen, Architekturen and monolithische Realisierungen mit Anwendungen in der Bildverarbeitung, Dirk Timmermann, 1990], incorporated here by reference, from page 100 to page 101 gives a little help for estimating the CORDIC transistor count. For the FPGA solution an adapted CORDIC unit was developed that uses different reductions and so the estimated transistor count for one pipelined CORDIC unit is about 52,000 transistors.

The spreadsheet in FIGS. 21 and 22 shows the estimation for the planned hologram computation with 16,000×12,000 hologram pixels starting from a 2,000×1,500 pixel real space image. For every pixel in the sub-holograms one CORDIC operation is needed i.e. 250*10^9 operations per second in total. With 25 MHz pipeline frequency 9800 CORDIC units in parallel are needed. The cluster design affects the transistor count and design efficiency because larger clusters mean more expense for the distribution of the hologram data. But if the cluster is too small, computation within the cluster is not efficient, because some units will do nothing most of the time and so the transistor count is increased.

If a cluster consists of 1 Lens function unit and 1 CORDIC unit, 9800 Clusters and 660 million transistors for sub-hologram computation are needed. If the cluster consists of 1 Lens function unit and 8 CORDIC units, the display consists of 1200 Clusters and 530 million transistors for sub-hologram computation are needed. So the cluster-size may be varied over a large range and for the sample design a cluster with 4 CORDIC units and 1 lens function is chosen. This results in 2500 Clusters and 550 million transistors for sub-hologram computation as an estimation.

To find out the optimal cluster size the detailed design must be carried out. The numbers in the spreadsheet (FIGS. 21 and 22) are only rough estimations but they show the main dependence forms of the parameters.

CORDIC (digit-by-digit method, Volder's algorithm) (for COordinate Rotation DIgital Computer) is a simple and efficient algorithm to calculate hyperbolic and trigonometric functions. Because here CORDIC is used to convert complex numbers from phase and magnitude values to real and imaginary values and vice versa, other algorithms may be used. CORDIC is commonly used if no hardware multiplier (for example, simple microcontrollers and FPGAs) is available as it only requires small lookup tables, bitshifts and additions. Additionally, when implemented in soft or dedicated hardware the CORDIC algorithm is suitable for pipelining. The modern CORDIC algorithm was first described in 1959 by Jack E. Volder, although it is similar to techniques published by Henry Briggs as early as 1624. Originally, CORDIC was implemented in binary. In the 1970s, decimal CORDIC became widely used in pocket calculators, most of which operate not in binary but in binary-coded-decimal (BCD). CORDIC is particularly well-suited for handheld calculators, an application for which cost (and therefore gate count on the chip) is much more important than is speed. CORDIC is generally faster than other approaches when a hardware multiplier is unavailable (e.g. in a microcontroller), or when the number of gates required to implement one needs to be minimized (e.g. in an FPGA).

CORDIC is part of the class of "shift-and-add" algorithms, as are the logarithm and exponential algorithms derived from Henry Briggs' work. Another shift-and-add algorithm which can be used for computing many elementary functions is the BKM algorithm, which is a generalization of the logarithm and exponential algorithms to the complex plane. For instance, BKM can be used to compute the sine and cosine of a real angle x (in radians) by computing the exponential of 0+ix, which is cos x+i sin x. The BKM algorithm, first published in 1994 by J. C. Bajard, S. Kla, and J. M. Muller, IEEE Transactions on Computers, 43(8): 955-963, August 1994, is slightly more complex than CORDIC, but has the advantage that it does not need a scaling factor. BKM algorithms may be used instead of CORDIC algorithms in the present implementation.

Computation Methods

Today, central processing units (CPUs) and Digital Signal Processor (DSP)-units mainly use digital synchronous logic for computation. The FPGA hologram computation may also use this approach. Because of the low transistor count per hologram pixel other methods maybe preferred depending on the computation step. The following list shows the main attributes for some other computation methods:

Digital Synchronous Logic (Clocked Logic)
  high transistor count
  short computation time
  easy timing calculation
  good design tool support
Digital Asynchronous Logic (Unclocked Logic)
  good power efficiency
  high transistor count
  short computation time
  poor design tool support
  difficult timing calculation
PWM (Pulse Width Modulation)
  low transistor count
  long computation time
Analogue
  mainly developed from 1950 to 1960
  except for simple high frequency uses, analogue computing is uncommon today
  very low transistor count
  short computation time
  limited precision
  high production parameter drift dependence
Mixed Technologies The requirements of the computation steps are different. Because of the limited capacity of eg. poly-Si transistors the computation method should be chosen depending on the requirements. The optimal method will depend on the precise implementation. Some examples follow.

To lower the number of transistors, computation steps with low requirements such as the lens function and coding can use PWM. Analogue shift registers may be used for data distribution because real space data and hologram data uses only about 8-bit precision. A specially designed asynchronous CORDIC unit can be used to reduce power dissipation. Using more than one method per step may further reduce the number of transistors but may raise the design costs.

Display Types

The display is preferably an active matrix structure using transistors or other switching elements (eg. electrical, optical) on the display surface. The transistor material should have an adequate structural width and switching frequency to implement the additional transistors for the computation. Mono-crystal silicon and poly-Si variants such as low temperature poly-Si (LTPS), CGS, single grain Si or poly-SiGe can be used. The switching frequency of amorphous silicon is generally too low for high performance hologram calculation. In principle, organic semiconductors or carbon nanotubes may also be used as switching element materials. Conventional large displays require large areas for row and column lines. This area can be saved using the present approach.

Because the area savings are higher on larger displays, the following display types are preferred:
  liquid crystal display (LCD) on LTPS
  Organic light emitting diodes (OLED) (including light emitting polymers (LEP)) on LTPS
  Mono-crystalline silicon is used only for small displays with fewer advantages compared to the new method. Examples of the use of mono-crystalline Si are:
  LCOS
  Digital Light Processing (DLP) technology A list of possible display technologies which may be used for an implementation is:
  Liquid Crystal Display (LCD)-Types
  LCOS liquid crystal on silicon
  NLC nematic liquid crystal
  TN twisted nematic
  VAN vertical aligned nematic
  FLC Ferroelectric liquid crystal
  FED (Field Emission Displays)
  SED Surface-Conduction Electron-Emitter Display
  carbon nanotube emitters (based on silicon substrates or indium tin oxide (ITO) coated glass substrates, but these can be used as light sources only, because non coherent light is emitted)
  Electro Mechanical Systems
  Mirror arrays/Digital Light Processing (DLP) technology
  MEMS mirrors (Micro Electro Mechanical Systems), also referred to as MOEMS (micro-opto-electromechanical system)

A list of hologram calculation methods is:
  look-up tables (LUT)
  Analytical computation
  the method described in patent publication number WO 2006/066919, incorporated herein by reference.
  Ray-tracing method
  Transformation Types:
  2D Transformation
  1D Transformation in the horizontal plane
  1D Transformation in the vertical plane
  Encoding Types:
  Burckhardt encoding
  Phase only encoding
  Two phase encoding
  BIAS encoding
  MDE (minimum distance encoding)-Encoding using more than 3 SLM pixels per hologram pixel Hardware An external hologram calculation unit may consist of a couple of high end FPGAs or an application specific integrated circuit (ASIC) or a full custom integrated circuit (IC) with about 52 million transistors and a 500 MHz pipeline frequency. To transfer the data to the display about 230 low voltage differential signalling (LVDS) pairs each transmitting at 1 Gbits per second can be used. To receive the data, chip on glass (COG) row- and column-line drivers are also needed. If the computation is integrated on the display substrate only high switching frequency parts like the Digital Visual Interface (DVI) receiver must be implemented in additional hardware. Only the original data with 50-times lower data rate must be transferred (see FIG. 1). Very cheap display electronics with only a few connections to the display can be used. This electronics is nearly the same as in today's low-resolution 2D TFT Displays.

Notes

Features of the above three outline manufacturing methods may be combined without departing from the scope of the invention.

In the Figures herein, the relative dimensions shown are not necessarily to scale.

Various modifications and alterations of this invention will become apparent to those skilled in the art without departing from the scope of this invention, and it should be understood that this invention is not to be unduly limited to the illustrative examples set forth herein.

There are multiple concepts (described as 'Concepts A-T') in this disclosure. Appendix III contains text which may be helpful in defining these concepts. As would be clear to one skilled in the art, disclosures with respect to one concept may be of assistance in elucidating aspects of other concepts. Some of these concepts may form part of the invention, as will be clear from elsewhere in this document.

APPENDIX I

Technical Primer

The following section is meant as a primer to several key techniques used in some of the systems that implement the present invention.

In conventional holography, the observer can see a holographic reconstruction of an object (which could be a changing scene); his distance from the hologram is not however relevant. The reconstruction is, in one typical optical arrangement, at or near the image plane of the light source illuminating the hologram and hence is at or near the Fourier plane of the hologram. Therefore, the reconstruction has the same far-field light distribution of the real world object that is reconstructed.

One early system (described in WO 2004/044659 and US 2006/0055994, which are incorporated herein in their entirety by reference) defines a very different arrangement in which the reconstructed object is not at or near the Fourier plane of the hologram at all. Instead, a virtual observer window zone is at the Fourier plane of the hologram; the observer positions his eyes at this location and only then can a correct reconstruction be seen. The hologram is encoded on a LCD (or other kind of spatial light modulator) and illuminated in an optical set-up so that the virtual observer window becomes the Fourier transform of the hologram (hence it is a Fourier transform that is imaged directly onto the eyes); the reconstructed object formed in the frustum spanned by the observer window and the SLM is then a propagation better described by the Fresnel transform of the hologram since it is not in the focus plane of the lens. It is instead defined by a near-field light distribution (modelled using spherical wavefronts, as opposed to the planar wavefronts of a far field distribution). This reconstruction can appear anywhere between the virtual observer window (which is, as noted above, in the Fourier plane of the hologram) and the SLM or even behind the SLM as a virtual object.

There are several consequences to this approach. First, the fundamental limitation facing designers of holographic video systems is the pixel pitch of the SLM (or other kind of light modulator). The goal is to enable large holographic reconstructions using SLMs with pixel pitches that are commercially available at reasonable cost. But in the past this has been impossible for the following reason. The periodicity interval between adjacent diffraction orders in the Fourier plane is given by $\lambda D/p$, where $\lambda$ is the wavelength of the illuminating light, D is the distance from the hologram to the Fourier plane and p is the pixel pitch of the SLM. But in conventional holographic displays, the reconstructed object is in or near the Fourier plane. Hence, a reconstructed object has to be kept smaller than the periodicity interval; if it were larger, then its edges would blur into a reconstruction from an adjacent diffraction order. This leads to very small reconstructed objects—typically just a few cm across, even with costly, specialised small pitch displays. But with the present approach, the virtual observer window (which is, as noted above, positioned to be in the Fourier plane of the hologram) need only be as large as the eye pupil. As a consequence, even SLMs with a moderate pitch size can be used. And because the reconstructed object can entirely fill the frustum between the virtual observer window and the hologram, it can be very large indeed, i.e. much larger than the periodicity interval. Further, where an OASLM is used, then there is no pixelation, and hence no periodicity, so that the constraint of keeping the virtual observer window smaller than a periodicity interval no longer applies.

There is another advantage as well, deployed in one variant. When computing a hologram, one starts with one's knowledge of the reconstructed object—e.g. you might have a 3D image file of a racing car. That file will describe how the object should be seen from a number of different viewing positions. In conventional holography, the hologram needed to generate a reconstruction of the racing car is derived directly from the 3D image file in a computationally intensive process. But the virtual observer window approach enables a different and more computationally efficient technique. Starting with one plane of the reconstructed object, we can compute the virtual observer window as this is the Fresnel transform of the object. We then perform this for all object planes, summing the results to produce a cumulative Fresnel transform; this defines the wave field across the virtual observer window. We then compute the hologram as the Fourier transform of this virtual observer window. As the virtual observer window contains all the information of the object, only the single-plane virtual observer window has to be Fourier transformed to the hologram and not the multi-plane object. This is particularly advantageous if there is not a single transformation step from the virtual observer window to the hologram but an iterative transformation like the Iterative Fourier Transformation Algorithm. If iteration is needed, each iteration step comprises only a single Fourier transformation of the virtual observer window instead of one for each object plane, resulting in significantly reduced computation effort.

Another interesting consequence of the virtual observer window approach is that all the information needed to reconstruct a given object point is contained within a relatively small section of the hologram; this contrasts with conventional holograms in which information to reconstruct a given object point is distributed across the entire hologram. Because we need encode information into a substantially smaller section of the hologram, that means that the amount of information we need to process and encode is far lower than for a conventional hologram. That in turn means that conventional computational devices (e.g. a conventional DSP with cost and performance suitable for a mass market device) can be used even for real time video holography.

There are some less than desirable consequences however. First, the viewing distance from the hologram is important—the hologram is encoded and illuminated in such a way that only when the eyes are positioned at or near the Fourier plane of the hologram is the correct reconstruction seen; whereas in normal holograms, the viewing distance is not important. There are however various techniques for reducing this Z sensitivity or designing around it.

Also, because the hologram is encoded and illuminated in such a way that correct holographic reconstructions can only be seen from a precise and small viewing position (i.e. in particular in lateral positioning but also in Z distance), eye tracking may be needed. As with Z sensitivity, various techniques for reducing the X,Y sensitivity or designing around it exist. For example, as pixel pitch decreases (as it will with SLM manufacturing advances), the virtual observer window size will increase. Furthermore, more efficient encoding techniques (like Kinoform encoding) facilitate the use of a larger part of the periodicity interval as virtual observer window and hence the increase of the virtual observer window.

The above description has assumed that we are dealing with Fourier holograms. The virtual observer window is in the Fourier plane of the hologram, i.e. in the image plane of the light source. As an advantage, the undiffracted light is focused in the so-called DC-spot. The technique can also be used for Fresnel holograms where the virtual observer window is not in the image plane of the light source. However, care should be taken that the undiffracted light is not visible as a disturbing background. Another point to note is that the term "transform" should be construed to include any mathematical or computational technique that is equivalent to or approximates to a transform that describes the propagation of light. Transforms are merely approximations to physical processes more accurately defined by Maxwellian wave propagation equations; Fresnel and Fourier transforms are second order approximations, but have the advantages that (a) because they are algebraic as opposed to differential, they can be handled in a computationally efficient manner and (ii) can be accurately implemented in optical systems.

Further details are given in US patent application 2006-0138711, US 2006-0139710 and US 2006-0250671, the contents of which are incorporated by reference.

APPENDIX II

Glossary of Terms Used in the Description

Computer Generated Hologram

A computer generated video hologram CGH is a hologram that is calculated from a scene. The CGH may comprise complex-valued numbers representing the amplitude and phase of light waves that are needed to reconstruct the scene. The CGH may be calculated e.g. by coherent ray tracing, by simulating the interference between the scene and a reference wave, or by Fourier or Fresnel transform.

Encoding

Encoding is the procedure in which a spatial light modulator (e.g. its constituent cells, or contiguous regions for a continuous SLM like an OASLM) are supplied with control values of the video hologram. In general, a hologram comprises of complex-valued numbers representing amplitude and phase.

Encoded Area

The encoded area is typically a spatially limited area of the video hologram where the hologram information of a single scene point is encoded. The spatial limitation may either be realized by an abrupt truncation or by a smooth transition achieved by Fourier transform of an virtual observer window to the video hologram.

Fourier Transform

The Fourier transform is used to calculate the propagation of light in the far field of the spatial light modulator. The wave front is described by plane waves.

Fourier Plane

The Fourier plane contains the Fourier transform of the light distribution at the spatial light modulator. Without any focusing lens the Fourier plane is at infinity. The Fourier plane is equal to the plane containing the image of the light source if a focusing lens is in the light path close to the spatial light modulator.

Fresnel Transform

The Fresnel transform is used to calculate the propagation of light in the near field of the spatial light modulator. The wave front is described by spherical waves. The phase factor of the light wave comprises a term that depends quadratically on the lateral coordinate.

Frustum

A virtual frustum is constructed between a virtual observer window and the SLM and is extended behind the SLM. The scene is reconstructed inside this frustum. The size of the reconstructed scene is limited by this frustum and not by the periodicity interval of the SLM.

Light System

The light system may include either of a coherent light source like a laser or a partially coherent light source like a LED. The temporal and spatial coherence of the partially coherent light source has to be sufficient to facilitate a good scene reconstruction, i.e. the spectral line width and the lateral extension of the emitting surface have to be sufficiently small.

Virtual Observer Window (VOW)

The virtual observer window is a virtual window in the observer plane through which the reconstructed 3D object can be seen. The VOW is the Fourier transform of the hologram and is positioned within one periodicity interval in order to avoid multiple reconstructions of the object being visible. The size of the VOW has to be at least the size of an eye pupil. The VOW may be much smaller than the lateral range of observer movement if at least one VOW is positioned at the observer's eyes with an observer tracking system. This facilitates the use of a SLM with moderate resolution and hence small periodicity interval. The VOW can be imagined as a keyhole through which the reconstructed 3D object can be seen, either one VOW for each eye or one VOW for both eyes together.

Periodicity Interval

The CGH is sampled if it is displayed on a SLM composed of individually addressable cells. This sampling leads to a periodic repetition of the diffraction pattern. The periodicity interval is $\lambda D/p$, where $\lambda$ is the wavelength, D the distance from the hologram to the Fourier plane, and p the pitch of the SLM cells. OASLMs however have no sampling and hence there is no periodic repetition of the diffraction pattern; the repetitions are in effect suppressed.

Reconstruction

The illuminated spatial light modulator encoded with the hologram reconstructs the original light distribution. This light distribution was used to calculate the hologram. Ideally, the observer would not be able to distinguish the reconstructed light distribution from the original light distribution. In most holographic displays the light distribution of the scene is reconstructed. In our display, rather the light distribution in the virtual observer window is reconstructed.

Scene

The scene that is to be reconstructed is a real or computer generated three-dimensional light distribution. As a special case, it may also be a two-dimensional light distribution. A scene can constitute different fixed or moving objects arranged in a space.

Spatial Light Modulator (SLM)

A SLM is used to modulate the wave front of the incoming light. An ideal SLM would be capable of representing arbitrary complex-valued numbers, i.e. of separately controlling the amplitude and the phase of a light wave. However, a typical conventional SLM controls only one property, either amplitude or phase, with the undesirable side effect of also affecting the other property.

APPENDIX III

Concepts

There are multiple concepts (described as 'Concepts A-T') in this disclosure. The following may be helpful in defining these concepts.

A. Hologram Display with Calculation on the Same Substrate as the Pixels

Holographic display in which at least some of the calculations performed to determine the encoding of a spatial light modulator are performed using circuitry which is on the same substrate as the pixels of the spatial light modulator.

- at least some of the calculations performed to determine the encoding of the spatial light modulator are performed using circuitry which is between the pixels of the spatial light modulator.
- the calculations are performed in discrete areas of the display, to encode the pixels of the corresponding discrete areas, on a discrete area by discrete area basis.
- the circuitry includes thin film transistors.
- the active regions of at least some of the circuitry consists of polycrystalline Si.
- the active regions of at least some of the circuitry consists of continuous grain Si.
- the active regions of at least some of the circuitry consists of polycrystalline SiGe.
- the active regions of at least some of the circuitry consists of monocrystalline Si.
- the active regions of at least some of the circuitry consists of single grain Si.
- the active regions of at least some of the circuitry consists of organic semiconductors.
- the substrate is monocrystalline Si.
- the substrate is glass.
- only real space image data is transmitted to the display.
- the video frame rate is at least about 25 Hz.
- the image data consists of intensity and depth map data.
- the holographic calculation is performed in real time or in quasi real time.
- the holographic calculation is performed using a look-up table approach.
- sub-holograms are used for computation.
- data for adding the sub holograms is exchanged over the distance of a sub-hologram dimension.
- the holographic computation is spread homogeneously over the whole display surface.
- the holographic computation is split into small identical parts called clusters tiled over the display surface.
- data for adding the sub holograms is exchanged over the distance of a cluster dimension.
- the holographic display can be built up through tiling identical clusters together.
- the holographic display is a high resolution display.
- the holographic display is a very high resolution display.
- a virtual observer window is an eye pupil diameter or more across.
- the virtual observer window is one cm or more across.
- one depth map and intensity map pair is constructed for each eye i.e. for each virtual observer window.
- monochrome images are displayed.
- colour images are displayed.
- the colour images displayed are in RGB format.
- in order to calculate the value of a pixel of the hologram, only values of a sub-section of the original image are considered.
- the light used for the reconstruction is not fully coherent across the entire display, but rather coherence exists within sub-sections of the display.
- fewer wires are sufficient for the transfer of original image data than for the transmission of hologram data.
- reducing the data transmission frequency has the benefit of reducing the power dissipation in the row and column drivers.
- the large proportion of the pixel area which was required in prior art solutions for column and row wires can be used for other purposes.
- the area of the transparent electrode can be increased and thus the transmittance of the display can be improved.
- the display panel can be controlled using conventional display technologies.
- the display is fabricated using liquid crystal on silicon technology.
- the display is fabricated using MEMS technology.
- the display is fabricated using field emission display technology.
- the holographic transformation is a one dimensional transformation.
- the holographic transformation is a two dimensional transformation.
- an additional logic for local forwarding of calculated data exists, and the additional logic can also be co-used for forwarding the original image to the clusters, so that at least some global row and column wires may be eliminated.
- redundant circuitry, such as TFTs, may be manufactured in the space of the pixel matrix so that such circuitry can be used to replace some of the circuitry used at device start up, if some of the circuitry used at device start up is found to have failed.
- Method of using the holographic display.

B. Hologram Display with Calculation on the Same Substrate, with Efficient Calculation of the Encoding for the Spatial Light Modulator Holographic display in which at least some of the calculations performed to determine the encoding of a spatial light modulator are performed using circuitry which is on the same substrate as the pixels of the spatial light modulator, and where the calculations do not involve the calculation of a Fourier transform or of a Fresnel transform per se.

- at least some of the calculations performed to determine the encoding of the spatial light modulator are performed using circuitry which is between the pixels of the spatial light modulator.
- the calculations are performed in discrete areas of the display, to encode the pixels of the corresponding discrete areas, on a discrete area by discrete area basis.
- the circuitry includes thin film transistors.
- the active regions of at least some of the circuitry consists of polycrystalline Si.
- the active regions of at least some of the circuitry consists of continuous grain Si.
- the active regions of at least some of the circuitry consists of polycrystalline SiGe.
- the active regions of at least some of the circuitry consists of monocrystalline Si.
- the active regions of at least some of the circuitry consists of single grain Si.
- the active regions of at least some of the circuitry consists of organic semiconductors.

the substrate is monocrystalline Si.
the substrate is glass.
only real space image data is transmitted to the display.
the video frame rate is at least about 25 Hz.
the image data consists of intensity and depth map data.
the holographic calculation is performed in real time or in quasi real time.
the holographic calculation is performed using a look-up table approach.
sub-holograms are used for computation.
the holographic computation is spread homogeneously over the whole display surface.
the holographic computation is split into small identical parts called clusters tiled over the display surface.
the holographic display is a high resolution display.
a virtual observer window is an eye pupil diameter or more across.
monochrome images are displayed.
colour images are displayed.
in order to calculate the value of a pixel of the hologram, only values of a sub-section of the original image are considered.
the light used for the reconstruction is not fully coherent across the entire display, but rather coherence exists within sub-sections of the display.
fewer wires are sufficient for the transfer of original image data than for the transmission of hologram data.
reducing the data transmission frequency has the benefit of reducing the power dissipation in the row and column drivers.
the large proportion of the pixel area which was required in prior art solutions for column and row wires can be used for other purposes.
the area of the transparent electrode can be increased and thus the transmittance of the display can be improved.
the display panel can be controlled using conventional display technologies.
the display is fabricated using liquid crystal on silicon technology.
the display is fabricated using MEMS technology.
the display is fabricated using field emission display technology.
the holographic transformation is a one dimensional transformation.
the holographic transformation is a two dimensional transformation.
an additional logic for local forwarding of calculated data exists, and the additional logic can also be co-used for forwarding the original image to the clusters, so that at least some global row and column wires may be eliminated.
redundant circuitry, such as TFTs, may be manufactured in the space of the pixel matrix so that such circuitry can be used to replace some of the circuitry used at device start up, if some of the circuitry used at device start up is found to have failed.
the wavefront which would be emitted by the object is reconstructed in one or multiple virtual observer windows (VOW) and where the reconstruction of each single object point (OP) of a three-dimensional scene (3D S) only requires a sub-hologram (SH) as a subset of the entire hologram (HΣSLM) to be encoded on the SLM.
after a discretization of the scene (3D S) to multiple object-points (OP), for each visible object-point (OP) of the 3D-scene, the complex values of the lens sub-hologram ($SH_L$) are encoded on the SLM, where the complex values of the lens sub-hologram are determined using the formula $z_L = \exp\{-i*[(\pi/\lambda f)*(x^2+y^2)]\}$ with $\lambda$ as the reference-wave-length, f as focal length, and x and y being orthogonal coordinates in the plane of the sub-hologram.
the sub-hologram ($SH_P$) of the prism is determined within the hologram-plane (HE) in order to move the virtual observer window away from the optic axis.
the sub-holograms of the lens and of the prisms are convolved, which can be represented symbolically as $SH = SH_L * SH_P$.
each sub-hologram (SH) is modulated with a uniformly distributed phase shift, where the phase shift is different from sub-hologram to sub-hologram.
the sub-holograms are added so as to form the entire hologram.
the representation of computer-generated holograms for reconstructions which vary in real-time or in quasi real-time.
look-up tables are used in the holographic calculation.
the object points can be generated at any position within the reconstruction frustum.
Method of using the holographic display.

C. Hologram Display with Decompression Calculation on the Same Substrate

Holographic display in which the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.
  at least some of the calculations performed to determine the encoding of a spatial light modulator are performed using circuitry which is on the same substrate as the pixels of the spatial light modulator.
  the circuitry includes thin film transistors.
  the active regions of at least some of the circuitry consists of polycrystalline Si.
  the active regions of at least some of the circuitry consists of continuous grain Si.
  the active regions of at least some of the circuitry consists of polycrystalline SiGe.
  the active regions of at least some of the circuitry consists of monocrystalline Si.
  the active regions of at least some of the circuitry consists of single grain Si.
  the active regions of at least some of the circuitry consists of organic semiconductors.
  the substrate is monocrystalline Si.
  the substrate is glass.
  the video frame rate is at least about 25 Hz.
  the image data consists of intensity and depth map data.
  the holographic calculation is performed in real time or in quasi real time.
  the holographic calculation is performed using a look-up table approach.
  sub-holograms are used for computation.
  the holographic display is a high resolution display.
  a virtual observer window is an eye pupil diameter or more across.
  monochrome images are displayed.
  colour images are displayed.
  in order to calculate the value of a pixel of the hologram, only values of a sub-section of the original image are considered.

the light used for the reconstruction is not fully coherent across the entire display, but rather coherence exists within sub-sections of the display.

reducing the data transmission frequency has the benefit of reducing the power dissipation in the row and column drivers.

the large proportion of the pixel area which was required in prior art solutions for column and row wires can be used for other purposes.

the area of the transparent electrode can be increased and thus the transmittance of the display can be improved.

the display panel can be controlled using conventional display technologies.

the display is fabricated using liquid crystal on silicon technology.

the display is fabricated using MEMS technology.

the display is fabricated using field emission display technology.

the holographic transformation is a one dimensional transformation.

the holographic transformation is a two dimensional transformation.

redundant circuitry, such as TFTs, may be manufactured in the space of the pixel matrix so that such circuitry can be used to replace some of the circuitry used at device start up, if some of the circuitry used at device start up is found to have failed.

the wavefront which would be emitted by the object is reconstructed in one or multiple virtual observer windows (VOW) and where the reconstruction of each single object point (OP) of a three-dimensional scene (3D S) only requires a sub-hologram (SH) as a subset of the entire hologram (HΣSLM) to be encoded on the SLM.

after a discretization of the scene (3D S) to multiple object-points (OP), for each visible object-point (OP) of the 3D-scene, the complex values of the lens sub-hologram ($SH_L$) are encoded on the SLM, where the complex values of the lens sub-hologram are determined using the formula $z_L = \exp\{-i*[(\pi/\lambda f)*(x^2+y^2)]\}$ with λ as the reference-wave-length, f as focal length, and x and y being orthogonal coordinates in the plane of the sub-hologram.

the sub-hologram ($SH_P$) of the prism is determined within the hologram-plane (HE) in order to move the virtual observer window away from the optic axis.

the sub-holograms of the lens and of the prisms are convolved, which can be represented symbolically as $SH = SH_L * SH_P$.

the space in which the holographic calculations are performed may or may not be on the same substrate as the display's substrate.

the circuitry where the decompression calculations are performed is situated between the pixels of the display.

the circuitry where the decompression calculations are performed is situated outside the pixel matrix of the display, but on the same substrate.

clusters perform the decompression calculation.

clusters for the decompression calculation receive data via the display's row and column wires.

each cluster for the decompression calculation receives data via a parallel data bus.

each cluster for the decompression calculation receives data via a serial data connection.

Method of using the holographic display.

D. High Resolution Display with Decompression Calculation on the Same Substrate

A high resolution display on which high resolution image data is displayed, where the data is first compressed using known data compression techniques, and is then transmitted to circuitry on the substrate of the display, the circuitry then performing the function of decompressing the data which has been received with subsequent display of the data at the pixels of the display.

the decompression circuitry is located between the pixels of the display.

the decompression circuitry is located outside the pixel matrix of the display, but on the same substrate as the display.

compressed data is transmitted to the display clusters which are part of the whole display, the clusters then performing the function of decompressing the data which has been received and then displaying the data at pixels of the local cluster.

normal display data is displayed.

holographic display data is displayed.

the space in which the compression calculations are performed may or may not be on the same substrate as the display's substrate.

the clusters for the decompression calculation receive data via the display's row and column wires.

each cluster for the decompression calculation receives data via a parallel data bus.

each cluster for the decompression calculation receives data via a serial data connection.

is a very high resolution display.

decompression is performed by each cluster in 40 ms or less.

holographic image calculation is performed after decompression.

at least some of the calculations performed to determine the encoding of a spatial light modulator are performed using circuitry which is on the same substrate as the pixels of the spatial light modulator.

at least some of the calculations performed to determine the encoding of a spatial light modulator are performed using circuitry which is on the same substrate as the pixels of the spatial light modulator, and where the calculations do not involve the calculation of a Fourier transform or of a Fresnel transform per se.

at least some of the calculations performed to determine the encoding of the spatial light modulator are performed using circuitry which is between the pixels of the spatial light modulator.

the calculations are performed in discrete areas of the display, to encode the pixels of the corresponding discrete areas, on a discrete area by discrete area basis.

the circuitry includes thin film transistors.

the active regions of at least some of the circuitry consists of polycrystalline Si.

the active regions of at least some of the circuitry consists of continuous grain Si.

the active regions of at least some of the circuitry consists of polycrystalline SiGe.

the active regions of at least some of the circuitry consists of monocrystalline Si.

the active regions of at least some of the circuitry consists of single grain Si.

the active regions of at least some of the circuitry consists of organic semiconductors.

the substrate is monocrystalline Si.

the substrate is glass.

the video frame rate is at least about 25 Hz.

only real space image data is transmitted to the display.

the image data consists of intensity and depth map data.
the holographic calculation is performed in real time or in quasi real time.
the holographic calculation is performed using a look-up table approach.
sub-holograms are used for computation.
the display is fabricated using liquid crystal on silicon technology.
the display is fabricated using MEMS technology.
the display is fabricated using field emission display technology.
Method of using the high resolution display.

E. Hologram Display with Calculation on the Same Substrate, with an Extended 3D Rendering Pipeline for the Graphics Sub-Systems by Incorporating Additional Processing Units for Holographic Transformation and Encoding Holographic display in which at least some of the calculations performed to determine the encoding of a spatial light modulator are performed using circuitry which is on the same substrate as the pixels of the spatial light modulator, such that the 3D rendering pipeline of graphics sub-systems incorporates additional processing units for holographic transformation and encoding.

the holographic calculations are performed using circuitry which is in between the pixels of the display.
the holographic calculations are performed using circuitry which is outside the pixel matrix of the display, but on the same substrate as the pixels of the display.
at least some of the calculations performed to determine the encoding of a spatial light modulator are performed using circuitry which is on the same substrate as the pixels of the spatial light modulator, and where the calculations do not involve the calculation of a Fourier transform or of a Fresnel transform per se.
the calculations are performed in discrete areas of the display, to encode the pixels of the corresponding discrete areas, on a discrete area by discrete area basis.
the circuitry includes thin film transistors.
the video frame rate is at least about 25 Hz.
only real space image data is transmitted to the display.
the image data consists of intensity and depth map data.
the holographic calculation is performed in real time or in quasi real time.
the holographic calculation is performed using a look-up table approach.
sub-holograms are used for computation.
the holographic computation is spread homogeneously over the whole display surface.
the holographic computation is split into small identical parts called clusters tiled over the display surface.
the holographic display is a high resolution display.
a virtual observer window is an eye pupil diameter or more across.
monochrome images are displayed.
colour images are displayed.
in order to calculate the value of a pixel of the hologram, only values of a sub-section of the original image are considered.
the light used for the reconstruction is not fully coherent across the entire display, but rather coherence exists within sub-sections of the display.
the holographic transformation is a one dimensional transformation.
the holographic transformation is a two dimensional transformation.
redundant circuitry, such as TFTs, may be manufactured in the space of the pixel matrix so that such circuitry can be used to replace some of the circuitry used at device start up, if some of the circuitry used at device start up is found to have failed.
the wavefront which would be emitted by the object is reconstructed in one or multiple virtual observer windows (VOW) and where the reconstruction of each single object point (OP) of a three-dimensional scene (3D S) only requires a sub-hologram (SH) as a subset of the entire hologram (HΣSLM) to be encoded on the SLM.
after a discretization of the scene (3D S) to multiple object-points (OP), for each visible object-point (OP) of the 3D-scene, the complex values of the lens sub-hologram ($SH_L$) are encoded on the SLM, where the complex values of the lens sub-hologram are determined using the formula $z_L = \exp\{-i*[(\pi/\lambda f)*(x^2+y^2)]\}$ with $\lambda$ as the reference-wave-length, f as focal length, and x and y being orthogonal coordinates in the plane of the sub-hologram.
the sub-hologram ($SH_P$) of the prism is determined within the hologram-plane (HE) in order to move the virtual observer window away from the optic axis.
the sub-holograms of the lens and of the prisms are convolved, which can be represented symbolically as $SH = SH_L * SH_P$.
each sub-hologram (SH) is modulated with a uniformly distributed phase shift, where the phase shift is different from sub-hologram to sub-hologram.
the sub-holograms are added so as to form the entire hologram.
for the representation of computer-generated holograms for reconstructions which vary in real-time or in quasi real-time.
look-up tables are used in the holographic calculation.
the object points can be generated at any position within the reconstruction frustum.
the Z map for the first display wavelength is copied twice for the second and third display wavelengths.
the hologram is calculated for each of the three display wavelengths in parallel.
the colour map RGB contents for two colours are copied to separate memory sections, so as to ensure independent access to the three colour components.
the lens function and the prism function for each display colour undergoes a complex multiplication.
a random phase is applied for each cluster of the display.
the calculated SLM encodings are subjected to subsequent processing, using additional algorithms in the holographic display cluster.
Method of using the holographic display.

F. Hologram Display with Calculation on the Same Substrate, with Sequential Holographic Transformation of Points in Three-Dimensional Space by Way of Extending the 3D Pipeline of Graphics Cards with a Holographic Calculation Pipeline Holographic display in which at least some of the calculations performed to determine the encoding of a spatial light modulator are performed using circuitry which is on the same substrate as the pixels of the spatial light modulator, such that sequential holographic transformation of points in three-dimensional space is performed by way of extending the 3D pipeline of graphics cards with a holographic calculation pipeline.

the holographic calculations are performed using circuitry which is in between the pixels of the display.

the holographic calculations are performed using circuitry which is outside the pixel matrix, but on the same substrate as the display.

at least some of the calculations performed to determine the encoding of a spatial light modulator are performed using circuitry which is on the same substrate as the pixels of the spatial light modulator, and where the calculations do not involve the calculation of a Fourier transform or of a Fresnel transform per se.

the calculations are performed in discrete areas of the display, to encode the pixels of the corresponding discrete areas, on a discrete area by discrete area basis.

the circuitry includes thin film transistors.

the video frame rate is at least about 25 Hz.

only real space image data is transmitted to the display.

the image data consists of intensity and depth map data.

the holographic calculation is performed in real time or in quasi real time.

the holographic calculation is performed using a look-up table approach.

sub-holograms are used for computation.

the holographic computation is spread homogeneously over the whole display surface.

the holographic computation is split into small identical parts called clusters tiled over the display surface.

the holographic display is a high resolution display.

a virtual observer window is an eye pupil diameter or more across.

monochrome images are displayed.

colour images are displayed.

in order to calculate the value of a pixel of the hologram, only values of a sub-section of the original image are considered.

the light used for the reconstruction is not fully coherent across the entire display, but rather coherence exists within sub-sections of the display.

the holographic transformation is a one dimensional transformation.

the holographic transformation is a two dimensional transformation.

redundant circuitry, such as TFTs, may be manufactured in the space of the pixel matrix so that such circuitry can be used to replace some of the circuitry used at device start up, if some of the circuitry used at device start up is found to have failed.

the wavefront which would be emitted by the object is reconstructed in one or multiple virtual observer windows (VOW) and where the reconstruction of each single object point (OP) of a three-dimensional scene (3D S) only requires a sub-hologram (SH) as a subset of the entire hologram (HΣSLM) to be encoded on the SLM.

after a discretization of the scene (3D S) to multiple object-points (OP), for each visible object-point (OP) of the 3D-scene, the complex values of the lens sub-hologram ($SH_L$) are encoded on the SLM, where the complex values of the lens sub-hologram are determined using the formula $z_L = \exp\{-i*[(\pi/\lambda f)*(x^2+y^2)]\}$ with λ as the reference-wave-length, f as focal length, and x and y being orthogonal coordinates in the plane of the sub-hologram.

the sub-hologram ($SH_P$) of the prism is determined within the hologram-plane (HE) in order to move the virtual observer window away from the optic axis.

the sub-holograms of the lens and of the prisms are convolved, which can be represented symbolically as $SH = SH_L * SH_P$.

each sub-hologram (SH) is modulated with a uniformly distributed phase shift, where the phase shift is different from sub-hologram to sub-hologram.

the sub-holograms are added so as to form the entire hologram.

for the representation of computer-generated holograms for reconstructions which vary in real-time or in quasi real-time.

look-up tables are used in the holographic calculation.

the object points can be generated at any position within the reconstruction frustum.

the 3D rendering pipeline of graphics sub-systems incorporates additional processing units for holographic transformation and encoding.

the Z map for the first display wavelength is copied twice for the second and third display wavelengths.

the hologram is calculated for each of the three display wavelengths in parallel.

the colour map RGB contents for two colours are copied to separate memory sections, so as to ensure independent access to the three colour components.

the lens function and the prism function for each display colour undergoes a complex multiplication.

a random phase is applied for each cluster of the display.

the calculated SLM encodings are subjected to subsequent processing, using additional algorithms in the holographic display cluster.

the holographic calculation can begin before the colour map and the Z-buffer are available in their entirety.

the time required to perform the holographic calculation for each sub-hologram is less than one frame time period.

the time required to perform the holographic calculation for each sub-hologram is 17 ms or less.

used in a military application.

each cluster of the display has its own look-up table for storing the encoding of the sub-holograms which it displays.

after having read the content of the SH from the LUT, the difference between the currently displayed ($SH_{n-1}$) and the new SH ($SH_n$) is calculated.

the sequential holographic transformation of points in three-dimensional space, performed by way of extending the 3D pipeline of graphics cards with a holographic calculation pipeline, is not restricted to a particular type of SLM.

Method of using the holographic display.

G. Hologram Display with Calculation on the Same Substrate, with Random Addressing of Holographic Displays Holographic display in which at least some of the calculations performed to determine the encoding of a spatial light modulator are performed using circuitry which is on the same substrate as the pixels of the spatial light modulator, such that the real space image data which is used in the holographic calculation is the difference between successive real space image frames, and the holographic display data is sent to the holographic display cluster in the form of sub-hologram difference data and display memory location data.

the sequential holographic transformation of points in three-dimensional space is performed by way of extending the 3D pipeline of graphics cards with a holographic calculation pipeline.

the holographic calculations are performed using circuitry which is in between the pixels of the display.

the holographic calculations are performed using circuitry which is outside the pixel matrix, but on the same substrate as the display.

at least some of the calculations performed to determine the encoding of a spatial light modulator are performed using circuitry which is on the same substrate as the pixels of the spatial light modulator, and where the calculations do not involve the calculation of a Fourier transform or of a Fresnel transform per se.

the calculations are performed in discrete areas of the display, to encode the pixels of the corresponding discrete areas, on a discrete area by discrete area basis.

the circuitry includes thin film transistors.

the video frame rate is at least about 25 Hz.

only real space image data is transmitted to the display.

the image data consists of intensity and depth map data.

the holographic calculation is performed in real time or in quasi real time.

the holographic calculation is performed using a look-up table approach.

sub-holograms are displayed.

the holographic computation is spread homogeneously over the whole display surface.

the holographic computation is split into small identical parts called clusters tiled over the display surface.

the holographic display is a high resolution display.

a virtual observer window is an eye pupil diameter or more across.

monochrome images are displayed.

colour images are displayed.

in order to calculate the value of a pixel of the hologram, only values of a sub-section of the original image are considered.

the light used for the reconstruction is not fully coherent across the entire display, but rather coherence exists within sub-sections of the display.

the holographic transformation is a one dimensional transformation.

the holographic transformation is a two dimensional transformation.

redundant circuitry, such as TFTs, may be manufactured in the space of the pixel matrix so that such circuitry can be used to replace some of the circuitry used at device start up, if some of the circuitry used at device start up is found to have failed.

the wavefront which would be emitted by the object is reconstructed in one or multiple virtual observer windows (VOW) and where the reconstruction of each single object point (OP) of a three-dimensional scene (3D S) only requires a sub-hologram (SH) as a subset of the entire hologram (HΣSLM) to be encoded on the SLM.

after a discretization of the scene (3D S) to multiple object-points (OP), for each visible object-point (OP) of the 3D-scene, the complex values of the lens sub-hologram ($SH_L$) are encoded on the SLM, where the complex values of the lens sub-hologram are determined using the formula $z_L = \exp\{-i*[(\pi/\lambda f)*(x^2+y^2)]\}$ with $\lambda$ as the reference-wave-length, f as focal length, and x and y being orthogonal coordinates in the plane of the sub-hologram.

the sub-hologram ($SH_P$) of the prism is determined within the hologram-plane (HE) in order to move the virtual observer window away from the optic axis.

the sub-holograms of the lens and of the prisms are convolved, which can be represented symbolically as $SH=SH_L*SH_P$.

each sub-hologram (SH) is modulated with a uniformly distributed phase shift, where the phase shift is different from sub-hologram to sub-hologram.

the sub-holograms are added so as to form the entire hologram.

for the representation of computer-generated holograms for reconstructions which vary in real-time or in quasi real-time.

the object points can be generated at any position within the reconstruction frustum.

the 3D rendering pipeline of graphics sub-systems incorporates additional processing units for holographic transformation and encoding.

the Z map for the first display wavelength is copied twice for the second and third display wavelengths.

the hologram is calculated for each of the three display wavelengths in parallel.

the colour map RGB contents for two colours are copied to separate memory sections, so as to ensure independent access to the three colour components.

the lens function and the prism function for each display colour undergoes a complex multiplication.

a random phase is applied for each cluster of the display.

the calculated SLM encodings are subjected to subsequent processing, using additional algorithms in the holographic display cluster.

used in a military application.

image difference data is received by the holographic calculation units.

if there is no difference, or negligible difference, between display data for successive frames at a given cluster, then no data need be sent to the cluster.

each holographic calculation unit is sent 3D difference point image data which are relevant to the reconstruction point or points it is serves to encode on the SLM.

within each holographic display cluster, there is a splitter, which splits the calculated hologram display data into sub-hologram data and size and position information, where the two latter values may be used to compute the address range of the sub-hologram in the RAM, so that the data of the sub-hologram SH or SHD are written to the correct SLM cells within the cluster.

a special random access memory (RAM) is used where only the new SH or SHDs are written on the input side while on the output side the entire memory is read line by line and the information is written to the SLM.

Method of using the holographic display.

H. Display with Computational Function in the Pixel Space

A display in which computational functions are performed by circuitry which is disposed on the same substrate as the pixels of the display.

computational functions are performed by circuitry which is in between the pixels of the display.

computational functions are performed by circuitry which is outside the pixel matrix, but on the same substrate as the display.

the delay in displaying data on the display is less than if computational functions performed by circuitry which is disposed on the same substrate as the pixels of the display were performed elsewhere.

the computations are graphical computations.

is part of a high speed gaming device.

is used in military applications.

the calculations are performed in discrete areas of the display, to encode the pixels of the corresponding discrete areas, on a discrete area by discrete area basis.

the circuitry includes thin film transistors.

the active regions of at least some of the circuitry consists of polycrystalline Si.

the active regions of at least some of the circuitry consists of continuous grain Si.

the active regions of at least some of the circuitry consists of polycrystalline SiGe.

the active regions of at least some of the circuitry consists of moncrystalline Si.

the image data frame rate is at least about 25 Hz.

the computation, which may be a parallel computation, is split into small identical parts called clusters tiled over the display surface.

the display can be built up through tiling identical clusters together.

the display is a high resolution display.

the display is a very high resolution display.

colour images are displayed.

the colour images displayed are in RGB format.

the display is fabricated using liquid crystal on silicon technology.

an additional logic for local forwarding of calculated data exists, and the additional logic can also be co-used for forwarding the original image to the clusters, so that at least some global row and column wires may be eliminated.

Method of using the display

I. Occlusion

Holographic display in which at least some of the calculations performed to determine the encoding of a spatial light modulator are performed using circuitry which is on the same substrate as the pixels of the spatial light modulator, and for which it is ensured that object points closer to the virtual observer window mask object points further away from the virtual observer window, along the same line of sight.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

occlusion is implemented using calculations which are performed by circuitry which is present on the same substrate as the pixel matrix.

occlusion is implemented using calculations which are performed by circuitry which is present in between the pixels of the display.

a virtual observer window is an eye pupil diameter or more across.

the VOW is separated into two or more segments.

each VOW segment is about the same size as the human eye pupil size.

each VOW segment is encoded by a different sub-hologram.

occlusion is performed at the stage that the depth map and intensity map are constructed.

Method of using the holographic display.

J. Graphics Card Functionalities

Holographic display in which at least some of the calculations performed to determine the encoding of a spatial light modulator are performed using circuitry which is on the same substrate as the pixels of the spatial light modulator, and in which graphics card functionalities are implemented using circuitry on the same substrate as the pixels of the display.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

graphics card functionalities are implemented using circuitry in between the pixels of the display.

graphics card functionalities are implemented using circuitry which is outside the pixel matrix.

graphics card functionalities include texture mapping.

graphics card functionalities include rendering polygons.

graphics card functionalities include translating vertices into different coordinate systems.

graphics card functionalities include programmable shaders.

graphics card functionalities include oversampling and interpolation techniques to reduce aliasing.

graphics card functionalities include very high-precision color spaces.

graphics card functionalities include 2D acceleration calculation capabilities.

graphics card functionalities include frame buffer capabilities.

graphics card functionalities include Moving Picture Experts Group (MPEG) primitives.

graphics card functionalities include performing computations involving matrix and vector operations.

graphics card functionalities include using a 3D-rendering pipeline which is implemented by TFTs on the same substrate as the pixel matrix.

Method of using the holographic display.

K. 2D-3D Conversion

Holographic display in which at least some of the calculations performed to determine the encoding of a spatial light modulator are performed using circuitry which is on the same substrate as the pixels of the spatial light modulator, and in which 2D-3D image conversion is implemented.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

2D-3D image conversion is implemented using circuitry on the same substrate as the pixels of the display.

2D-3D image conversion is implemented using circuitry not on the same substrate as the pixels of the display.

2D-3D image conversion is implemented using circuitry in between the pixels of the display.

2D-3D image conversion is implemented using circuitry which is outside the pixel matrix but on the same substrate as the pixels of the display.

2D-3D image conversion is implemented using pairs of stereoscopic images.

the display device calculates a two dimensional (2D) image, with its corresponding depth map, from the data received.

the circuitry which performs the 2D-3D conversion has access to a library containing a set of known 3D shapes.

the circuitry which performs the 2D-3D conversion has access to a library containing a set of known 2D profiles to which it may try to match incoming 2D image data.

2D-3D image conversion is performed based on a single, non-autostereoscopic 2D image.

Method of using the holographic display.

L. Conferencing (3D Skype)

Holographic display with which voice and holographic image over internet protocol (VHIOIP) services are provided.

at least some of the calculations performed to determine the encoding of a spatial light modulator are performed using circuitry which is on the same substrate as the pixels of the spatial light modulator.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

VHIOIP peer-to-peer communications are provided.

file sharing is provided.

instant messaging services over a global network to which it is connected are provided.

communication services are provided over a computer network to which it is connected.

file sharing services are provided over a computer network to which it is connected.

instant messaging services are provided over a computer network to which it is connected.

there is provided temporary use of online, non-downloadable computer software that allows subscribers to utilize VHIOIP communication services.

there is provided online software for downloading that allows subscribers to utilize VHIOIP communication services.

there is provided access to domains and domain database systems for access to holographic display data.

Method of using the holographic display.

M. Encoding Compensations.

Holographic display device in which compensation is applied to the holographic image data at or before the encoding step, to provide an image which is easier to view.

at least some of the calculations performed to determine the encoding of a spatial light modulator are performed using circuitry which is on the same substrate as the pixels of the spatial light modulator.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

compensation is applied using circuitry on the same substrate as the pixels of the display.

compensation is applied using circuitry in between the pixels of the display.

compensation is applied to the holographic image data at the encoding step.

compensation is applied to the holographic image data before the encoding step.

compensation is applied to correct a scene that is predominantly light tones and will tend to be underexposed.

compensation is applied to correct a scene that is predominantly dark tones and will tend to be overexposed.

Method of using the holographic display.

N. Eye Tracking

Holographic display in which at least some of the calculations performed to determine the encoding of a spatial light modulator are performed using circuitry which is on the same substrate as the pixels of the spatial light modulator, and in which eye tracking is implemented.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

eye tracking is implemented for a single viewer.

eye tracking is implemented for multiple viewers.

eye tracking is implemented by limiting the search range by detecting the user's face, then limiting the tracking range by detecting the eyes, then by tracking the eyes.

the eye tracking calculation module for performing the eye position identification function is provided with a stereo image pair as supplied by a stereo camera.

the module returns the x-, y-, and z-coordinates of each eye relative to a fixed point.

the computation required in order to perform the tracking is performed by circuitry on the same substrate as the display pixels.

the computation required in order to perform the tracking is performed by circuitry within the pixel matrix.

the holographic encoding on the SLM panel may be displaced in the plane of the panel.

the tracking of eyes in one lateral direction is carried out by displacing the entire holographic encoding content on the SLM in the x- or y-direction.

tracking is carried out such that the light sources that coherently illuminate the SLM are moved in synchronism with position changes of the viewer.

Method of using the holographic display.

O. Aberration Correction

Holographic display in which at least some of the calculations performed to determine the encoding of a spatial light modulator are performed using circuitry which is on the same substrate as the pixels of the spatial light modulator, and in which aberration correction is implemented.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

aberration correction is implemented using circuitry which is on the same substrate as the pixel matrix.

aberration correction is implemented using circuitry which is in between the pixels.

aberrations are corrected dynamically through the encoding of the spatial light modulator.

corrected aberrations are those in the lenses in a lenticular array.

corrected aberrations are those in the lenses in a 2D lens array.

sub-holograms are displayed.

a sum-hologram is generated from the sub-holograms.

the aberration correction algorithm is performed in parallel, and independently, of the holographic calculation up to the step where the sum-hologram is generated.

the sum-hologram and the aberration correction map are modulated together.

the aberration correction algorithms are implemented analytically.

the aberration correction algorithms are implemented using look-up tables (LUT).

Method of using the holographic display.

P. Speckle Correction

Holographic display in which at least some of the calculations performed to determine the encoding of a spatial light modulator are performed using circuitry which is on the same substrate as the pixels of the spatial light modulator, and in which speckle correction is implemented.

the calculations do not involve the calculation of a Fourier transform or of a Fresnel transform per se.

the hologram encoding data is calculated outside the space occupied by the pixel matrix, the hologram encoding data is then compressed using known data compression techniques, and is then transmitted to circuitry on the display substrate, the circuitry then performing the function of decompressing the data which has been received.

the 3D rendering pipeline of graphics sub-systems incorporates additional processing units for holographic transformation and encoding.

sequential holographic transformation of points in three-dimensional space is performed by way of extending the 3D pipeline of graphics cards with a holographic calculation pipeline.

the real space image data which is used in the holographic calculation is the difference between successive real space image frames, and the holographic display data is sent to the holographic display cluster in the form of sub-hologram difference data and display memory location data.

speckle correction is implemented using circuitry which is on the same substrate as the pixel matrix.

speckle correction is implemented using circuitry which is in between the pixels.

speckle is corrected dynamically through the encoding of the spatial light modulator.

sub-holograms are displayed.

a sum-hologram is generated from the sub-holograms.

the speckle correction algorithm is performed in parallel, and independently, of the holographic calculation up to the step where the sum-hologram is generated.

sum-hologram and the speckle correction map are modulated together.

the speckle correction algorithms are implemented analytically.

the speckle correction algorithms are implemented using look-up tables (LUT).

Method of using the holographic display.

Q. Decryption in Digital Rights Management (DRM) for a Holographic Display

Holographic display device in which decryption and hologram calculation are executed using circuitry which is on the substrate of the pixel matrix.

decryption and hologram calculation are executed in a distributed sense using circuitry which is distributed across the substrate of the pixel matrix.

decryption and hologram calculation are executed using circuitry which is within the pixel matrix.

decryption and hologram calculation are executed using circuitry which is outside the pixel matrix, but on the same substrate as the pixel matrix.

there is no single place on the substrate from which all decrypted data can be captured.

different decryption keys are used for different areas of the panel.

Method of using the holographic display.

R. Decryption in Digital Rights Management (DRM) for a 2D Display 2D display device in which decryption calculations are executed in a distributed sense using circuitry which is distributed across the substrate of the pixel matrix.

decryption calculations are executed in a distributed sense using circuitry which is within the pixel matrix.

decryption calculations are executed in a distributed sense using circuitry which is outside the pixel matrix, but on the same substrate as the pixel matrix.

there is no single place on the substrate from which all decrypted data can be captured.

different decryption keys are used for different areas of the substrate.

Method of using the display.

2D display device in which decryption calculations are executed using circuitry which is in a single area of the display substrate.

the circuitry is inside the pixel matrix.

the circuitry is outside the pixel matrix.

Method of using the display.

S. Software Application Implemented in Hardware, Hard-Wired into a Display

Display device in which an application which may be implemented using software is instead implemented in hardware using circuitry which is distributed across the substrate of an SLM panel.

the display is a 2D display.

the display is a holographic display.

the application is implemented using circuitry which is in between the pixels of the display.

the application is implemented using circuitry which is in outside the pixel matrix of the display.

Method of using the display.

T. Variable Beam Deflection with Microsprisms

Holographic display with which the viewer or viewers are tracked using a microprism array which enables controllable deflection of optical beams.

two dimensional deflection is obtained by using two microprism arrays in series.

the prisms are Micro Liquid Prisms.

the optical effect of lens aberration can be reduced.

the VOWs are placed at the viewer's or viewers' eyes.

a focussing means placed before or after the prism array will assist to converge the light rays into the VOW.

the prisms do not all have the same deflection angle.

the prisms do not all have the same deflection angle such that the light rays exiting the prism array converge somewhat at the VOW.

the prism angle calculation is performed in computational circuitry on the SLM's substrate.

the prism angle calculation is performed in computational circuitry placed on the substrate of the prism array.

the substrate of the SLM is also used as the substrate for the prism array.

a phase correction is applied to compensate for phase discontinuities introduced by the prism array.

the phase correction is performed by the SLM.

the holographic image is generated in a projection-type apparatus, where the projection involves imaging a SLM onto the prism array while the reconstruction of the desired 3D scene occurs in front of the VOW.

phase compensation for the prism array is provided when imaging the SLM onto the prism array.

phase compensation for the prism array is provided by an additional SLM placed near to the prism array.

the SLM is transmissive with the prism array reflective.

the SLM is reflective with the prism array transmissive.

Method of using the holographic display.

We claim:

1. A holographic display device comprising:
a spatial light modulator on which a hologram is provided and which is configured to reconstruct a three-dimensional scene comprising object points, the three-dimensional scene is observable from at least one virtual observer window, where the at least one virtual observer window is positioned within one periodicity interval, where an object point occluded by another object point along a line of sight is considered within the hologram generation process.

2. The holographic display device of claim 1, wherein the at least one observer window is separated into at least two segments.

3. The holographic display device of claim 2, wherein each object point is computed and reconstructed separately for different lines of sight according to the segments within the at least one virtual observer window, where each object point is then visible or not visible when observing from different locations within the at least two segments of the at least one virtual observer window.

4. The holographic display device of claim 2, wherein the size of a segment of the at least one virtual observer window is about the size of a pupil of an eye of an observer.

5. The holographic display device of claim 1, wherein for each object point a subhologram is computed, where all subholograms generate the hologram in which the three-dimensional scene is encoded.

6. The holographic display device of claim 5, wherein an object point is encoded in different subholograms for different lines of sight from the at least one virtual observer window.

7. The holographic display device of claim 1, wherein the three-dimensional scene is observable from at least one virtual observer window, where for the at least one virtual observer window, one depth map and intensity map pair is constructed.

8. The holographic display device of claim 7, wherein occlusion calculation is performed at the stage that the depth map and intensity map is constructed.

9. The holographic display device of claim 1, further comprising a circuitry on the substrate of the spatial light modulator, the circuitry comprising circuitry elements.

10. The holographic display device of claim 9, wherein the circuitry operable to carrying out calculations when performing a holographic encoding of the spatial light modulator.

11. The holographic display device of claim 10, wherein sub-holograms are used for the calculation and generation of encoding information.

12. The holographic display device of claim 11, wherein data for adding the sub-holograms is exchanged over a distance of a sub-hologram dimension.

13. The holographic display device of claim 10, wherein at least some of the holographic calculations are performed within a pixel matrix or in a space occupied by the pixels.

14. The holographic display device of claim 10, wherein holographic calculations are spread homogeneously over the circuitry on the substrate of the spatial light modulator.

15. The holographic display device of claim 10, wherein real space image data are used for the hologram calculation, where the real space image data consists of intensity and depth map data.

16. The holographic display device of claim 15, wherein real space image data is a difference between successive real space image frames, where holographic display data comprises sub-hologram difference data and display memory location data, and where said holographic display data is sent to holographic display clusters.

17. The holographic display device of claim 10, wherein the holographic calculations are split into small identical parts called clusters tiled over the substrate of the spatial light modulator.

18. The holographic display device of claim 9, wherein occlusion of an object point is implemented using calculations which are performed by the circuitry which is present between the pixels of the spatial light modulator.

19. The holographic display device of claim 9, wherein occlusion of an object point is implemented using calculations which are performed by the circuitry which is present on the same substrate as a pixel matrix.

20. The holographic display device of claim 9, wherein the circuitry comprises thin film transistors.

21. The holographic display device of claim 1, wherein eye tracking is implemented.

22. The holographic display device of claim 1, wherein a lens optical aberration effect is reduced by correcting dynamically through the encoding of the spatial light modulator or in which speckle correction is implemented.

23. The holographic display device of claim 1, wherein the display is fabricated using MEMS (Micro-Electro-Mechanical System) technology.

24. The holographic display device of claim 1, wherein holographic calculations are performed in real time or not in real time or in which holographic calculations are performed using a look-up table approach.

25. A method of generating a holographic reconstruction of a three-dimensional scene comprising object points, using the holographic display device of claim 1, the display device comprising a light source and an optical system to illuminate the spatial light modulator; comprising the steps of:
considering an object point occluded by another object point along a line of sight during the hologram calculation; and
encoding a hologram on the spatial light modulator.

* * * * *